United States Patent
Na et al.

(10) Patent No.: US 10,303,328 B2
(45) Date of Patent: May 28, 2019

(54) MOBILE TERMINAL AND METHOD FOR CONTROLLING THE SAME

(71) Applicant: LG ELECTRONICS INC., Seoul (KR)

(72) Inventors: Sungchae Na, Seoul (KR); Wanho Ju, Seoul (KR); Seonhwi Cho, Seoul (KR); Donghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 15/143,158

(22) Filed: Apr. 29, 2016

(65) Prior Publication Data
US 2017/0075517 A1    Mar. 16, 2017

(30) Foreign Application Priority Data

Sep. 14, 2015 (KR) .......................... 10-2015-0129900
Oct. 1, 2015 (KR) .......................... 10-2015-0138757

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0485* (2013.01); *G06F 3/0488* (2013.01);
(Continued)

(58) Field of Classification Search
None
See application file for complete search history.

(56) References Cited

U.S. PATENT DOCUMENTS 6,008,809 A * 12/1999 Brooks ................ G06F 3/0481
715/792
2009/0031248 A1* 1/2009 Kano .................... G06F 3/0481
715/790
(Continued)

FOREIGN PATENT DOCUMENTS

EP         2595042        5/2013
EP         2595043        5/2013
(Continued)

OTHER PUBLICATIONS

Artur Lugmayr et al., Semantic ambient media—an introduction, May 6, 2009, Springer Science Business Media, Edition or vol. 44, pp. 337-359 (Year: 2009).*
(Continued)

*Primary Examiner* — Tam T Tran
(74) *Attorney, Agent, or Firm* — Lee, Hong, Degerman, Kang & Waimey

(57) ABSTRACT

A mobile terminal for performing multi-tasking may include a display and a controller configured to cause the display to: display first screen information and second screen information concurrently in a first display format in response to a first type of user input, wherein the second screen information overlaps with at least part of the first screen information in the first display format; and display the first screen information and the second screen information in a second display format in response to a second type of user input, wherein the first screen information and the second screen information do not overlap in the second display format.

22 Claims, 42 Drawing Sheets

(51) Int. Cl.
*G06F 3/0488* (2013.01)
*G06F 3/0481* (2013.01)
*G06F 3/0484* (2013.01)
*G06F 3/0485* (2013.01)
*G06F 9/451* (2018.01)

(52) U.S. Cl.
CPC ...... *G06F 3/04817* (2013.01); *G06F 3/04842* (2013.01); *G06F 3/04883* (2013.01); *G06F 9/453* (2018.02); *G06F 3/04845* (2013.01)

(56) References Cited

U.S. PATENT DOCUMENTS

| | | | | |
|---|---|---|---|---|
| 2009/0094562 | A1* | 4/2009 | Jeong | G06F 3/0486 715/863 |
| 2011/0231791 | A1* | 9/2011 | Itahana | G06F 1/1645 715/799 |
| 2012/0223889 | A1* | 9/2012 | Medlock | G06F 3/04883 345/168 |
| 2013/0120447 | A1* | 5/2013 | Kim | G06T 11/60 345/629 |
| 2014/0298257 | A1* | 10/2014 | Grandhi | G06F 3/0484 715/808 |
| 2016/0048320 | A1* | 2/2016 | Han | G06F 3/04886 715/765 |
| 2016/0373388 | A1* | 12/2016 | Katis | H04L 51/10 |

FOREIGN PATENT DOCUMENTS

| | | |
|---|---|---|
| EP | 2752752 | 7/2014 |
| EP | 2767896 | 8/2014 |

OTHER PUBLICATIONS

Rex Hartson, User-Interface Management Control and Communication, Jan. 1989, IEEE Software, pp. 62-70 (Year: 1989).*

European Patent Application No. 16183918.8, Search Report dated Nov. 21, 2016, 8 pages.

French Patent Office Application Serial No. 1658191, Preliminary Search Report dated Jun. 26, 2018, 7 pages.

* cited by examiner

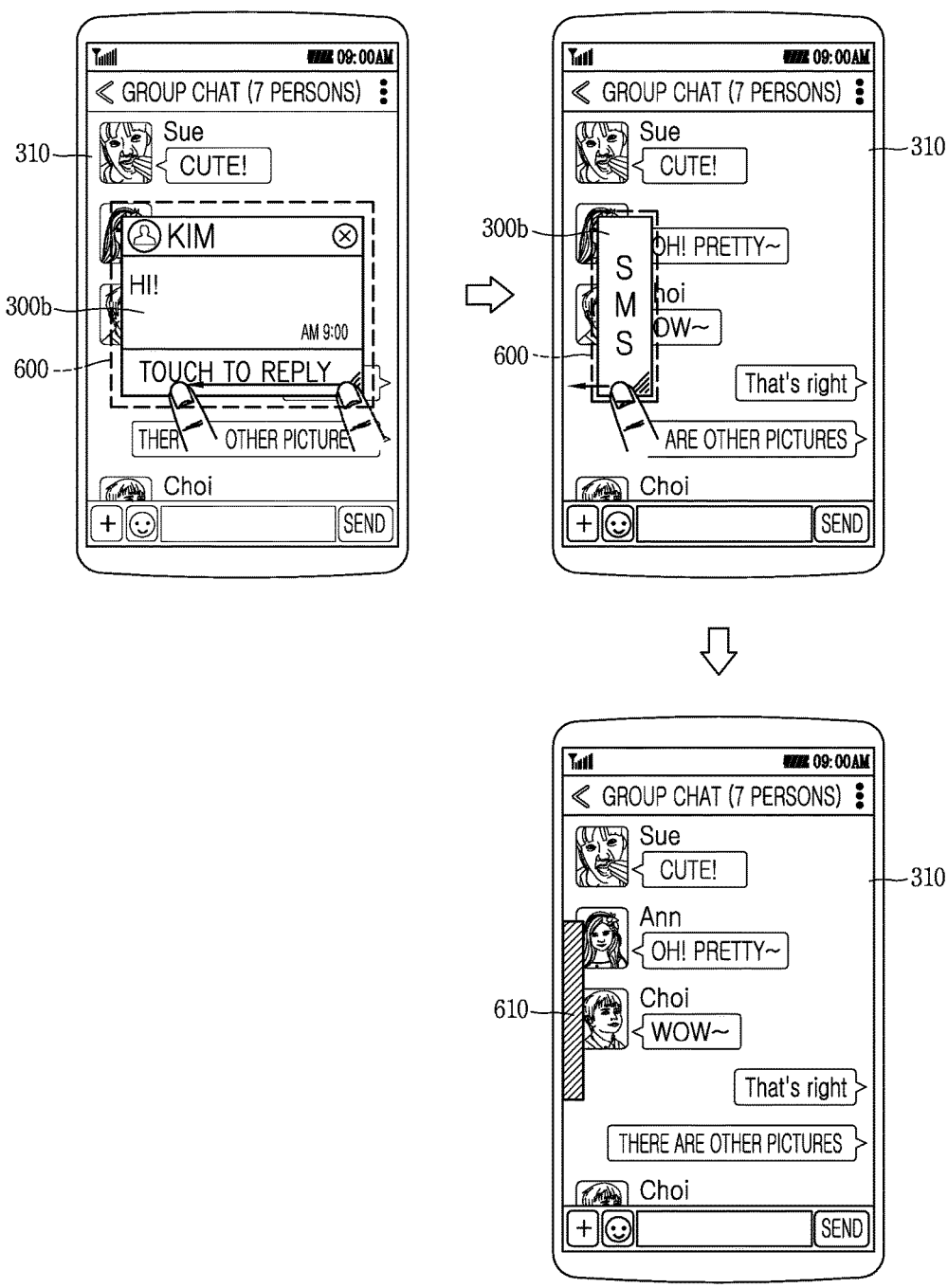

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Applications Nos. 10-2015-0129900, filed on Sep. 14, 2015, and 10-2015-0138757, filed on Oct. 1, 2015, the contents of which are all hereby incorporated by reference herein in their entirety.

BACKGROUND OF THE INVENTION

1. Field of the Invention

The present disclosure relates to a mobile terminal for providing a function of conveniently performing multi-tasking and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

On the other hand, such a mobile terminal may provide a multi-tasking function for executing various functions at the same time. In this case, the mobile terminal may provide the screen information of various functions at the same time.

According to the related art, in order to provide screen information on various functions at the same time, the screen information are provided in various forms. However, according to the related art, there exists an inconvenience in which various steps should be carried out to perform a conversion between the screen information in various forms.

Furthermore, when a plurality of screen information are provided at the same time, part of screen information is hidden, and thus, there exists an inconvenience in which an additional manipulation for viewing hidden screen information should be carried out.

SUMMARY OF THE INVENTION

In order to solve the foregoing problem, an aspect of the present disclosure is to provide a method of converting a display format of screen information through a simple manipulation.

Furthermore, another aspect of the present disclosure is to effectively provide a method for displaying the hidden part of screen information when part of screen information is hidden.

The present disclosure relates to a mobile terminal for providing a function of performing multi-tasking. According to an embodiment, the mobile terminal may include a display and a controller configured to cause the display to: display first screen information and second screen information concurrently in a first display format in response to a first type of user input, wherein the second screen information overlaps with at least part of the first screen information in the first display format; and display the first screen information and the second screen information in a second display format in response to a second type of user input, wherein the first screen information and the second screen information do not overlap in the second display format.

According to an embodiment, the controller is further configured to cause the display to display a guide image when a first touch is applied to a specific region of the second screen information while the first screen information and the second screen information are displayed in the first display format, the guiding image guiding conversion from the first display format to the second display format.

According to an embodiment, the controller is further configured to cause the display to display the first screen information and the second screen information in the second display format in response to a second touch applied to the guide image.

According to an embodiment, the controller is further configured to: cause the first screen information or the second screen information to be in an edit mode in response to a user input for switching a display format received while the first screen information and the second screen information are displayed in the second display format; and cause the display to display the first screen information and the second screen information in the first display format in response to a touch applied to a region of the first or second screen information that is in the edit mode.

According to an embodiment, the controller is further configured to cause the display to display an indicator linked to the second screen information instead of the second screen information when a size of the second screen information is reduced to a size that is less than a predetermined size in response to a user input received while the first screen information and the second screen information are displayed in the first display format.

According to an embodiment, the controller is further configured to cause the display to redisplay the second screen information in a pop-up manner over the first screen information in response to a touch applied to the indicator while the first screen information is displayed.

According to an embodiment, the controller is further configured to cause the display to: display updated second screen information associated with an event for a preset period of time when the event occurs with respect to an application associated with the second screen information while the indicator is displayed, the updated second screen information displayed without requiring a user input; and redisplay the indicator instead of the second screen information when the preset period of time elapses while the updated second screen information is displayed.

According to an embodiment, the controller is further configured to cause the display to: change a size of the first screen information and a size of the second screen information in response to a touch applied to a boundary region between the first screen information and second screen information that are displayed in the second display format; and display an indicator linked to the first or second screen information of which the size is reduced to a size that is less than a predetermined size such that the reduced sized first or second screen information is replaced by the indicator.

According to an embodiment, the controller is further configured to cause the display to: display a notification screen containing notification information for notifying occurrence of an event related to an application associated with the second screen information; and display the first screen information and second screen information in the first display format in response to the first type of user input applied to the notification information.

According to an embodiment, the first screen information includes a message communicated with an external terminal in real time; the second screen information is a playback screen of a video contained in a message received from the external terminal; and the controller is further configured to cause the display to continue displaying of the playback screen when a new message is received from the external terminal during playback of the video such that the first screen information including the new message and the second screen information including the playback screen are displayed in the first display format.

According to an embodiment, the controller is further configured to cause the display to display screen information for setting a path for downloading the video in response to a drag input applied to the second screen information in a predetermined direction, the drag input received while the playback screen is displayed.

According to an embodiment, the controller is further configured to cause the display to display icons corresponding to a plurality of applications in response to a user input for displaying both the first screen information and the second screen information concurrently, the user input received while only the first screen information is displayed.

According to an embodiment, the controller is further configured to cause the display to display an execution screen of an application corresponding to a specific icon as the second screen information in response to a touch applied to the specific icon among the icons.

According to an embodiment, the first type of user input is a touch that is less than a threshold length and the second type of user input is a touch that is greater than the threshold length.

According to an embodiment, the controller is further configured to cause the display to display the first screen information and the second screen information in the second display format in response to a drag applied to the second screen information in a specific direction while the first screen information and the second screen information are displayed in the first display format.

According to another embodiment of the present disclosure, there is provided a control method of a mobile terminal, and the method may include displaying first screen information and second screen information concurrently in a first display format in response to a first type of user input, wherein the second screen information overlaps with at least part of the first screen information in the first display format; and displaying the first screen information and the second screen information in a second display format in response to a second type of user input, wherein the first screen information and the second screen information do not overlap in the second display format.

According to an embodiment, the method may further include displaying a guide image when a first touch is applied to a specific region of the second screen information while the first screen information and the second screen information are displayed in the first display format, the guiding image guiding conversion from the first display format to the second display format.

According to an embodiment, the method may further include causing the first screen information or the second screen information to be in an edit mode in response to a user input for switching a display format received while the first screen information and the second screen information are displayed in the second display format; and displaying the first screen information and the second screen information in the first display format in response to a touch applied to a region of the first or second screen information that is in the edit mode.

According to an embodiment, the method may further include displaying an indicator linked to the second screen information instead of the second screen information when a size of the second screen information is reduced to a size that is less than a predetermined size in response to a user input received while the first screen information and the second screen information are displayed in the first display format.

According to an embodiment, the method may further include changing a size of the first screen information and a size of the second screen information in response to a touch applied to a boundary region between the first screen information and second screen information that are displayed in the second display format; and displaying an indicator linked to the first or second screen information of which the size is reduced to a size that is less than a predetermined size such that the reduced sized first or second screen information is replaced by the indicator.

According to still another embodiment of the present disclosure, a mobile terminal may include a display; and a controller configured to cause the display to: display first screen information and second screen information concurrently, the first screen information comprising at least a first region and a second region, and the second screen information displayed overlapping the second region such that first partial information of the first screen information is displayed at the first region, and second partial information of the first screen information at the second region is obscured by the second screen information; and display the first partial information and the second partial information together at the first region, continuing the displaying of the second screen information at a region of the display corresponding to the second region, wherein a display format of the first region is changed such that both the first partial information and the second partial information fit in the first region.

According to an embodiment, a display format of a region or regions of the first screen information other than the first region is not changed when the display format of the first region is changed.

According to an embodiment, the controller is further configured to cause the display to display the second partial information at the region of the display corresponding to the second region when the second screen information is no longer displayed in response to a user input received while the second screen information is displayed at the region of the display corresponding to the second region.

According to an embodiment, the controller is further configured to cause the display to: stop the displaying of the second screen information in response to a touch applied to the second screen information that is displayed at the region of the display corresponding to the second region; and display an image at the region of the display corresponding to the second region while the second screen information is not displayed, the image indicating a position where the second screen information was displayed.

According to an embodiment, the controller is further configured to: recognize scrolling of the first screen information; and cause the display to display the second screen information on a specific region located in a direction that is opposite to a direction of movement of the first screen information according to the scrolling.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

Referring to FIGS. 1A through 1C.

DETAILED DESCRIPTION OF THE INVENTION

Hereinafter, an embodiment disclosed in the present disclosure will be described in detail with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
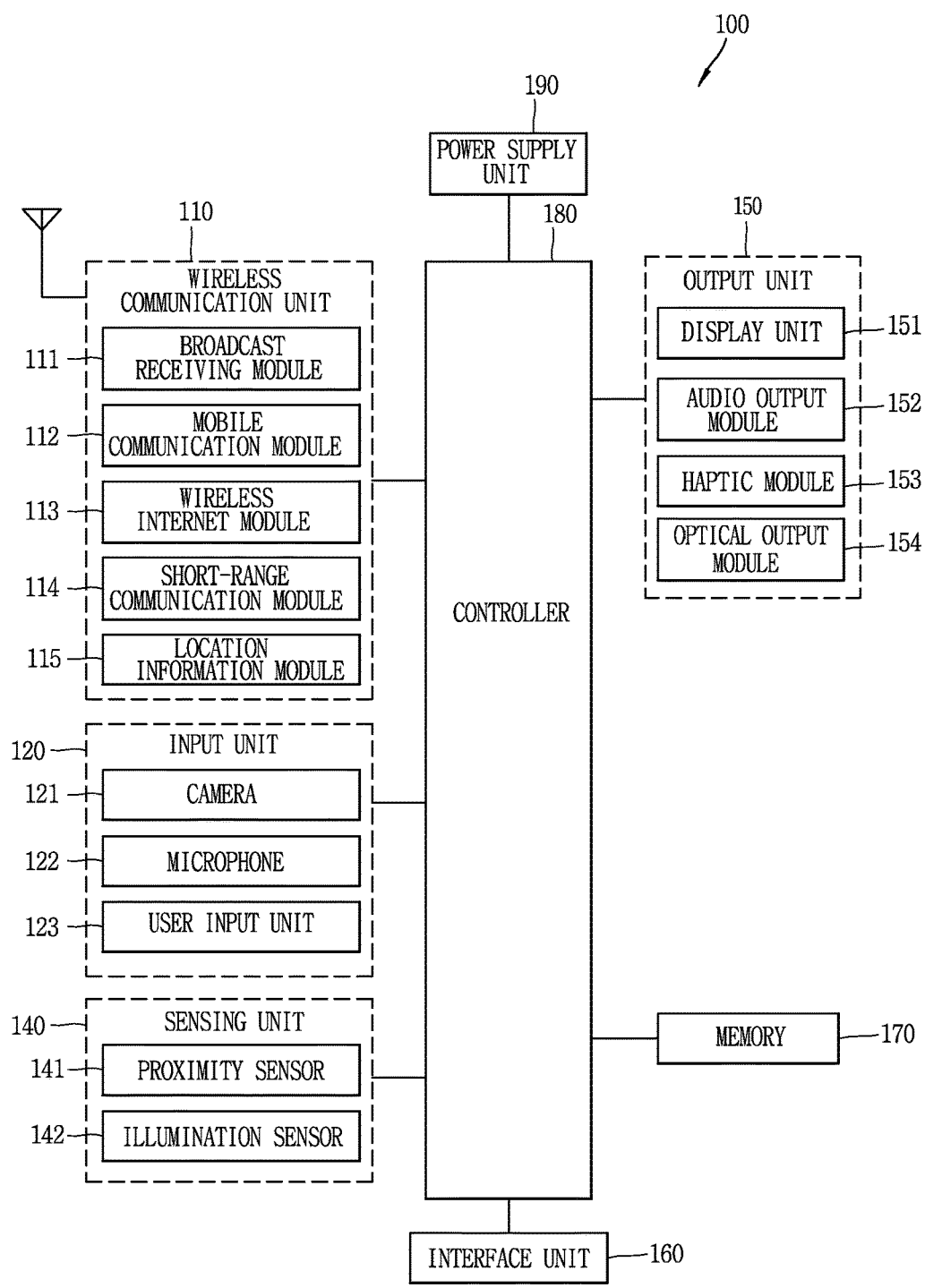
FIG. 1A is a block diagram for explaining a mobile terminal associated with the present disclosure.
Figure 1B:
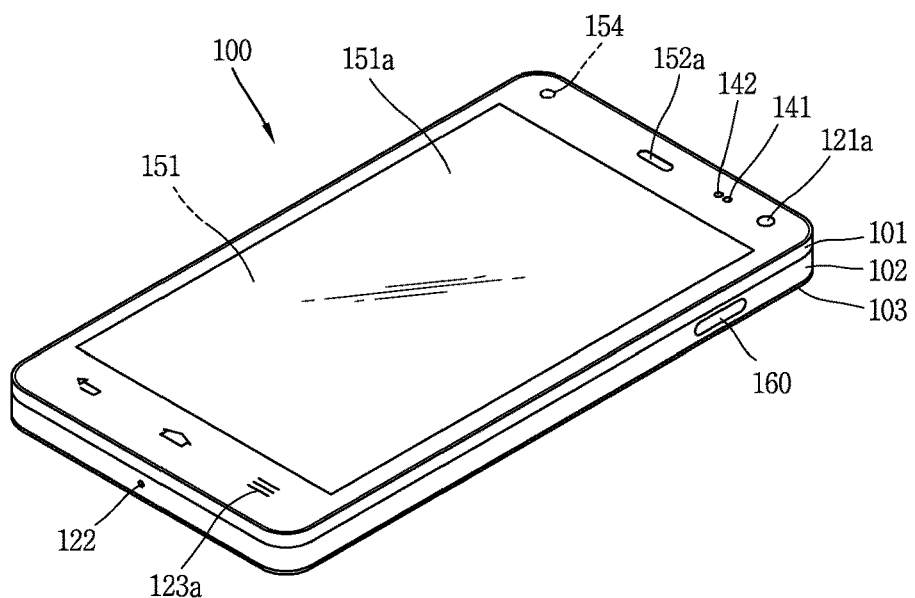
FIGS. 1B and 1C are conceptual views in which an example of a mobile terminal associated with the present disclosure is seen from different directions.
Figure 1C:
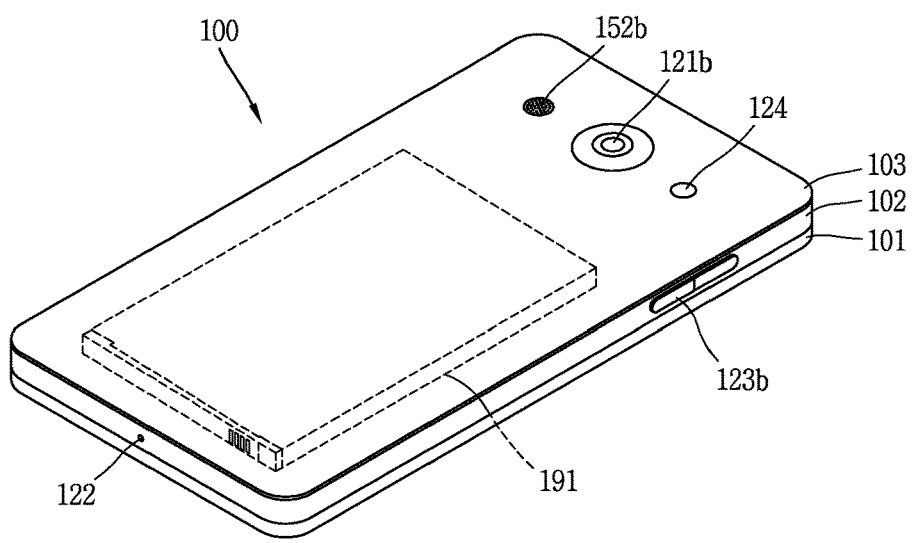

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data for the location of the mobile terminal in a substitutional or additional manner. The location information module 115 may be a module used to obtain the location (or current location) of the mobile terminal, and may not be necessarily limited to a module for directly calculating or obtaining the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

On the other hand, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor 141 may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk.

Also, the mobile terminal 100 may be operated in relation to a web storage device that performs the storage function of the memory 170 over the Internet.

On the other hand, as aforementioned, the controller 180 may typically control the general operations of the mobile terminal 100. For example, the controller 180 may set or release a locked state for restricting a user from inputting a control command with respect to applications when a status of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Hereinafter, embodiments associated with a control method that can be implemented in a mobile terminal having the foregoing configuration will be described with reference to the accompanying drawings. It is obvious to those skilled in the art that the present features can be embodied in several forms without departing from the characteristics thereof.

In the following description, the drawings will be described in sequence in a clockwise direction or described in sequence from the top to the bottom based on the upper left drawing.

A mobile terminal according to the present disclosure as a mobile terminal performing multi-tasking may execute a plurality of functions at the same time. Moreover, a mobile terminal according to the present disclosure may display a plurality of screen information corresponding to a plurality of functions, respectively, at the same time on the touch screen 151.

Hereinafter, various methods of providing a plurality of screen information concurrently on a mobile terminal performing multi-tasking will be described.

Figure 2A:
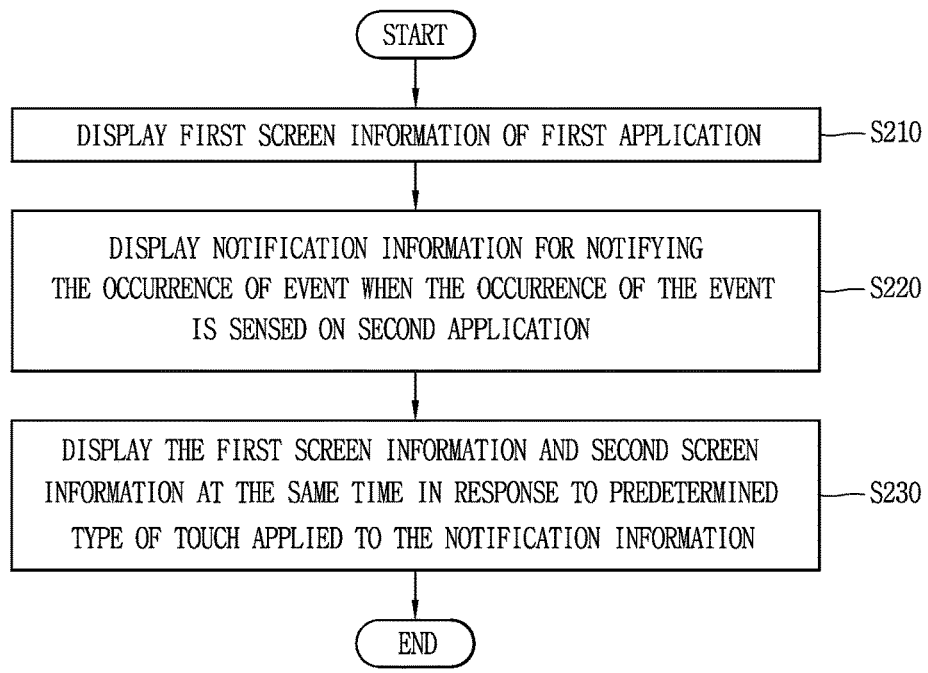
FIGS. 2A and 2B are flow charts illustrating a control method for the conversion between a plurality of display formats on a mobile terminal according to the present disclosure.
Figure 2B:
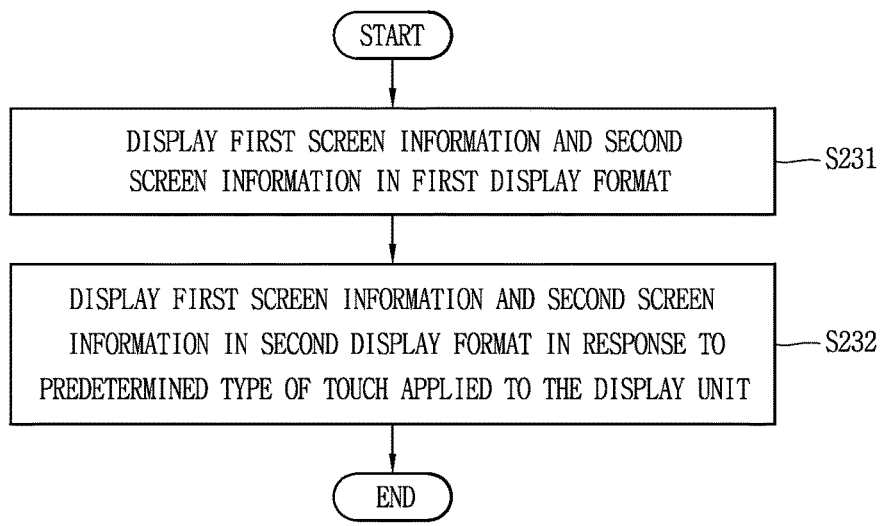

FIGS. 2A and 2B are flow charts illustrating a control method for conversion between a plurality of display formats on a mobile terminal according to the present disclosure, and FIGS. 3A through 5B are conceptual views for explaining the control method of FIGS. 2A and 2B.

First, the controller of a mobile terminal according to the present disclosure may display first screen information of a first application on the display unit (S210).

The controller 180 of a mobile terminal according to the present disclosure may execute a first application among a plurality of applications installed on the mobile terminal in response to a user's request. For example, the controller 180 may execute a first application in response to a touch applied to a region displayed with an icon linked to the first application.

Here, an application is an application program for providing functions that are executable on the mobile terminal. The application may be pre-installed as factory default on the mobile terminal or downloaded from an external server to be installed by a user's control command.

The user's request is a control command entered by a user through a user input unit of the mobile terminal. The user's request may be generated by a touch input, a gesture input, a button input or the like. Furthermore, the term a "user's request" may be replaced with a "control command," a "user's control command," a "user input" or the like.

When the first application is executed, the controller 180 may cause displaying of the first screen information of the first application on the touch screen 151. The first screen information as screen information associated with the execution of the first application may include visual information corresponding to functions provided by the first application. For example, as illustrated in the first drawing of FIG. 3A, when the first application is a message application, the controller 180 may cause displaying of messages transmitted to or received from an external terminal, screen information associated with a message send function or the like as first screen information 310 on the touch screen 151.

The message application as an application program for providing a function of transmitting and receiving messages to and from at least one external terminal may be also understood as a term of "message application" or "social network service (SNS) application."

When an event occurs on a second application while the first screen information is displayed, the controller of a mobile terminal according to the present disclosure may cause displaying of notification information for notifying the occurrence of an event of the second application such that he notification information overlaps with the first screen information (S220).

During the execution of the first application, the controller 180 may sense an event occurred on a second application among a plurality of applications installed on the mobile terminal. The event may be an incident occurring on an application installed on the mobile terminal, for example, a message received, a call signal received, a missed call, an alarm, a schedule notification, an email received, information received through application, or the like.

Upon sensing that an event has occurred on the second application, the controller 180 may cause displaying of notification information for notifying the occurrence of the event.

Figure 3A:
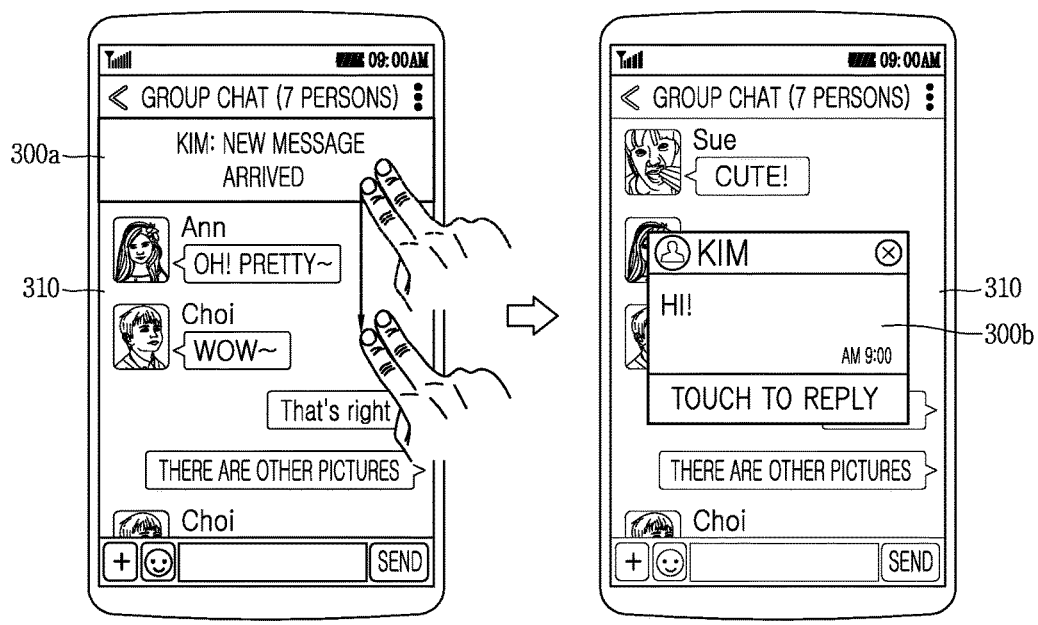
FIGS. 3A through 5B are conceptual views for explaining the control method of FIGS. 2A and 2B.

For example, as illustrated in the first drawing of FIG. 3A, while the first screen information 310 of a message application is displayed, the controller 180 may cause displaying of notification information 300*a* for notifying the occurrence of an event on a message application that different from the message application in an overlapping manner.

On the other hand, though not shown in the drawing, in addition to the foregoing modes, the notification information may be also output with at least one of a visual, auditory or tactile mode.

Subsequent to outputting notification information for notifying the occurrence of an event, the controller of a mobile terminal according to the present disclosure may cause displaying of the first screen information of the first application and the second screen information of the second application concurrently on the display unit in response to a predetermined type of touch applied to the notification information for notifying the occurrence of the event (S230).

The controller 180 may perform multi-tasking for executing a plurality of applications at the same time. Furthermore, when multi-tasking is carried out, the controller 180 may cause displaying of a plurality of screen information corresponding to applications being executed with the multi-tasking at the same time on the display unit 151.

On the other hand, the plurality of screen information may be screen information that correspond to a corresponding one of a plurality of applications, or screen information that correspond to a corresponding one of a plurality of functions provided by one application. For example, first screen information may be screen information including the content of messages transmitted to and received from an external terminal, and the second application may be screen information including call log information. For another example, the first screen information may be screen information including at least one thumbnail image, and the second screen information may be screen information including the content of messages transmitted to and received from an external terminal.

The plurality of screen information may be displayed in various display formats on the display unit 151. Here, the display format as a visual appearance on which screen information is displayed on the display unit may be a mode of displaying the position, color, size, shape or the like in which screen information is displayed on the display unit.

Hereinafter, a case where a first application and a second application are carried out at the same time will be described below, but the present disclosure may be also applicable to all of a plurality of applications.

The controller 180 may execute a second application in response to a predetermined type of touch applied to a region displayed with notification information for notifying the occurrence of an event that has occurred on the second application.

Furthermore, when a second application is executed, the controller 180 may cause displaying of the first screen information of the first application and the second screen information of the second application concurrently on the display unit 151.

At this time, the controller 180 may cause displaying of the first screen information of the first application and the second screen information of the second application in a specific display format.

For example, the controller 180 may cause displaying of first screen information on the entire region of the display unit 151, and displaying of second screen information in a pop-up window manner such that the second screen information overlaps with the first screen information. In this manner, a display format of displaying at least part of each screen information in an overlapping manner may be referred to as a "slide over format" or "picture in picture (PIP) format."

The slide over format is a display format in which second screen information having a predetermined ratio on first screen information is displayed in an overlapping manner with a slide format. The PIP mode is a display format in which second screen information is displayed in a pop-up manner on first screen information. When displayed with the PIP mode, the second screen information may move on the first screen information according to a user's control command. Hereinafter, both the "slide over format" and "PIP format" will be described as the term of a first display format.

For another example, the controller 180 may cause partitioning of the display unit 151 into a plurality of regions, and displaying of a plurality of screen information on the respectively corresponding plurality of regions. In this manner, a format in which a plurality of screen information are displayed not to overlap with each other may be referred to as a "split view" or "multi-window."

The split view is a display format in which different screen information are displayed on a plurality of partitioned regions, respectively. Furthermore, when different screen information are displayed with the split view, the controller 180 may exchange data between the different screen information with each other based on a user's control command.

Hereinafter, both the "split view" or "multi-window" will be described as the term of a second display format. The specific display format may be preset or set by a user.

More specifically, when multi-tasking is carried out in case where a default display format is preset, the controller 180 may cause displaying of screen information in the default display format. For example, when multi-tasking is carried out while the default display format is a first display format, the controller 180 may cause displaying of first screen information and second screen information in a first display format.

Alternatively, when multi-tasking is carried out, the controller 180 may cause displaying of first screen information and second screen information in a specific display format selected by the user.

For example, as illustrated in the first drawing of FIG. 3A, the controller 180 may cause displaying of notification information 300a for notifying the occurrence of an event that has occurred on a specific application while the first screen information 310 is displayed on the display unit 151.

At this time, the controller 180 may determine whether or not to display it with either one of a first display format and a second display format according to the attribute of a predetermined type of touch applied to the notification information 300a for notifying the occurrence of an event that has occurred on the specific application.

The predetermined type of touch may include a drag, a long touch, a multi-touch, or a double touch. The attribute of the touch may include a touch length, a touch duration time, a touch pressure, and a touch area in which the touch is sensed.

For example, as illustrated in the second drawing of FIG. 3A, when the touch length of a multi-touch applied to the notification information 300a for notifying the occurrence of an event that has occurred on a specific application is less than a preset length, the controller 180 may cause displaying of first screen information 310 and second screen information 300b in a first display format. Here, the second screen information 300b may be screen information associated with the event.

Figure 3B:
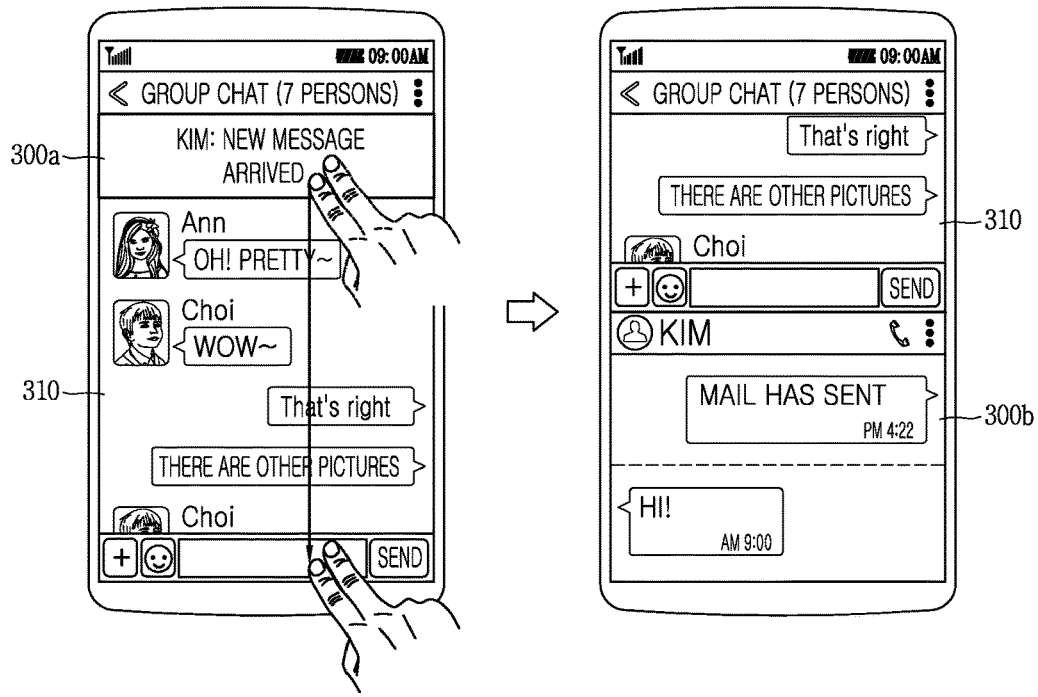

For another example, as illustrated in the first and the second drawings of FIG. 3B, when the touch length of a multi-touch applied to the notification information 300a for notifying the occurrence of an event that has occurred on a specific application is greater than a preset length, the controller 180 may cause displaying of first screen information 310 and second screen information 300b in a second display format.

Accordingly, the user may directly select which display format the first screen information and second screen information are to be displayed.

On the other hand, the controller 180 may convert the specific display format to another display format in response to a user's control command applied while first screen information and second screen information are displayed in a specific display format.

Hereinafter, a method of converting first screen information and second screen information will be described in more detail with reference to FIG. 2B.

First, in a mobile terminal according to the present disclosure, the controller may cause displaying of first screen information and second screen information in a first display format on the display unit (S231).

The controller 180 may cause displaying of first screen information and second screen information in a first display format in response to a user's request. For example, as illustrated in the first drawing of FIG. 4A, the controller 180 may cause displaying of first screen information 310 and second screen information 300b in a first display format.

When the plurality of screen information are displayed in a first display format, the controller may cause displaying of first screen information and second screen information in a second display format in response to a predetermined type of touch applied to the display unit (S232).

The controller 180 may sense a predetermined type of touch applied to a specific region of the display unit 151 while the first screen information 310 and second screen information 300b are displayed in a first display format.

The predetermined type of touch may be a drag touch, a multi-touch, a double touch, a pinch-in touch, a pinch-out touch, a multi-touch-and drag, a long touch, a flicking touch, a bidirectional drag touch, or the like. Here, the bidirectional drag touch is a drag touch consecutively moving in a horizontal direction or vertical direction with respect to a specific region.

The specific region may be a boundary region between the second screen information and first screen information. Alternatively, the specific region may be an edge region of the second screen information.

Figure 4A:
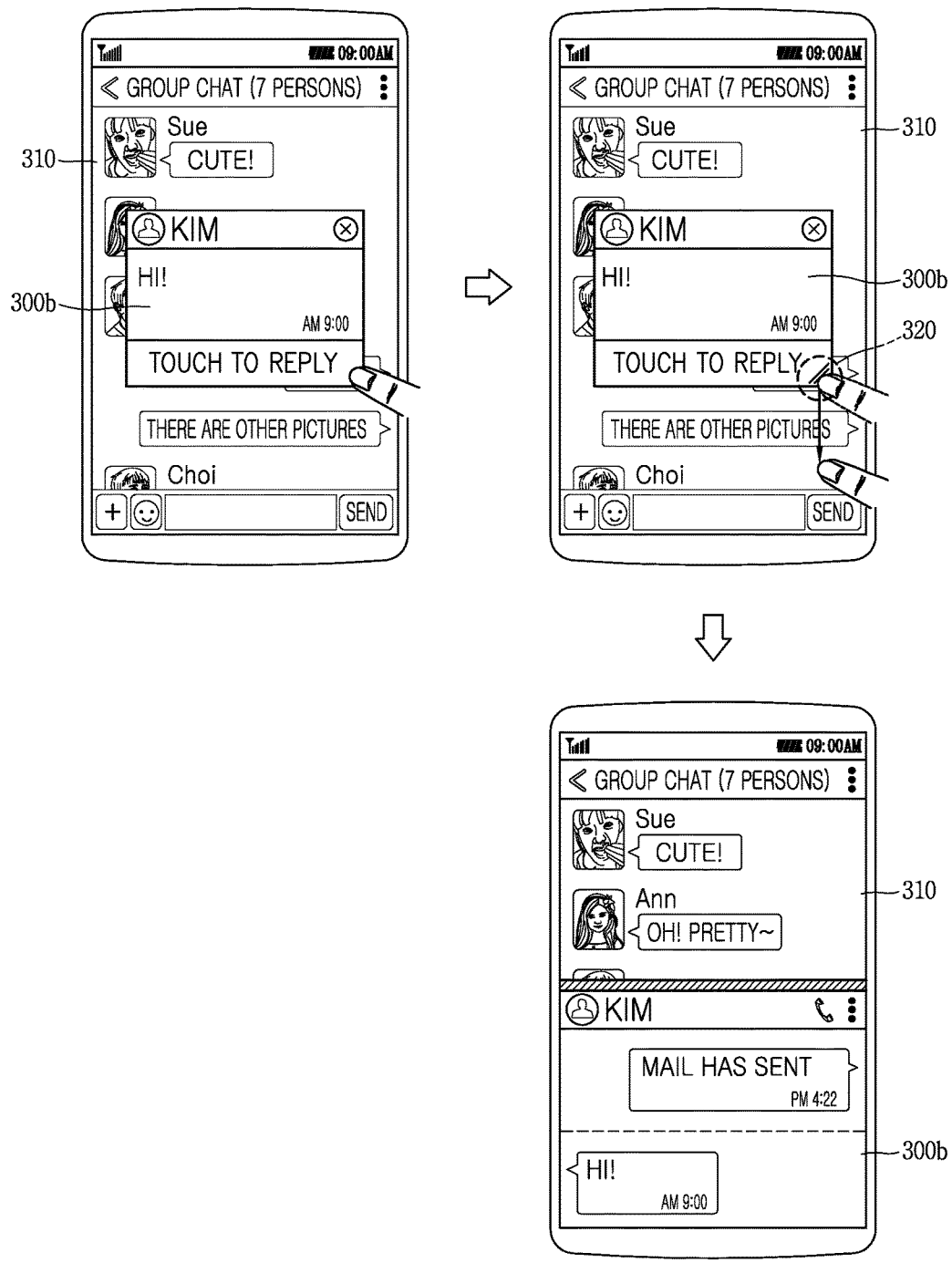

For example, as illustrated in the second drawing of FIG. 4A, the controller 180 may sense a drag touch started from an edge region of the second screen information 300b and ended at a lower edge region of the display unit 151 while the first screen information 310 and second screen information 300b are displayed in a first display format.

The controller 180 may convert the display format of first screen information and second screen information in response to the application of a predetermined type of touch. More specifically, the controller 180 may convert and cause displaying of first screen information and second screen information in a second display format in response to the predetermined type of touch applied while the first screen information and second screen information are displayed in a first display format. On the contrary, the controller 180 may convert and cause displaying of first screen information and second screen information in a first display format in response to the predetermined type of touch applied while the first screen information and second screen information are displayed in a second display format.

For example, as illustrated in the third drawing of FIG. 4A, the controller 180 may convert a first display format to a second display format in response to the application of a drag touch started from an edge region of the second screen information 300b and ended at a lower edge region of the display unit 151. In this case, the controller 180 may cause displaying of the first screen information 310 and second screen information 300b in a second display format.

On the other hand, the present disclosure may be applicable in a similar manner to a case where a state of being displayed in a second display format is converted to a first display format.

More specifically, the controller 180 may sense a predetermined type of touch applied to a specific region of the display unit 151 while the first screen information 310 and second screen information 300b are displayed in a second display format. In this case, the controller 180 may convert and cause displaying of the first screen information and second screen information in a first display format in response to the application of the predetermined type of touch.

Figure 5A:
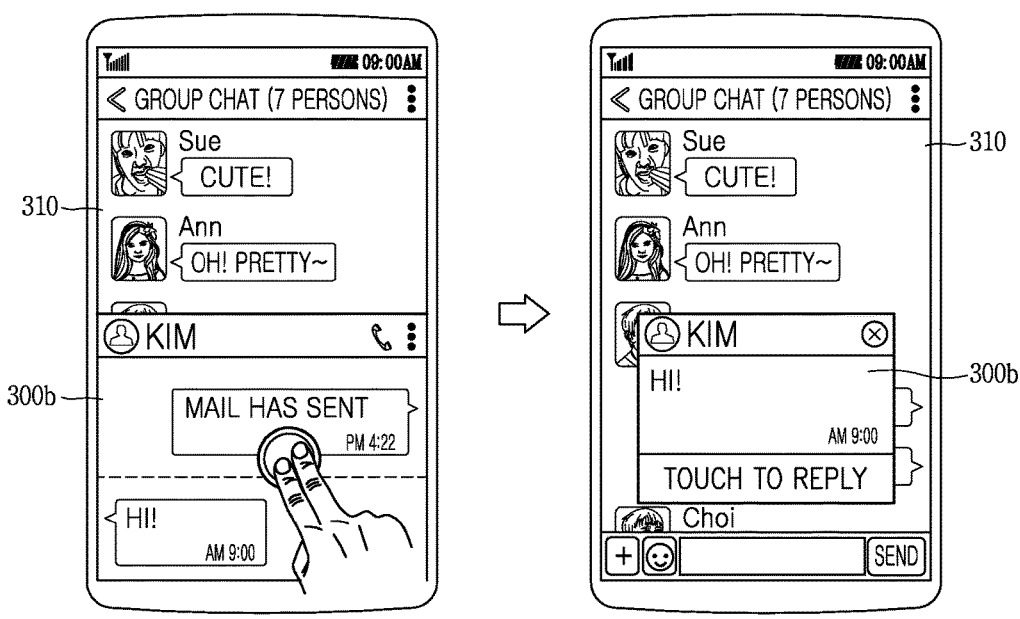

For example, as illustrated in the first drawing of FIG. 5A, the controller 180 may convert a second display format to a first display format in response to a long touch applied to a region displayed with the second screen information 300b while the first screen information 310 and second screen information 300b are displayed in the second display format. In this case, as illustrated in the second drawing of FIG. 5A, the second screen information 300b may be displayed on the display unit 151 in a pop-up manner to overlap with the first screen information 310.

Figure 5B:
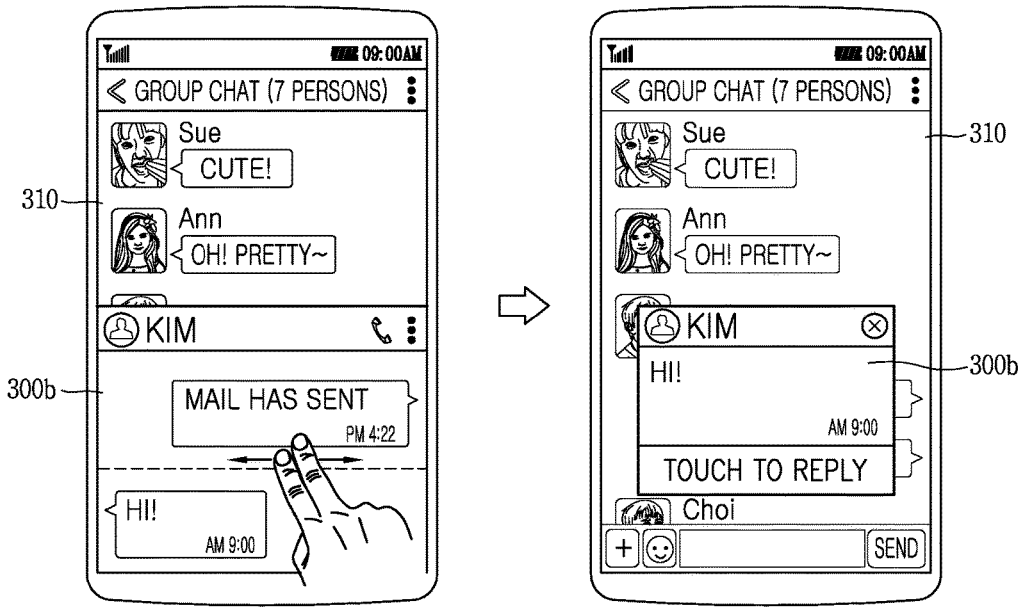

For another example, as illustrated in the second drawing of FIG. 5B, the controller 180 may convert a second display format to a first display format in response to a bidirectional drag touch horizontally applied to a region displayed with the second screen information 300b while the first screen information 310 and second screen information 300b are displayed in the second display format. In this case, as illustrated in the second drawing of FIG. 5A, the second screen information 300b may be displayed on the display unit 151 in a pop-up manner to overlap with the first screen information 310.

On the other hand, the controller 180 may cause displaying of a guide image for guiding conversion of a display format on the display unit 151 based on a user's request prior to applying a predetermined type of touch to a specific region for the conversion of the display format.

The guide image may be displayed on a region to which a predetermined type of touch is to be applied to guide the conversion of the display format. Accordingly, the user may know that it is allowed to apply a control command for the conversion of the display format through the guide image, and moreover, apply a predetermined type of touch to the guide image to convert the display format.

For example, as illustrated in the first drawing of FIG. 4A, the controller 180 may sense a short touch applied to an edge region of the screen information while the first screen information 310 and second screen information 300b are displayed in a first display format. In this case, the controller 180 may cause displaying of a guide image 320 for guiding the conversion of the display format on an edge region of the second screen information 300b.

The controller 180 may convert a display format for displaying the first screen information and second screen information from a first display format to a second display format in response to the application of a drag touch started from a region displayed with the guide image 320 and ended at a lower edge region of the display unit 151. For example, as illustrated in the third drawing of FIG. 4A, the controller 180 may cause displaying of the first screen information 310 and the second screen information 300b in a second display format.

Similarly, the controller 180 may cause displaying of a guide image in response to a short touch applied to a boundary region between first screen information and second screen information while the first screen information and the second screen information are displayed in a second display format. For example, as illustrated in the first and the second drawings of FIG. 4B, the controller 180 may cause displaying of guide images 330a, 330b, 330c on a boundary region between the first screen information and the second screen information, and edge regions thereof, respectively, in response to a short touch applied to the boundary region between the first screen information and the second screen information.

At this time, the controller 180 may determine screen information to be displayed in a pop-up manner between the first screen information and the second screen information based on a pinch-in touch applied to a region displayed with the guide image.

Figure 4B:
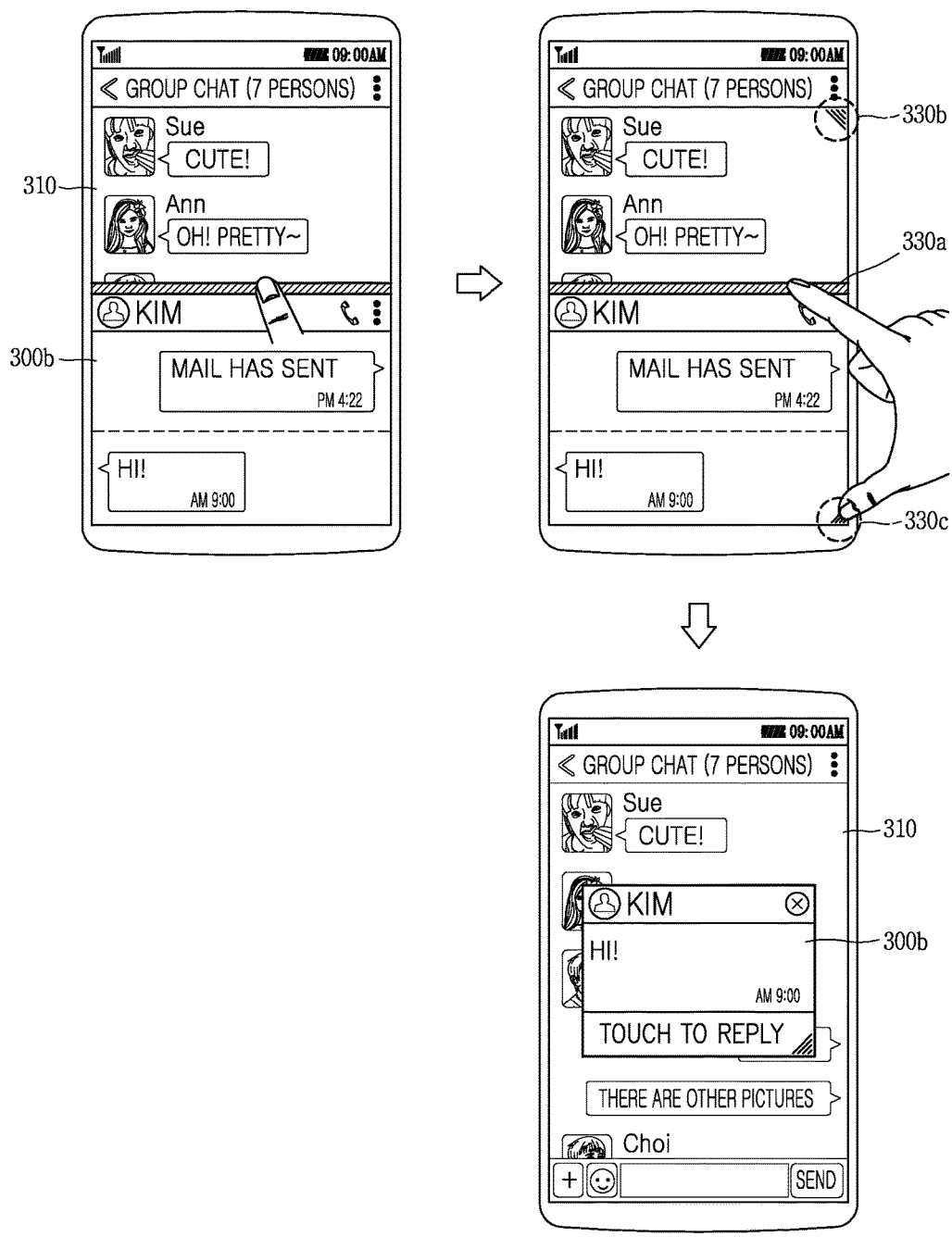

For example, as illustrated in the second drawing of FIG. 4B, the controller 180 may determine the second screen information 300b as screen information to be displayed in a pop-up manner based on a pinch-in touch applied to one region of the second screen information 300b. In this case, as illustrated in the third drawing of FIG. 4B, the second screen information 300b may be displayed on the display unit 151 to overlap with the first screen information 310.

Figure 4C:
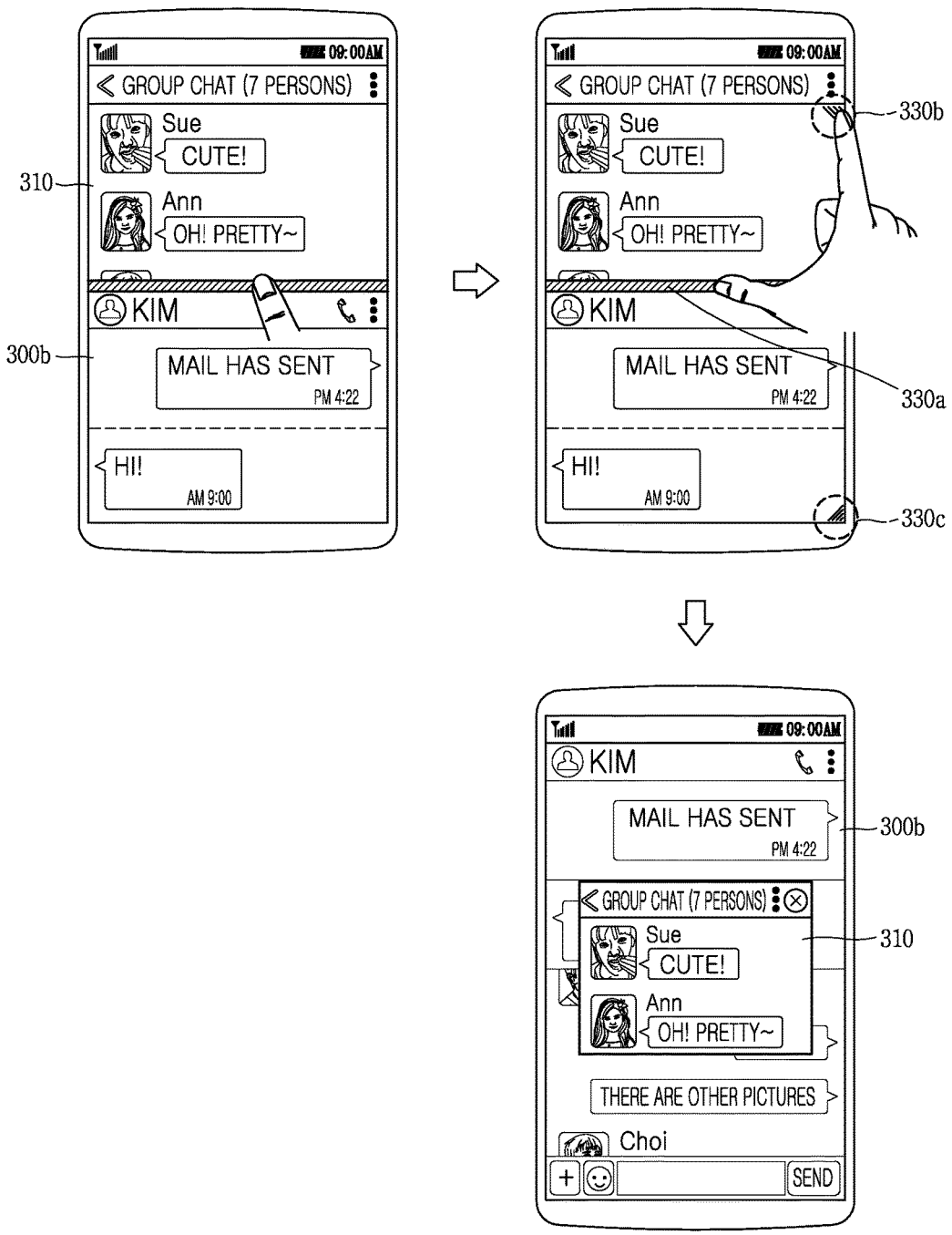

Furthermore, as illustrated in the first and the second drawings of FIG. 4C, the controller 180 may determine the first screen information 310 as screen information to be displayed in a pop-up manner based on a pinch-in touch applied to one region of the first screen information 310. In this case, as illustrated in the third drawing of FIG. 4C, the controller 180 may cause displaying of the first screen information 310 in a pop-up manner on the second screen information 300b.

On the other hand, though not shown in the drawing, the guide image may disappear from the display unit 151 when a touch to the guide image is not applied within a predetermined period of time while the guide image is displayed thereon.

On the other hand, the controller 180 may enter an edit mode based on a user's request received while the first screen information 310 and second screen information 300b are displayed in a second display format. Here, the edit mode may be in a state capable of changing the display format.

In case of entering the edit mode, the controller 180 may provide an animation effect on the first screen information 310 and the second screen information 300b to allow the user to visually recognize that the first screen information 310 and the second screen information 300b are in an editable state.

The controller 180 may change the display format based on a predetermined type of touch applied to the display unit subsequent to entering the edit mode. For example, the controller 180 may execute an edit mode based on a long touch applied to a region displayed with the second screen information 300b while the first screen information 310 and the second screen information 300b are displayed in a second display format.

The controller 180 may cause displaying of the second screen information 300b in a pop-up manner to overlap with the first screen information 310 based on a bidirectional drag touch consecutively moving in the left and right direction applied to a region displayed with the second screen information 300b while the edit mode is carried out. According to the present invention, the user may execute an edit mode with respect to specific screen information to convert the display format.

In the above disclosure, a method of converting the display format of a screen has been described. Through this method, the user may conveniently perform the conversion of the display format between screens on a mobile terminal in which multi-tasking is being carried out. Furthermore, a mobile terminal according to the present disclosure may perform the conversion of the display format of a screen through a simple touch manipulation with respect to a region displayed with screen information, thereby providing a method of allowing the user to intuitively controlling the display format of screen information.

Hereinafter, a method of allowing either one screen information to disappear while first screen information and second screen information are displayed concurrently. FIGS. 6A through 7B are conceptual views illustrating a method of allowing any one screen information to disappear or be minimized while first screen information and second screen information are displayed concurrently.

The controller 180 of a mobile terminal according to the present disclosure may cause displaying of first screen information and second screen information concurrently on the display unit 151.

The controller 180 may change the size of a region displayed with at least one of the first screen information and the second screen information in response to a user's control command applied while the first screen information and the second screen information are displayed concurrently on the display unit 151.

Moreover, the controller 180 may allow either one screen information of the first screen information and the second screen information to disappear or be minimized from the display unit 151 in response to the user's control command applied while the first screen information and the second screen information are displayed concurrently on the display unit 151.

Furthermore, when the either one screen information disappears from the display unit 151, the controller 180 may cause displaying of an indicator linked to the either one screen information on the display unit 151. An indicator linked to the either one screen information may be a graphic object linked to a function of displaying either one screen information.

An indicator linked to the either one screen information may be displayed on one region of the display unit 151. The one region may be a predetermined region or a region set based on a user's control command.

Through this, the user may recognize existence of either one screen information even after the either one screen information disappears from the display unit 151.

For example, as illustrated in the first drawing of FIG. 6A, the controller 180 may change the size of a region 600 displayed with the second screen information 300b based on a drag touch applied to the region 600 displayed with the second screen information 300b while the first screen information 310 and the second screen information 300b are displayed in a first display format.

As illustrated in the second drawing of FIG. 6A, the controller 180 may reduce the size of the region 600 displayed with the second screen information 300b in a direction in which the drag touch is applied. For example, when the drag touch is in a direction toward the left side of the display unit, a right portion of the region 600 displayed with the second screen information 300b may be gradually reduced.

When the size of the region 600 displayed with the second screen information 300b is reduced, the second screen information 300b may be changed from detailed information to summary information.

Furthermore, as illustrated in the third drawing of FIG. 6A, when the region 600 displayed with the second screen information 300b is reduced to a size that is less than a predetermined size based on the drag touch consecutively being applied, the controller 180 may allow the second screen information 300b to disappear from the display unit 151. In this case, the controller 180 may cause displaying of an indicator 610 linked to the screen information on the display unit 151.

The controller 180 may cause displaying of the indicator 610 on an edge region of the display unit 151 located in a direction in which the drag touch is applied. For example, as illustrated in the third drawing of FIG. 6A, the indicator 610 may be displayed at a left edge of the display unit 151 when the direction of the drag touch is a direction toward the left side of the display unit 151, the indicator 610 may be displayed at a left edge of the display unit 151.

Figure 6B:
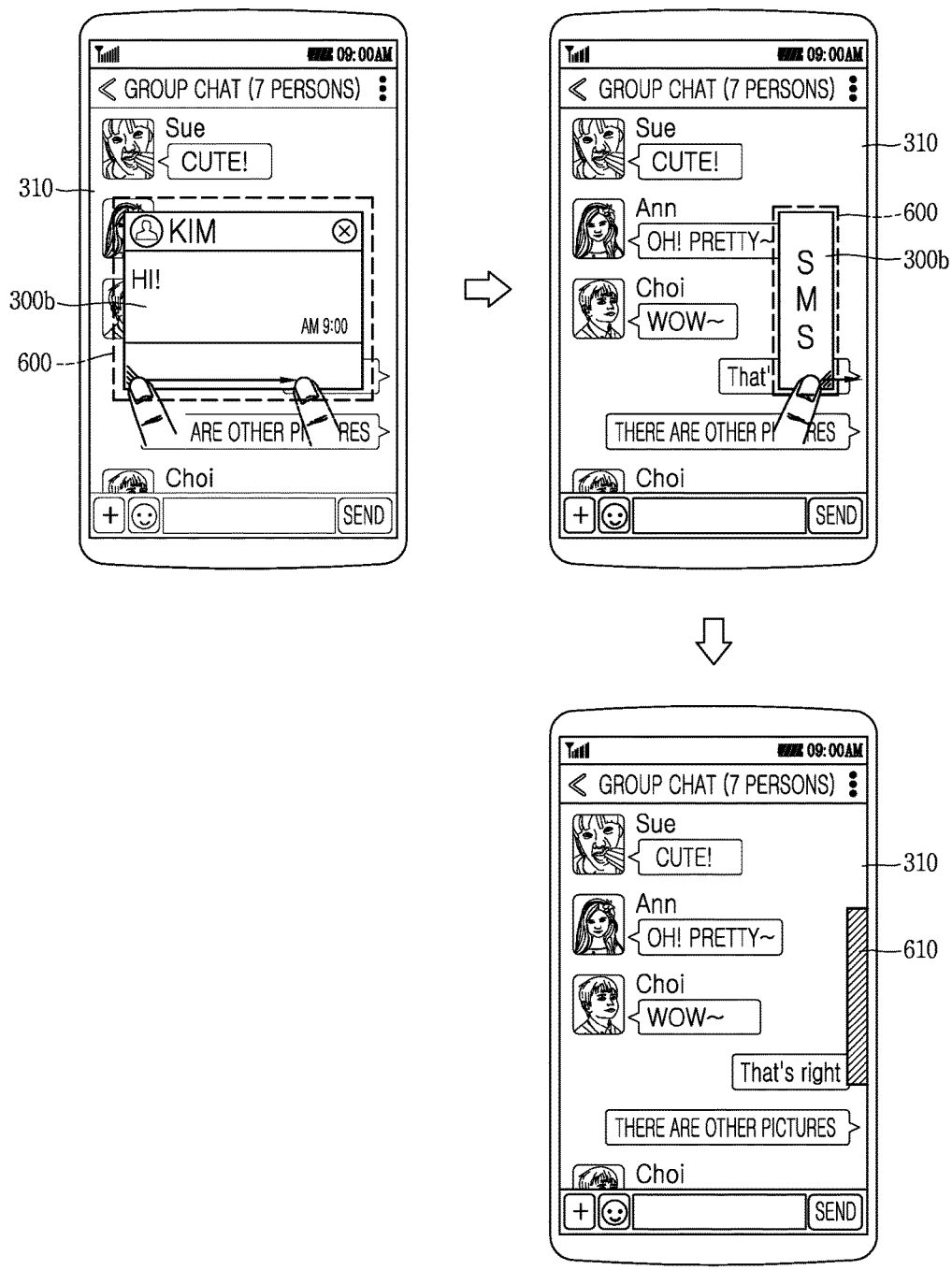
FIGS. 6A through 7B are conceptual views illustrating a method of minimizing or stopping displaying of one screen information while first screen information and second screen information are displayed concurrently.

Similarly, as illustrated in the first and the second drawings of FIG. 6B, the controller 180 may change a region 600 displayed with the second screen information 300b in response to a drag touch applied to the region displayed with the second screen information 300b.

As illustrated in the third drawing of FIG. 6B, when the direction of the drag touch is a direction toward the right side of the display unit 151, the indicator 610 may be displayed at a right edge of the display unit 151.

Furthermore, in a state that the second screen information is displayed as an indicator, the controller 180 may cause displaying of the second screen information again on the display unit 151 in response to a predetermined type of touch applied to the indicator.

Figure 6C:
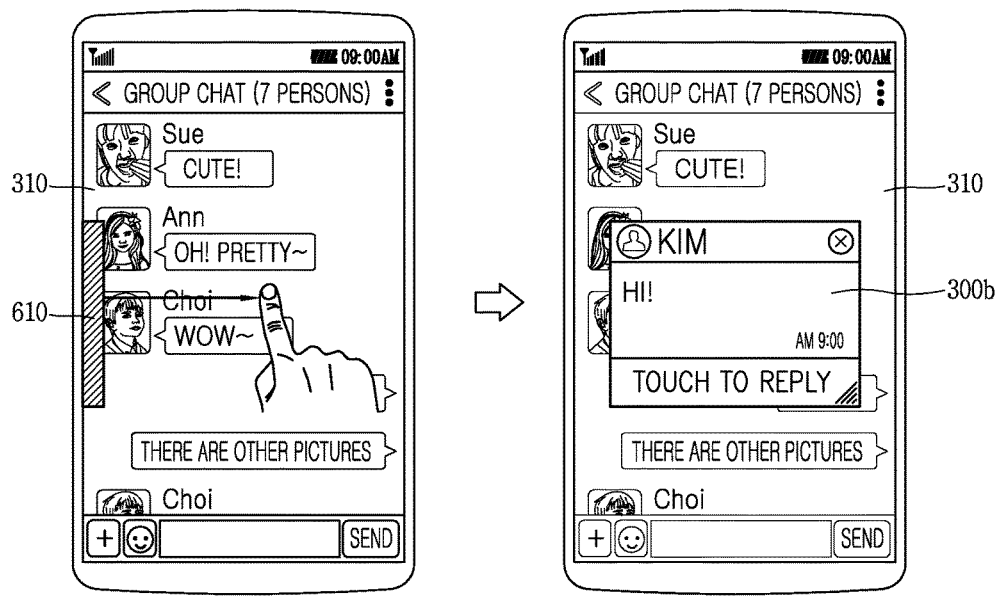

For example, as illustrated in the first and the second drawings of FIG. 6C, the controller 180 may cause displaying of the second screen information 300b again in response to a drag touch applied to the indicator 610 while the indicator 610 is displayed instead of the second screen information 300b.

On the other hand, the controller 180 may sense that an event has occurred on an application linked to the second screen information while an indicator is displayed instead of the second screen information. The event may be an operation of updating new information on an application or an operation of receiving a message or call signal from an external server or external terminal.

In this case, the controller 180 may cause displaying of second screen information including information associated with the event on the display unit 151 to allow the user to recognize the occurrence of the event.

Figure 6D:
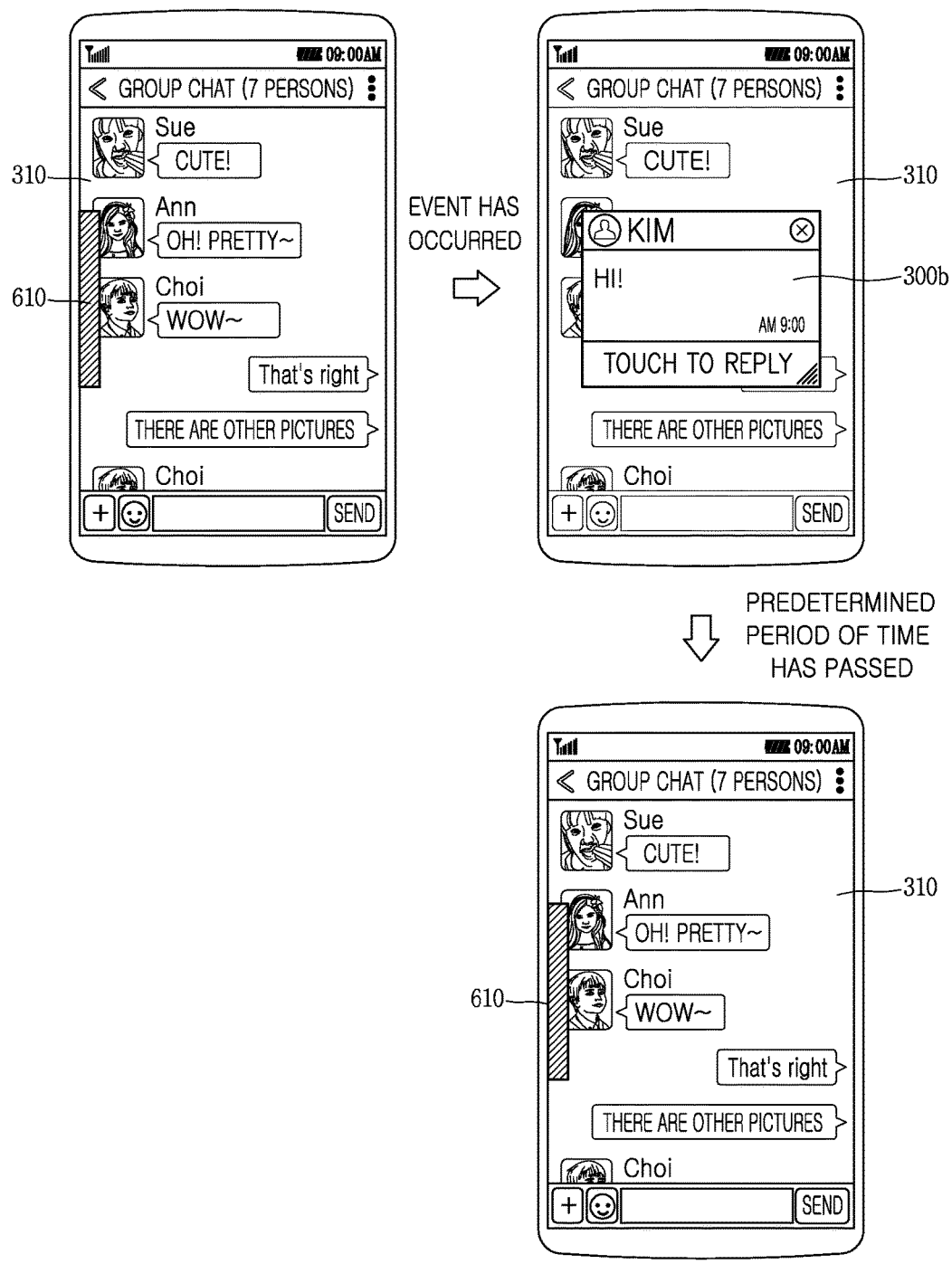

For example, as illustrated in the first drawing of FIG. 6D, the controller 180 may sense that a message has been received on a message application linked to the second screen information 300b while the indicator 610 representing the second screen information 300b is displayed. In this case, as illustrated in the second drawing of FIG. 6D, the second screen information 300b including the content of the message may be displayed on the display unit 151.

Alternatively, though not shown in the drawing, the controller 180 may provide an animation effect on the indicator instead of the content of the message. For example, the controller 180 may cause the size of the indicator to be increased or decreased. Through this, the user may recognize that an event has occurred on an application linked to the second screen information.

Furthermore, the controller 180 may cause displaying of second screen information including information associated with the event only for a predetermined period of time. In other words, when a predetermined period of time has passed, the controller 180 may allow second screen information including information associated with the event to disappear from the display unit 151. Accordingly, the user may receive first screen information without interfering with the second screen information while at the same time recognizing the occurrence of an event associated with the second screen information.

On the other hand, in the foregoing description, a case where first screen information and second screen information are displayed in a first display format has been described. Hereinafter, a case where first screen information and second screen information are displayed in a second display format will be described.

When first screen information and second screen information are displayed in a second display format, the controller 180 may control the size of a region displayed with each screen information based on a user's control command.

Figure 7A:
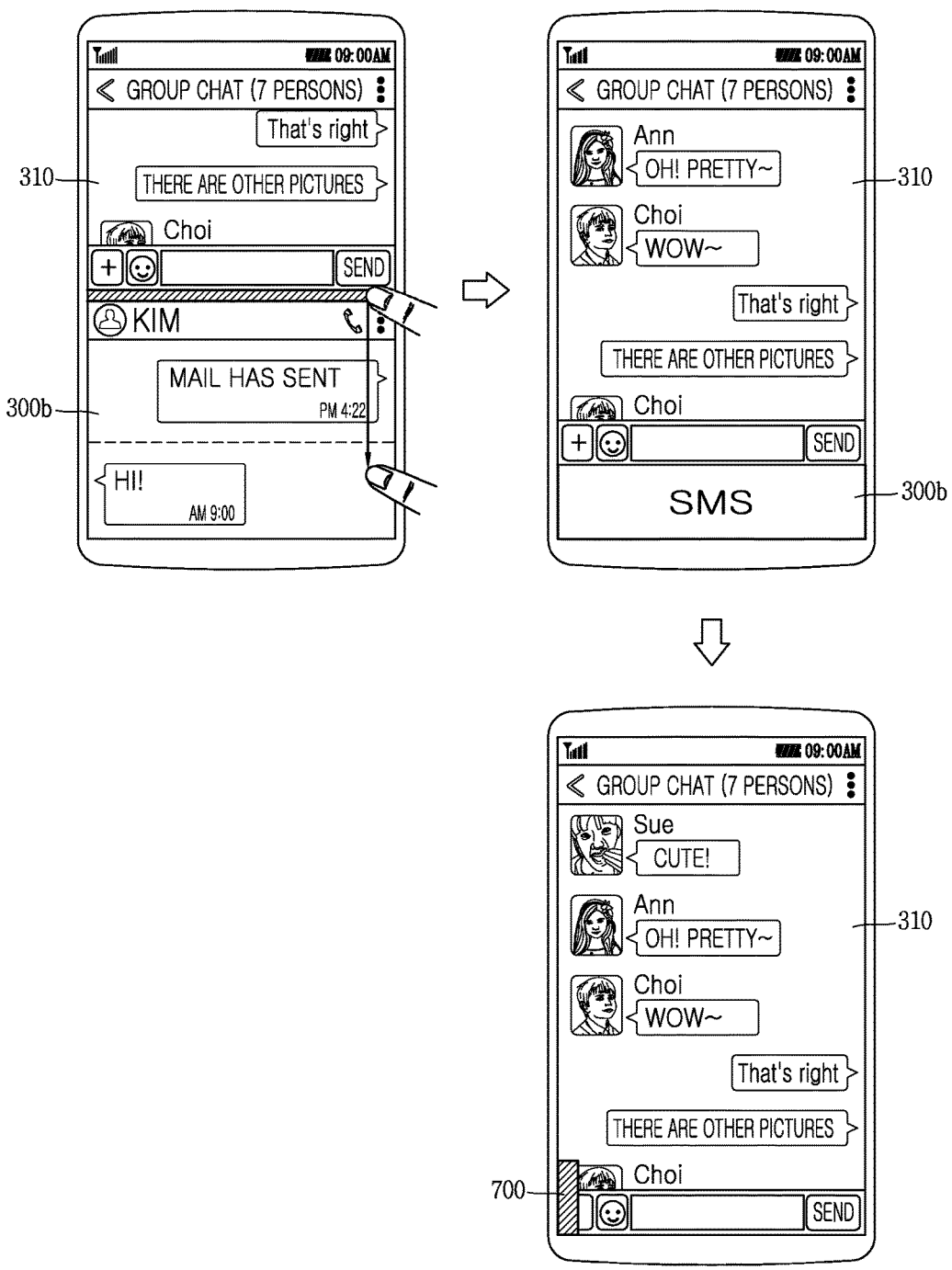
Figure 7B:
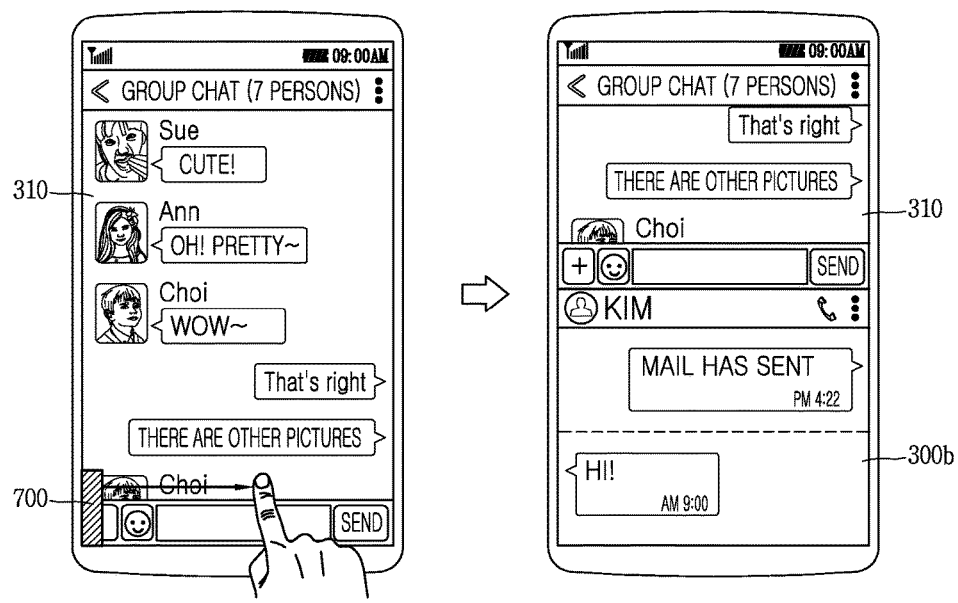

For example, as illustrated in the first drawing of FIG. 7A, the controller 180 may change the size of a region displayed with the first screen information 310 and a region displayed with the second screen information 300*b* based on a drag touch applied to a boundary region between the first screen information 310 and the second screen information 300*b*. More specifically, the region displayed with the first screen information 310 may increase to the extent of a size corresponding to a touch length of the drag touch, and the region displayed with the second screen information 300*b* may decrease to the extent of a size corresponding to a touch length of the drag touch.

Furthermore, when the size of a region displayed with the first screen information and second screen information is changed, the controller 180 may change the extent of displaying the first screen information and the second screen information. For example, as illustrated in the first drawing of FIG. 7A, when a region displayed with the first screen information 310 is enlarged, the controller 180 may further cause displaying of information that is not displayed prior to the enlargement of the region or included in the first screen information 310. When a region displayed with the second screen information 300*b* is reduced, the controller 180 may cause the display unit 151 to not display at least part of information that has been displayed prior to the reduction of the region.

Alternatively, as illustrated in the second drawing of FIG. 7A, when the displayed region is reduced, the controller 180 may cause displaying of information that has been displayed prior to the reduction of the region as summary information. The summary information is information in which the information is summarized in brief.

Moreover, when either one region of a region displayed with the first screen information and a region displayed with the second screen information is reduced to a size that is less than a predetermined size, the controller 180 may allow information displayed on the either one region to disappear from the display unit 151. For example, when a region displayed with the second screen information 300*b* is reduced to a size that is less than a predetermined size, the controller 180 may allow the second screen information 300*b* to disappear from the display unit 151.

Furthermore, when the second screen information 300*b* disappears from the display unit 151, the controller 180 may cause displaying of an indicator 700 linked to the second screen information 300*b*.

Similar to the foregoing description, the controller 180 may cause displaying of the second screen information 300*b* again in response to a predetermined type of touch applied to a region displayed with an indicator 700 linked to the second screen information 300*b*. For example, as illustrated in the first and the second drawings of FIG. 7B, the controller 180 may cause displaying of the second screen information 300*b* again on the display unit 151. At this time, the controller 180 may cause displaying of the second screen information 300*b* again in a display format displayed with the second screen information 300*b* prior to displaying the indicator 700. For example, as illustrated in the second drawing of FIG. 7B, when the second screen information 300*b* is displayed in a second display format prior to displaying of the indicator 700, the controller 180 may cause displaying of the second screen information 300*b* again in the second display format.

In the above, a method of allowing either one screen information to disappear from the display unit when first screen information and second screen information are displayed concurrently has been described. Through this, the user may intuitively control a plurality of screen information.

Hereinafter, a method of selecting second screen information to be displayed along with first screen information will be described. FIGS. 8A through 8D are conceptual views illustrating a method of selecting second screen information to be displayed along with first screen information.

The controller 180 of a mobile terminal according to the present disclosure may cause displaying of first screen information and second screen information concurrently on the display unit 151 based on a user's request or predetermined condition.

On the other hand, while first screen information is displayed, the controller 180 may determine information to be displayed as second screen information based on the user's selection.

To this end, while the first screen information 310 is displayed, the controller 180 may provide screen information including the icons of at least one application of a plurality of applications installed on the mobile terminal based on a predetermined type of touch applied to a specific region. Here, screen information including the icons of at least one application is referred to and described as an app list.

The predetermined type of touch may be a drag touch moving at a speed that is less than a predetermined speed on a specific region. The specific region may be a region displayed with an indicator linked to the foregoing second screen information.

In other words, a mobile terminal according to the present disclosure may immediately display second screen information in response to a drag touch moving at a speed that is greater than a predetermined speed applied to the indicator, and display an app list in response to a drag touch moving at a speed that is less than a predetermined speed applied to the indicator.

Figure 8A:
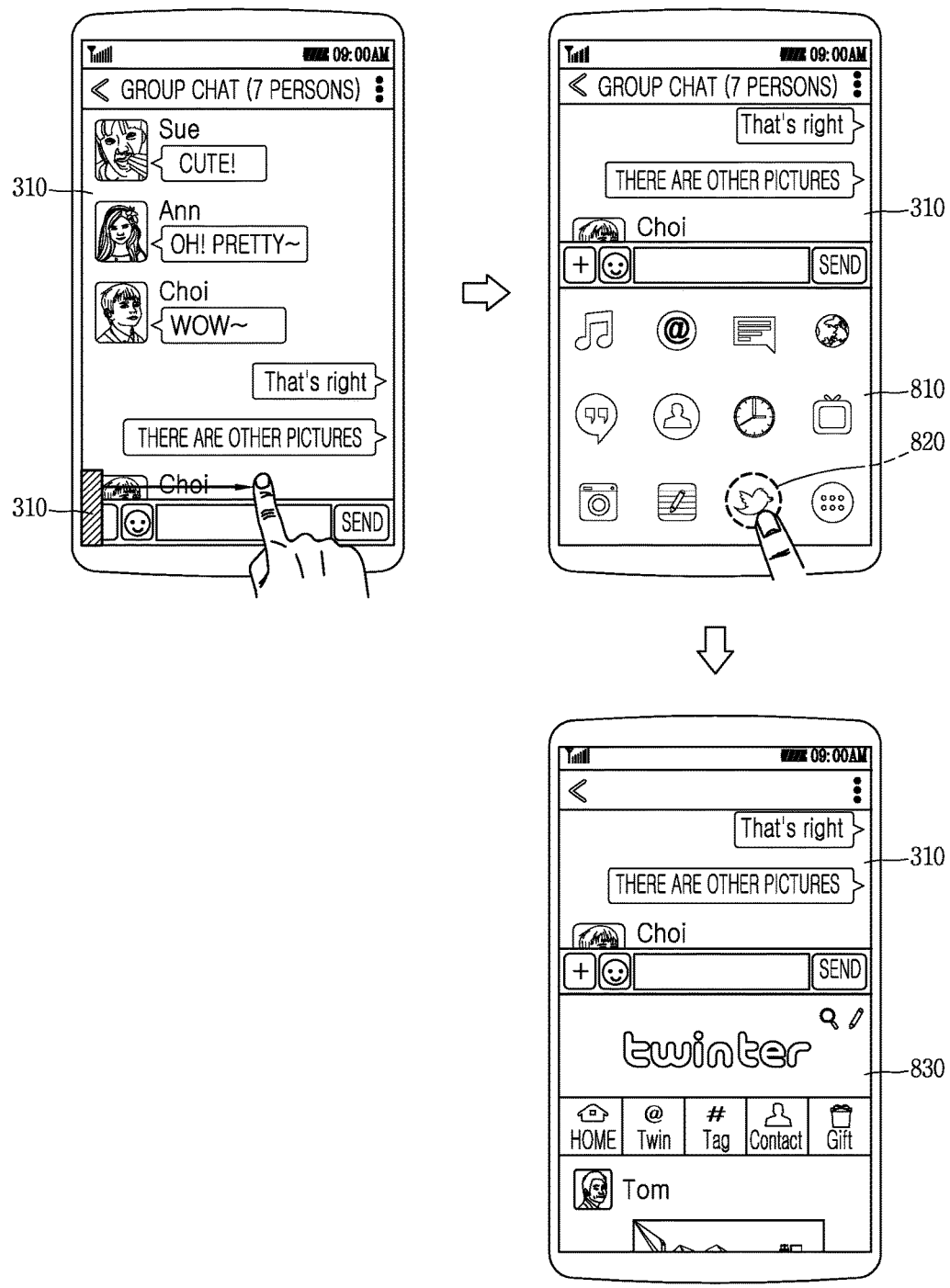
FIGS. 8A through 8D are conceptual views illustrating a method of selecting second screen information to display the second screen information with first screen information.

For example, as illustrated in the first drawing of FIG. 8A, the controller 180 may cause displaying of an app list 810 based on a drag touch at a speed that is less than a predetermined speed applied to a specific region 800 while the first screen information 310 is displayed.

As illustrated in the second drawing of FIG. 8A, the controller 180 may set an execution screen of an application corresponding to a specific icon 820 to second screen information in response to a touch applied to the specific icon 820 among the icons of at least one application included in the app list 810. In this case, as illustrated in the third drawing of FIG. 8A, the controller 180 may cause displaying of an execution screen 830 of an application corresponding to the specific icon 820 in a second display format along with the first screen information.

On the other hand, the controller 180 may determine a display position at which the execution screen of an application corresponding to the specific icon 820 is displayed based on a release point from which a touch to the specific icon is released.

Figure 8B:
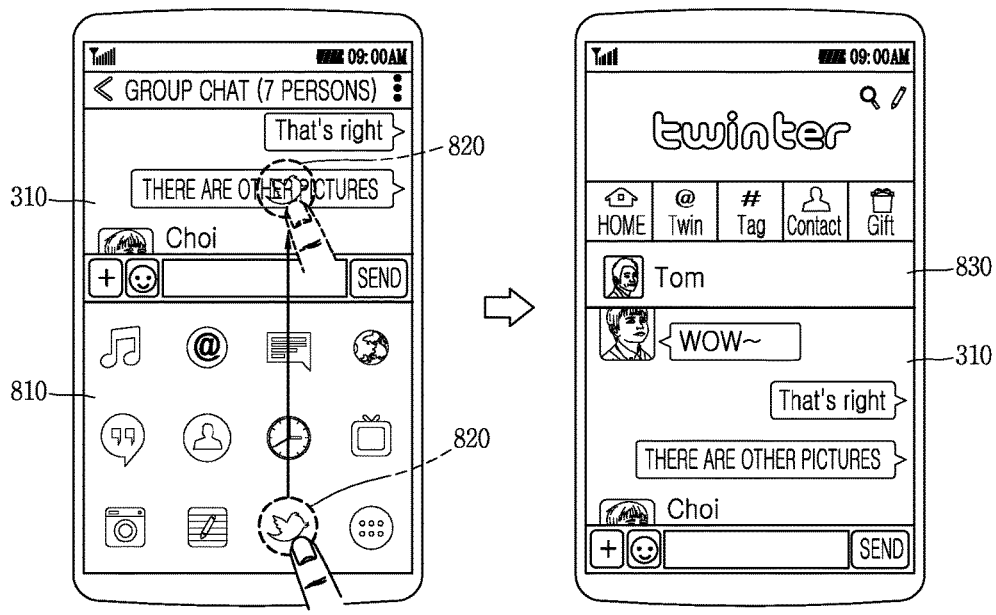

For example, as illustrated in FIG. 8B, the controller 180 may cause displaying of the execution screen 830 of an application corresponding to the specific icon 820 on a region displayed with the first screen information 310, and displaying of the first screen information 310 on a region displayed with the app list 810 based on a touch to the specific icon 820 released from one point of the region displayed with the first screen information 310.

Furthermore, the controller 180 may determine the display format of first screen information and second screen information according to the type of a touch applied to the specific icon.

Figure 8C:
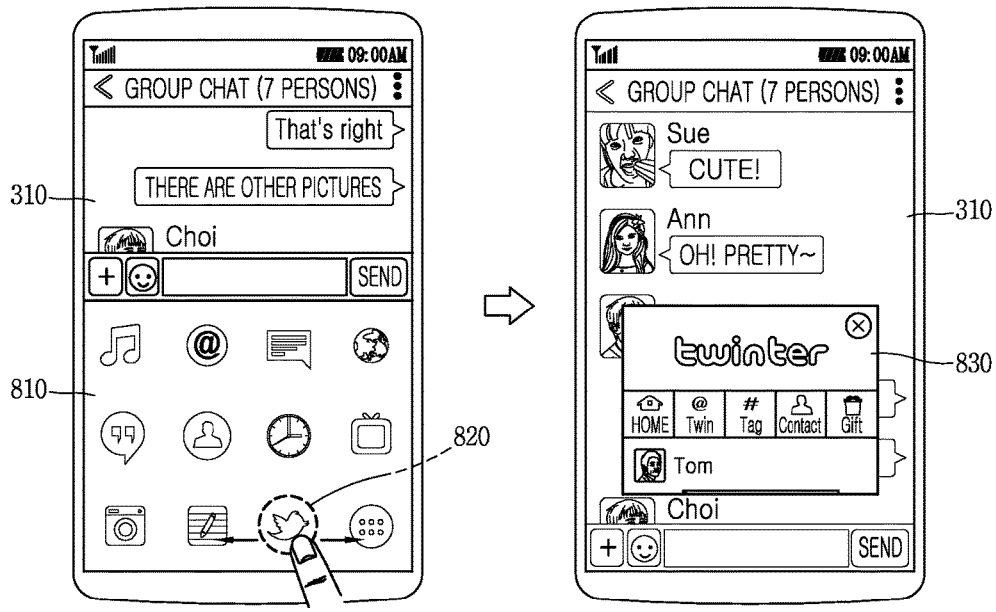

For example, as illustrated in the first drawing of FIG. 8C, the controller 180 may set the display format to a first display format based on a bidirectional drag touch horizontally moving with respect to the specific icon 820. In this case, as illustrated in the second drawing of FIG. 8C, the controller 180 may cause displaying of the first screen information 310 and the execution screen 830 of an application corresponding to the specific icon 820 in a first display format.

For another example, as illustrated in the second and the third drawings of FIG. 8A, the controller 180 may determine the display format in a second display format based on a short touch applied to the specific icon 820.

The controller 180 may determine the display format and display position of screen information at the same time based on a touch to the specific icon.

Figure 8D:
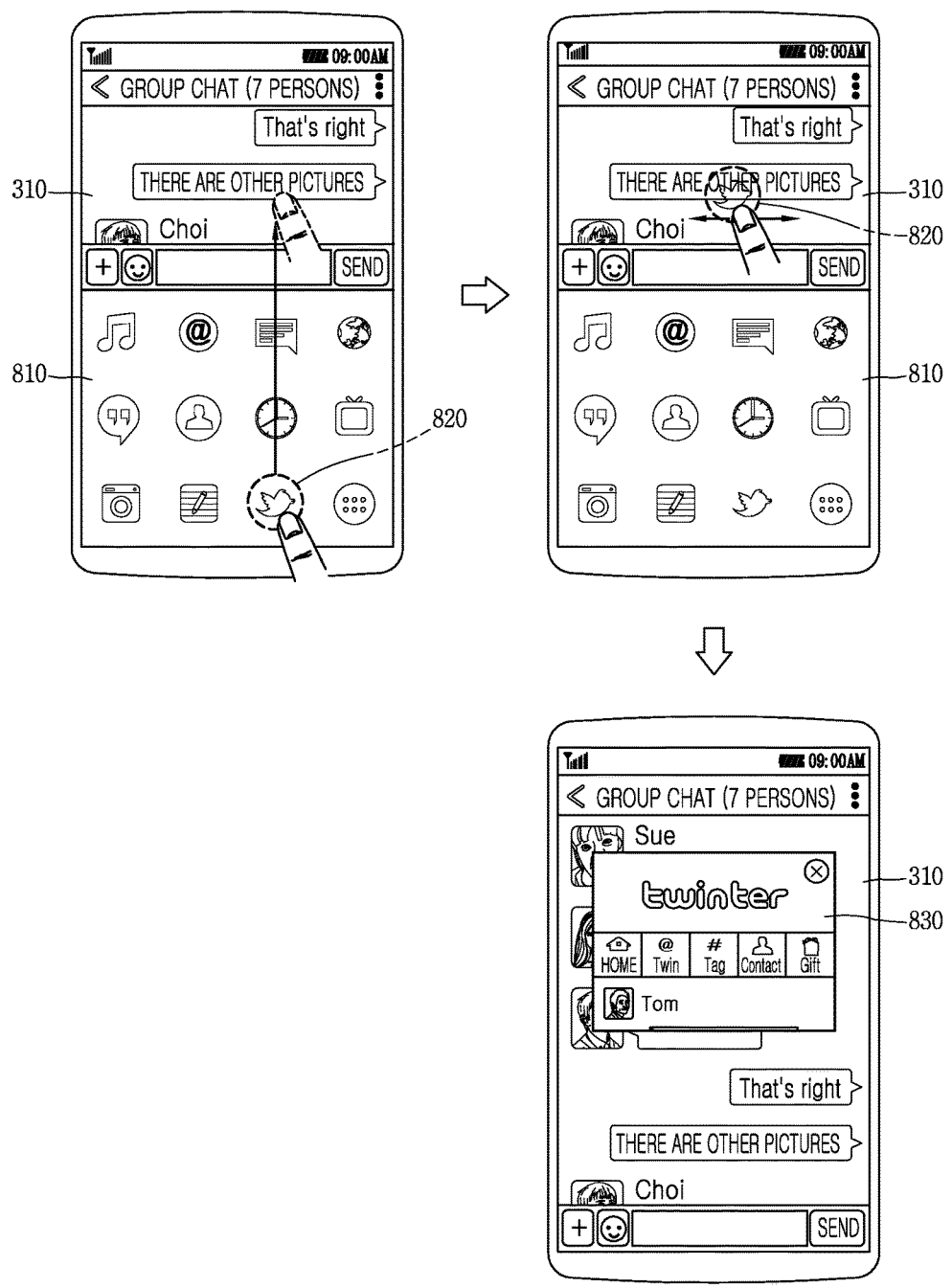

For still another example, as illustrated in the first drawing of FIG. 8D, the controller 180 may move the specific icon 820 to a region in which the first screen information 310 is displayed based on a drag touch applied to the specific icon 820.

When the specific icon 820 is moved to the region displayed with the first screen information 310, the controller 180 may cause displaying of the first screen information 310 and the execution screen 830 corresponding to the specific icon 820 in a first display format in response to a bidirectional drag touch consecutive to the drag touch applied to the specific icon 820.

In the above description, a method of selecting screen information to be displayed as second screen information and setting the display format and display position of the second screen information has been described. Accordingly, a user may intuitively control various controls associated with screen information to be displayed as second screen information through a simple touch based on the user's control command.

Figure 9A:
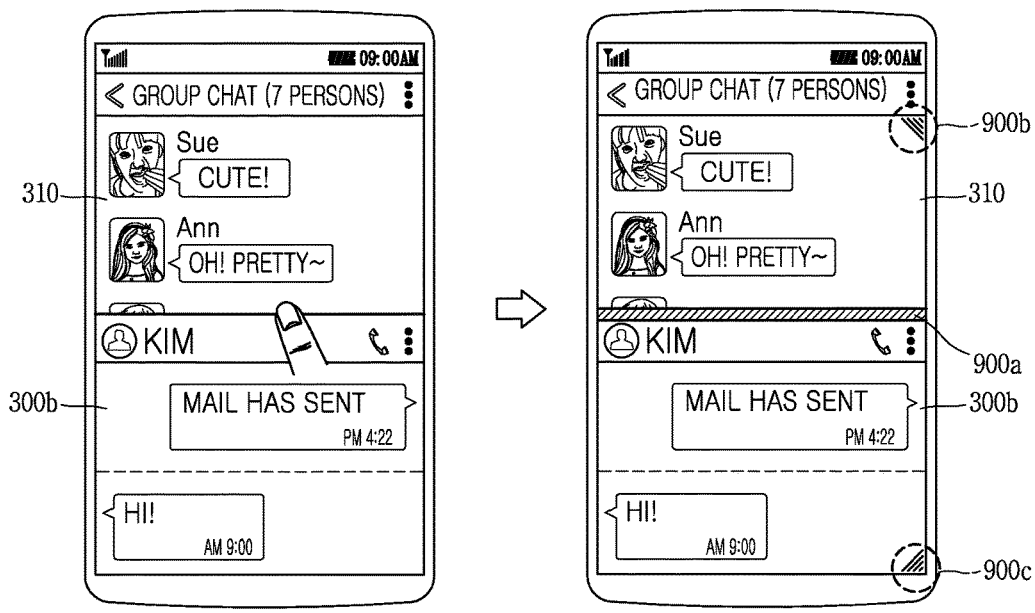
FIGS. 9A and 9B are conceptual views illustrating a method of changing a display position of first screen information and second screen information while the screen information is displayed in a second display format.
Figure 9B:
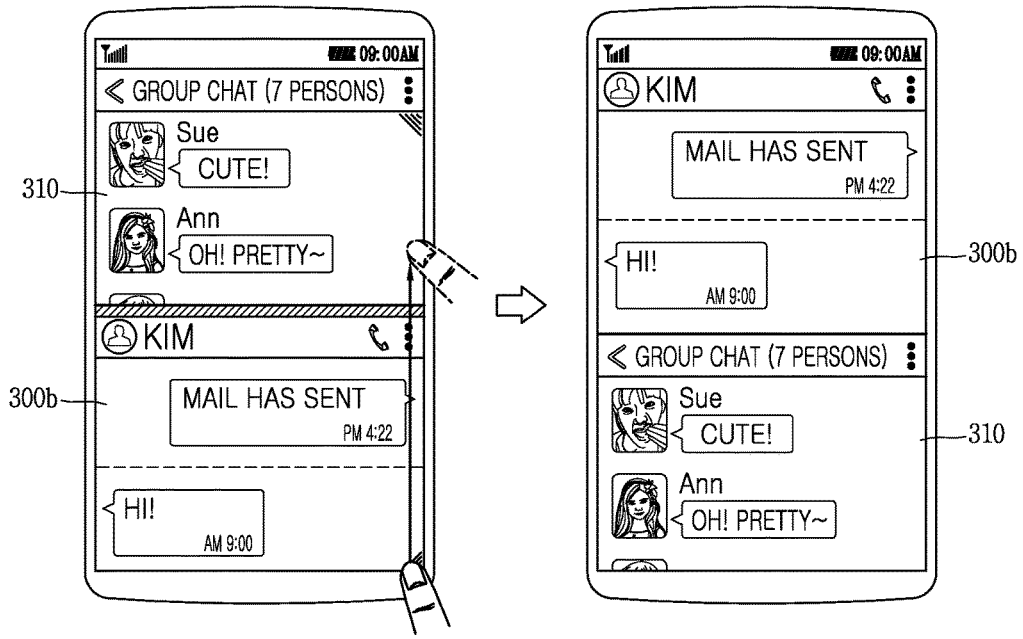

Hereinafter, a method of changing the display position of first screen information and second screen information when the screen information is displayed in a second display format will be described. FIGS. 9A and 9B are conceptual views illustrating a method of changing the display position of first screen information and second screen information when the screen information is displayed in a second display format.

The controller 180 of a mobile terminal according to the present disclosure may cause partitioning of the display unit 151 into a plurality of regions to cause displaying of first screen information and second screen information on their respective regions in a second display format.

The controller 180 may enter a position change mode based on a user's control command for changing a display position while displaying in the second display format. The position change mode denotes a state capable of changing a display position between at least two screen information respectively displayed on a corresponding region among a plurality of regions.

For example, as illustrated in the first drawing of FIG. 9A, the controller 180 may enter a position change mode based on a touch applied to a boundary region between first screen information and second screen information.

In this case, as illustrated in the second drawing of FIG. 9A, upon entering a position change mode, the controller 180 may cause displaying of guide images 900a, 900b, 900c for guiding a position change on the display unit 151.

While the guide images for guiding the position change are displayed, the controller 180 may change the display position of the first screen information and second screen information in response to a drag touch applied to a region displayed with the guide image. For example, as illustrated in the first and second drawings of FIG. 9B, the controller 180 may change the display position of the first screen information 310 and second screen information 300b in response to a drag touch started from a region displayed with the guide image 900c for guiding a position change and ended at a region displayed with the first screen information 310. Through this, the user may conveniently perform a position change between a plurality of regions.

Figure 10A:
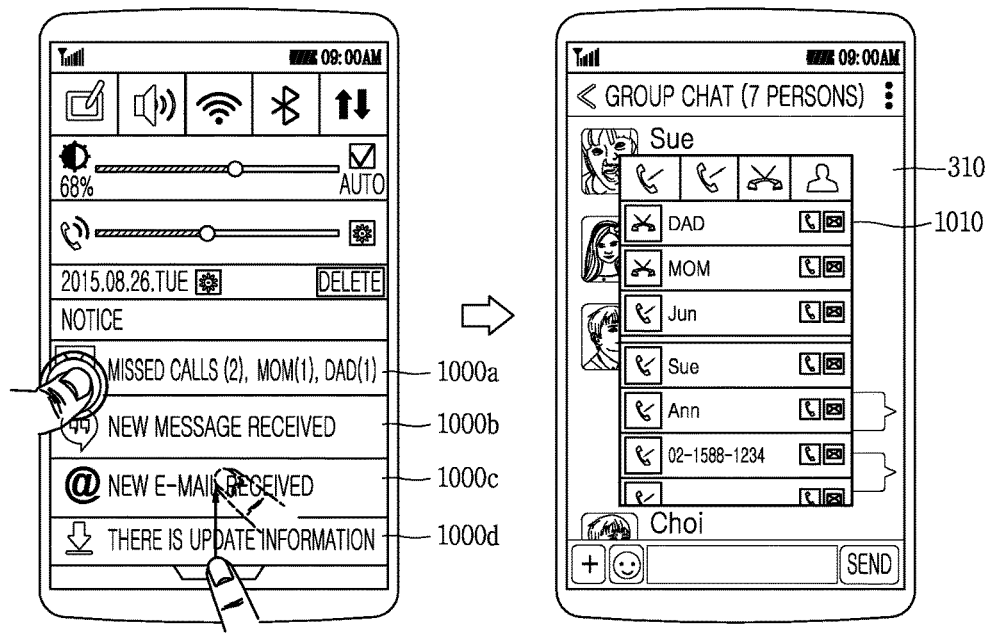
FIGS. 10A and 10B are conceptual views illustrating a method of performing multi-tasking using a notification screen.
Figure 10B:
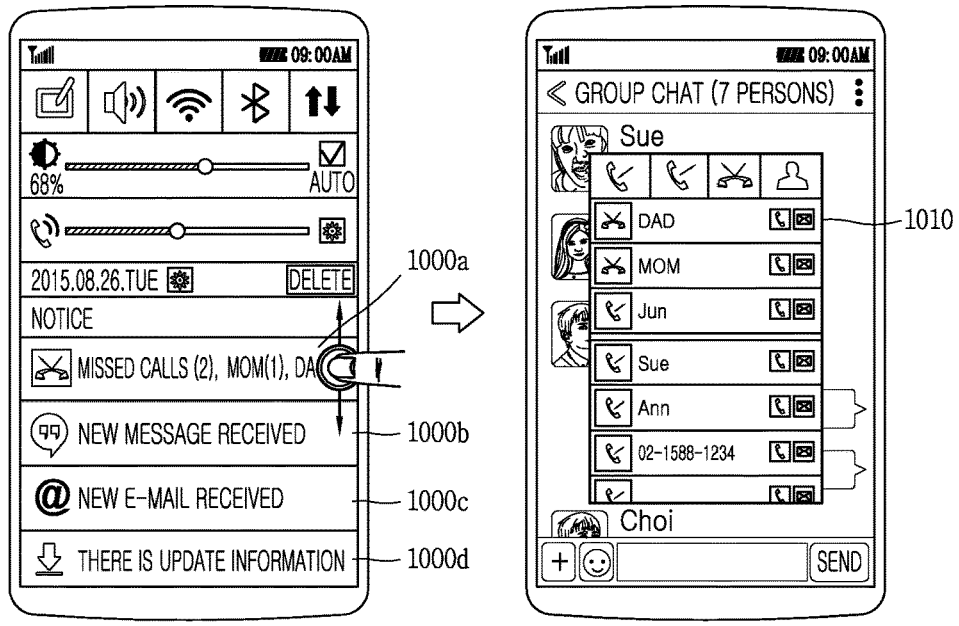

Hereinafter, a method of performing multi-tasking using a notification screen will be described. FIGS. 10A and 10B are conceptual view illustrating a method of performing multi-tasking using a notification screen.

In a mobile terminal according to the present disclosure, when an event occurs on at least one application of a plurality of applications installed on the mobile terminal, the controller 180 may cause displaying of notification information for notifying the occurrence of the event on a notification screen.

The notification screen may be a screen including notification information for notifying the operation information, screen brightness and occurrence of an event on a mobile terminal. Furthermore, the notification screen may include a message line indicating the current operation status of an application program, hotkeys of specific menus, minimized status information of some programs, and the like.

For example, the notification screen may include WiFi status information, data communication status information, Bluetooth communication status information, GPS status information, screen brightness control, message notification information, mail notification information, weather notification information, application update information, missed call notification information, and the like.

The notification screen may be displayed on the display unit 151 based on a drag touch applied to a specific region. For example, the controller 180 may cause displaying of the notification screen on the display unit 151 based on a drag touch applied to an upper end region of the display unit 151.

The notification screen may be replaced by the term of a status display screen, a status display region, a task bar, a status line, a dock bar, a dock, a panel, or the like.

When the notification screen includes notification information for notifying the occurrence of a plurality of events, the controller 180 may cause displaying of screen information associated with specific notification information in a first display format based on a predetermined type of touch applied to specific notification information among notification information for notifying the occurrence of a plurality of events.

The predetermined type of touch may be implemented in various touch modes. For example, the predetermined type of touch may be a touch applied to a plurality of touch points at the same time or vertically bidirectionally applied drag touch.

Furthermore, the screen information associated with the specific notification information may be displayed in a first display format along with screen information that has been displayed prior to displaying of a notification screen.

For example, as illustrated in the first drawing of FIG. 10A, the controller 180 may sense a second touch applied to a notification screen in a state that a first touch is applied to notification information 1000a for notifying a missed call among notification information 1000a, 1000b, 1000c, 1000d for notifying the occurrence of a plurality of events. In this case, as illustrated in the second drawing of FIG. 10A, the controller 180 may cause displaying of the first screen information 310 and call log information 1010 that have been displayed on the display unit 151 prior to displaying of the notification screen in a first display format.

For another example, as illustrated in the first drawing of FIG. 10B, the controller 180 may sense a vertically bidirectionally applied drag touch to the notification information 1000a for notifying a missed call among the notification information 1000a, 1000b, 1000c, 1000d for notifying the occurrence of a plurality of events. In this case, as illustrated in the second drawing of FIG. 10B, the controller 180 may cause displaying of the first screen information 310 and call log information 1010 that have been displayed on the display unit 151 prior to displaying of the notification screen in a first display format.

In the above description, a method of performing multi-tasking using a notification screen has been described. Through this, the user may execute an event occurred application in a multi-tasking manner.

Hereinafter, a method of performing multi-tasking during the execution of a message application will be described. FIGS. 11A through 13C are conceptual views illustrating a method of performing multi-tasking during the execution of a message application.

A mobile terminal according to the present disclosure may display screen information corresponding to two or more functions concurrently on the display unit 151.

On the other hand one application may provide two or more functions. For example, the message application may provide a function of displaying the content of messages transmitted to and received from an external terminal and a function of playing a video included in a specific message.

The controller 180 may provide screen information corresponding to two or more functions provided from the one application at the same time on the display unit 151.

Figure 11A:
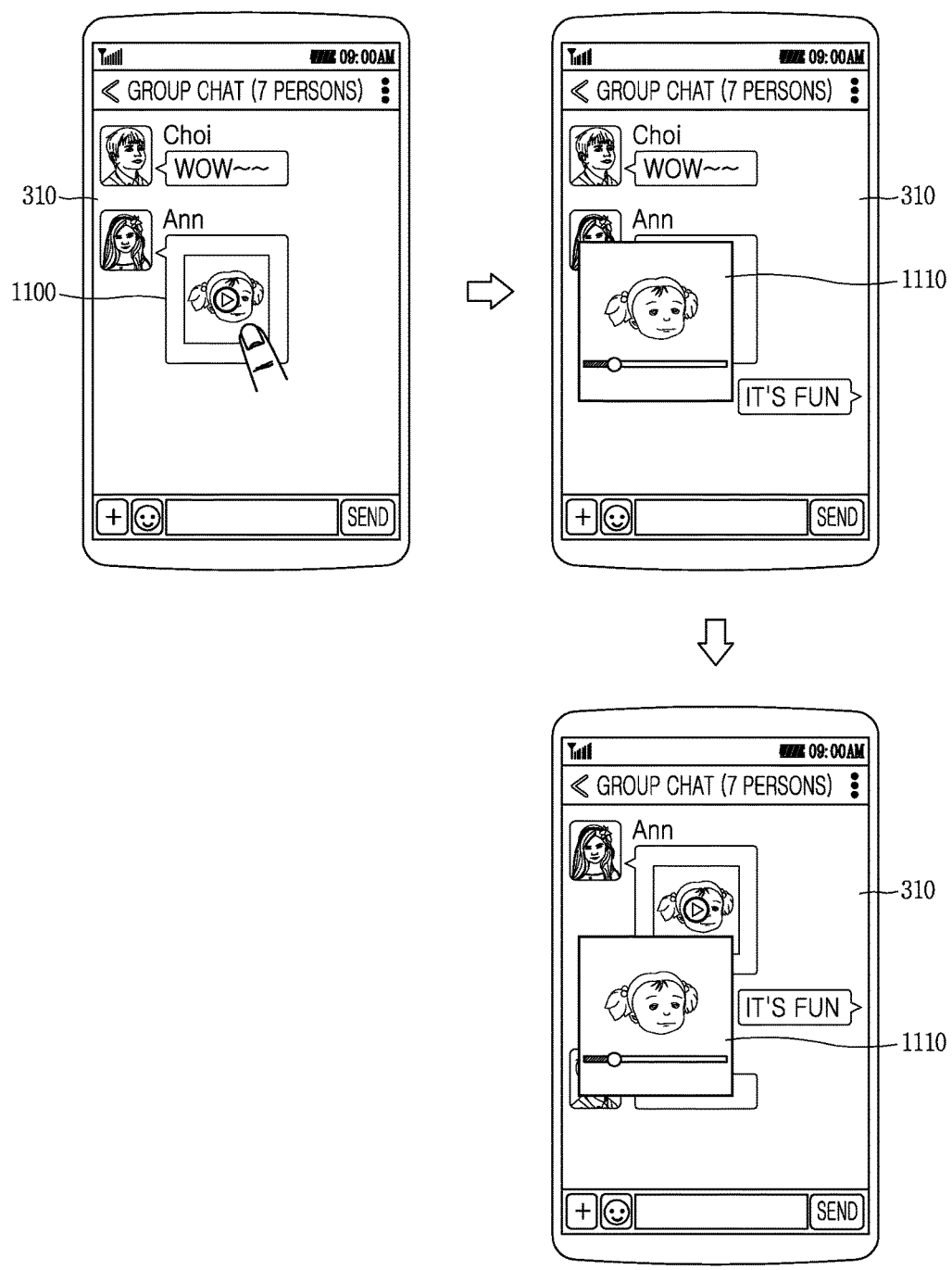
FIGS. 11A through 13C are conceptual views illustrating a method of performing multi-tasking during execution of a message application.

For example, as illustrated in FIG. 11A, the controller 180 may cause displaying of the first screen information 310 including the content of messages transmitted to and received from an external terminal on the display unit 151. The first screen information 310 may include a message 1100 including video data.

At this time, the controller 180 may cause displaying of the playback screen 1110 of a video as second screen information on the first screen information 310 in an overlapping manner in response to a user's request for video playback. In other words, the controller 180 may cause displaying of the first screen information 310 and the playback screen 1110 of a video in a first display format.

When a new message is received from an external terminal during the playback of the video, the controller 180 may cause displaying of the content of the new message on the first screen information 310. For example, as illustrated in the third drawing of FIG. 11A, the controller 180 may cause displaying of the content of a new message. In other words, the controller 180 may perform updating of first screen information regardless of the playback of a video. The updating denotes an operation of adding new information to the existing information or changing the existing information to new information.

Moreover, though not shown in the drawing, even when a message including the video data disappears from the first screen information by the updating of the first screen information, the controller 180 may cause displaying of the playback screen 1110 of the video on the display unit 151. In other words, the controller 180 may maintain the playback of the video. Accordingly, the user may receive a latest message and a video at the same time.

Furthermore, the controller 180 may perform a different function according to a touch mode with respect to the video playback screen 1110. The different function as a function associated with a video may include a function of changing the display format of the video playback screen 1110, a function of storing a video in the memory 170, and the like.

Figure 11B:
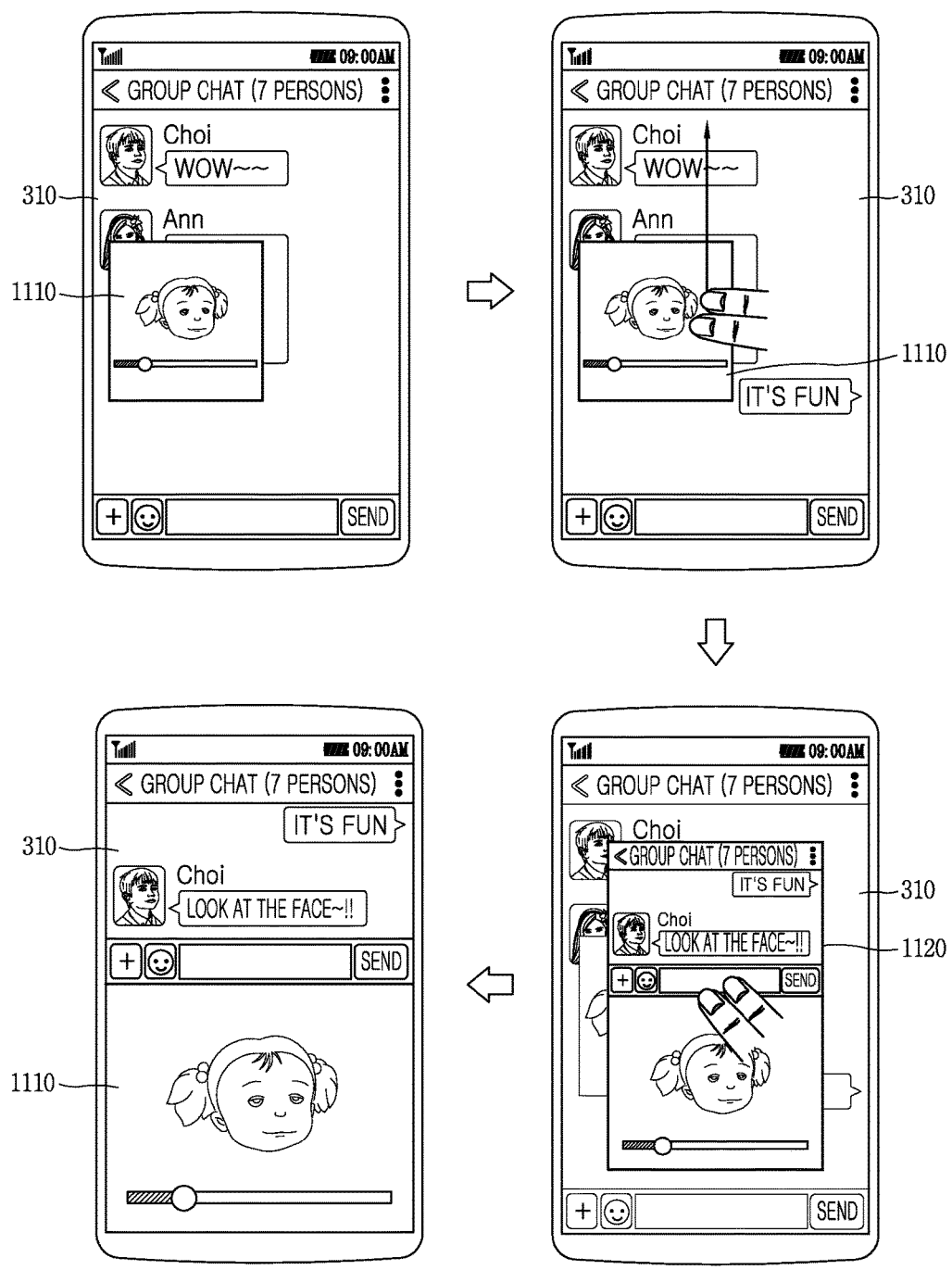

For example, as illustrated in FIG. 11B, the controller 180 may cause displaying of notification information 1120 for notifying that it can be changed to a second display format based on a drag touch having at least two touch points with respect to the video playback screen 1110 and moving from the bottom to the top. The controller 180 may cause displaying of the first screen information 310 and video playback screen 1110 in a second display format based on a multi-touch applied to the notification information 1120.

Figure 11C:
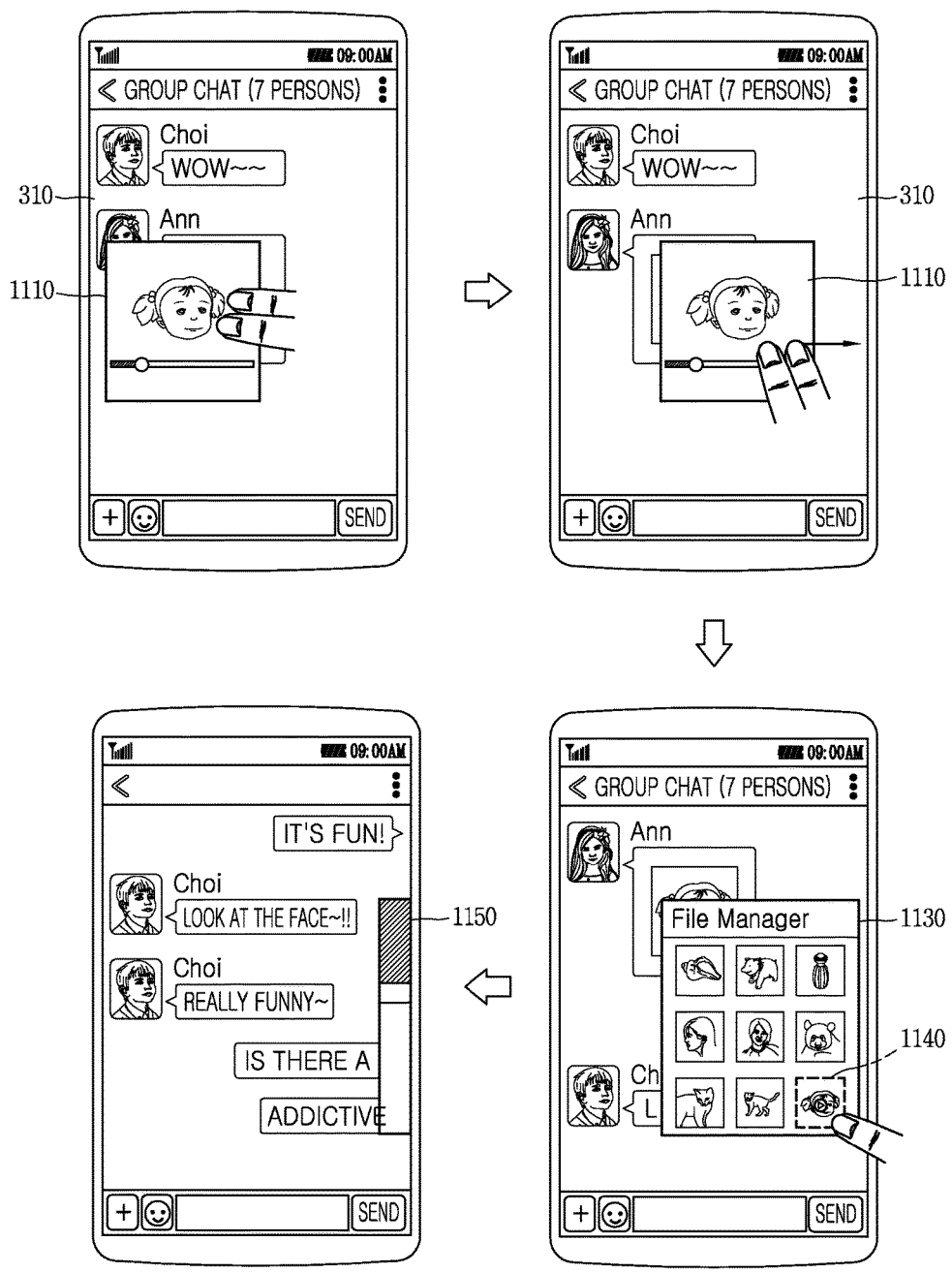

For another example, as illustrated in FIG. 11C, the controller 180 may cause displaying of screen information 1130 for determining a position at which a video is to be stored (or downloaded) based on a drag touch having at least two touch points with respect to the video playback screen 1110 and moving from the left to the right.

The screen information for determining a position at which a video is to be stored (or downloaded) may include screen information such as a preset folder on the memory, create a new folder, and the like. The screen information for determining a position (or path) to store (or download) the video may be understood as the screen information of functions referred to as "file manger," "data manager," and the like. The folder (or directory) may be a specific region of the memory for storing files.

The user may select a storing location of a video using screen information for determining a location at which the video is to be stored. For example, as illustrated in the third drawing of FIG. 11C, a specific folder 1140 may be selected as a storing location of the video.

In this case, the controller 180 may cause storing of a video at the selected storing location. Furthermore, as illustrated in the fourth drawing of FIG. 11C, when the video is stored, a progress bar 1150 indicating the progress of storing the video may be displayed on the display unit 151.

When the storing of the video is completed, the controller 180 may allow the progress bar to disappear from the display unit 151. In this case, though not shown in the drawing, a thumbnail image (or representative image) of the stored video may be displayed on the display unit 151.

On the other hand, the controller 180 may cause displaying of an app list in a bookmark shape based on a predetermined type of touch applied to a specific region of the display unit 151 while displaying the execution screen of a specific application.

Figure 12:
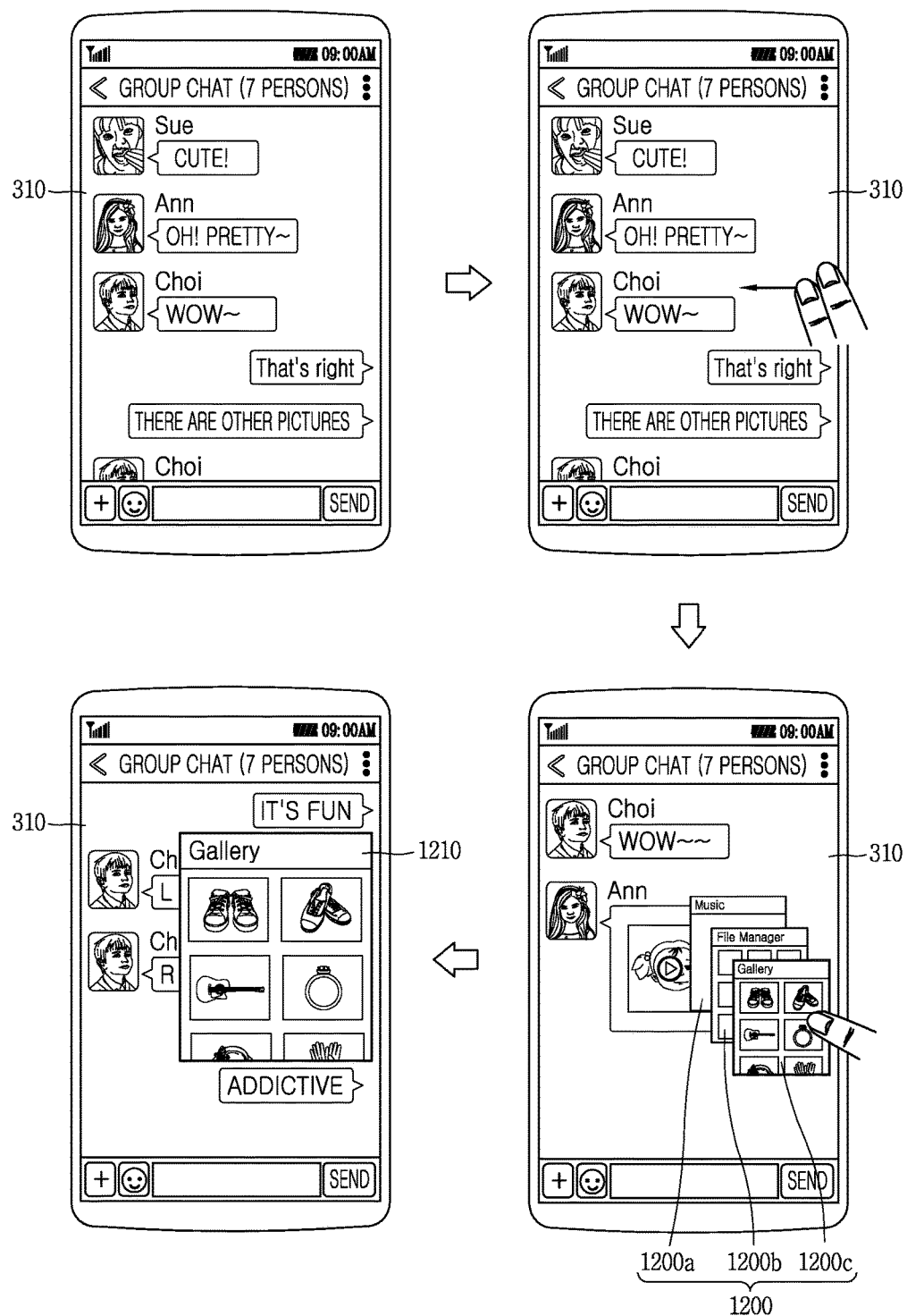

For example, as illustrated in the first and the second drawing of FIG. 12, the controller 180 may sense a drag touch moving toward the center from a right edge region of the display unit 151 while the execution information 310 of a message application is displayed.

In this case, as illustrated in the third drawing of FIG. 12, the controller 180 may cause displaying of an app list 1200 on the execution information 310 of the message application in an overlapping manner. The app list may include thumbnail images 1200a, 1200b, 1200c corresponding to currently executed applications.

As illustrated in the fourth drawing of FIG. 12, the controller 180 may cause displaying of an execution screen 1210 of a gallery application on the execution information 310 of the message application in an overlapping manner based on the selection of the thumbnail image 1200c corresponding to the gallery application on the app list 1200.

On the other hand, the message application may include a plurality of dialog boxes. Here, a dialog box denotes screen information for displaying the content of a message. The plurality of dialog boxes may have different external terminals for transmitting messages.

For example, a first dialog box is a dialog box for displaying a message transmitted to or received from a first external terminal, and a second dialog box is a dialog box for displaying a message transmitted to or received from a second external terminal.

When a new message is received from an external terminal included in the second dialog box while the first dialog box among a plurality of dialog boxes is displayed on the display unit 151, the controller 180 may cause displaying of the first dialog box and the second dialog box at the same time.

Figure 13A:
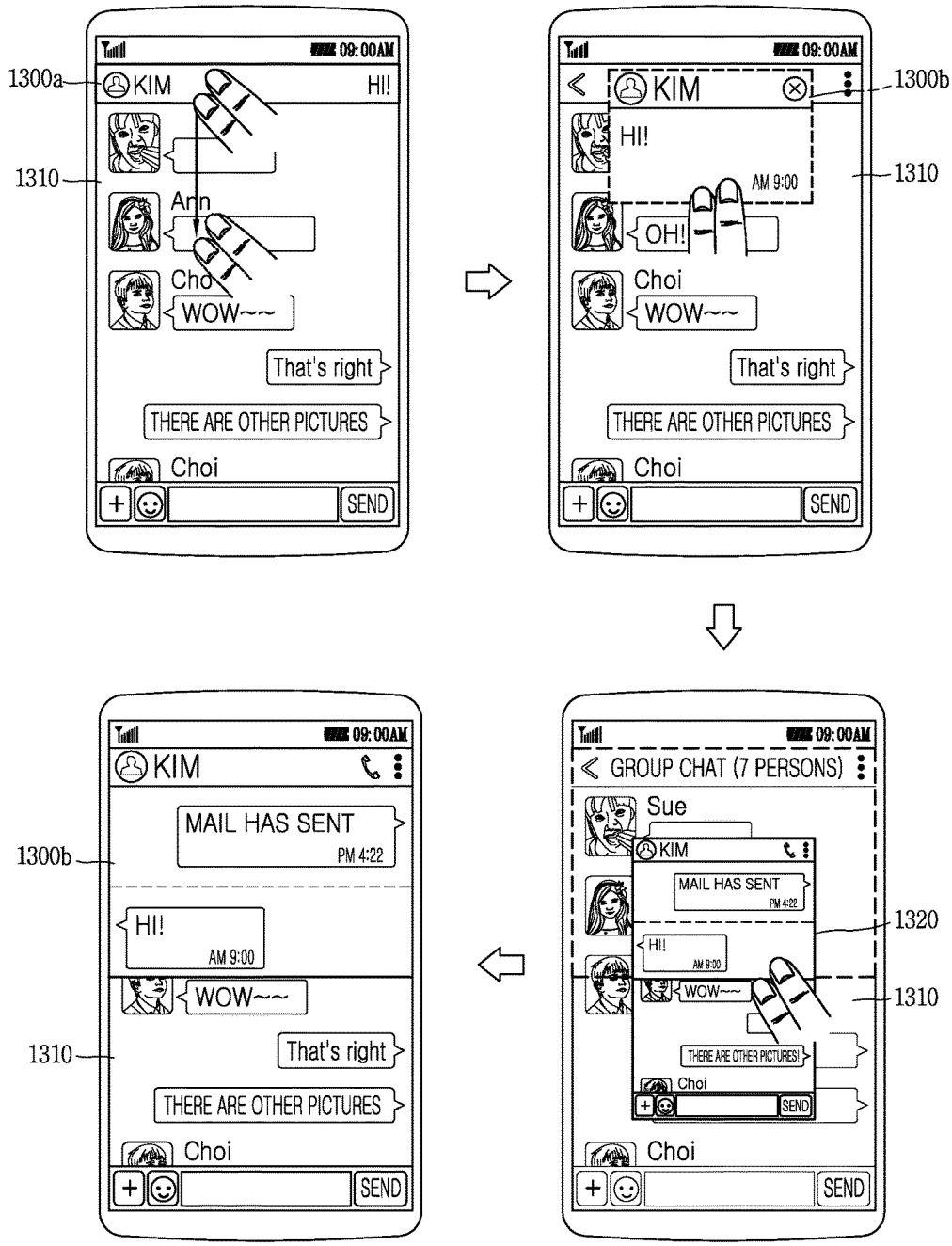

For example, as illustrated in the first drawing of FIG. 13A, when a new message is received at the second dialog box while the first dialog box among a plurality of dialog boxes is displayed on the display unit 151, the controller 180 may cause displaying of notification information 1300a for notifying the new message received.

At this time, as illustrated in the first and the second drawings of FIG. 13A, when a drag touch applied to two touch points at the same time is applied to the notification information 1300a for notifying a new message, the controller 180 may cause displaying of the second dialog box 1300b on the first dialog box 1310 in a pop-up manner.

Furthermore, as illustrated in the third drawing of FIG. 13A, the controller 180 may cause displaying of notification information 1320 indicating that the first dialog box 1310 and second dialog box 1300b can be displayed in a second display format on the display unit 151 based on a drag touch applied to two touch points at the same time with respect to the second dialog box 1300b.

At this time, as illustrated in the fourth drawing of FIG. 13A, when a multi-touch is applied to the notification information 1320 indicating that the first dialog box 1310 and second dialog box 1300b can be displayed in a second display format, the controller 180 may cause displaying of the first dialog box 1310 and the second dialog box 1300b in a second display format.

When a multi-touch is not applied to the notification information 1320 indicating that the first dialog box 1310 and second dialog box 1300b can be displayed in a second display format, the controller 180 may maintain the first display format of the first dialog box 1310 and the second dialog box 1300b.

Figure 13B:
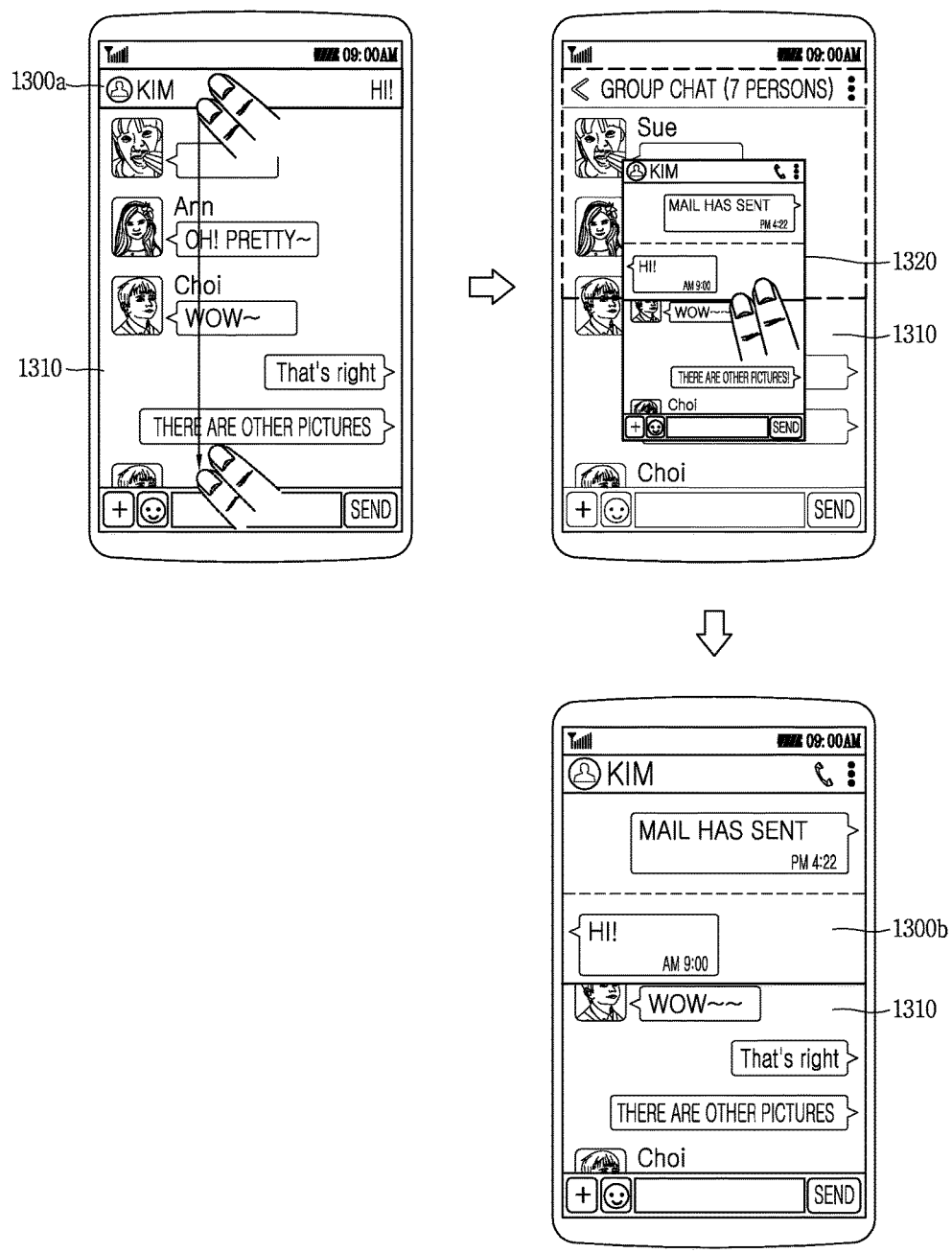

On the other hand, as illustrated in the first and second drawings of FIG. 13B, when a drag touch applied to two touch points at the same time with respect to the notification information 1300a for notifying the new message is sensed for more than a predetermined length, the controller 180 may cause immediate displaying of the notification information 1320 indicating that the first dialog box 1310 and the second dialog box 1300b can be displayed in a second display format.

In this case, as described above, the controller 180 may cause displaying of the first dialog box 1310 and the second dialog box 1300b in either the first display format or the second display format based on a touch applied to the notification information 1320 indicating that the first dialog box 1310 and the second dialog box 1300b can be displayed in a second display format.

Alternatively, when a drag touch applied to two touch points at the same time is applied to the notification information 1300a for notifying the new message, the controller 180 may cause displaying of the first dialog box 1310 and the second dialog box 1300b in a second display format.

Figure 13C:
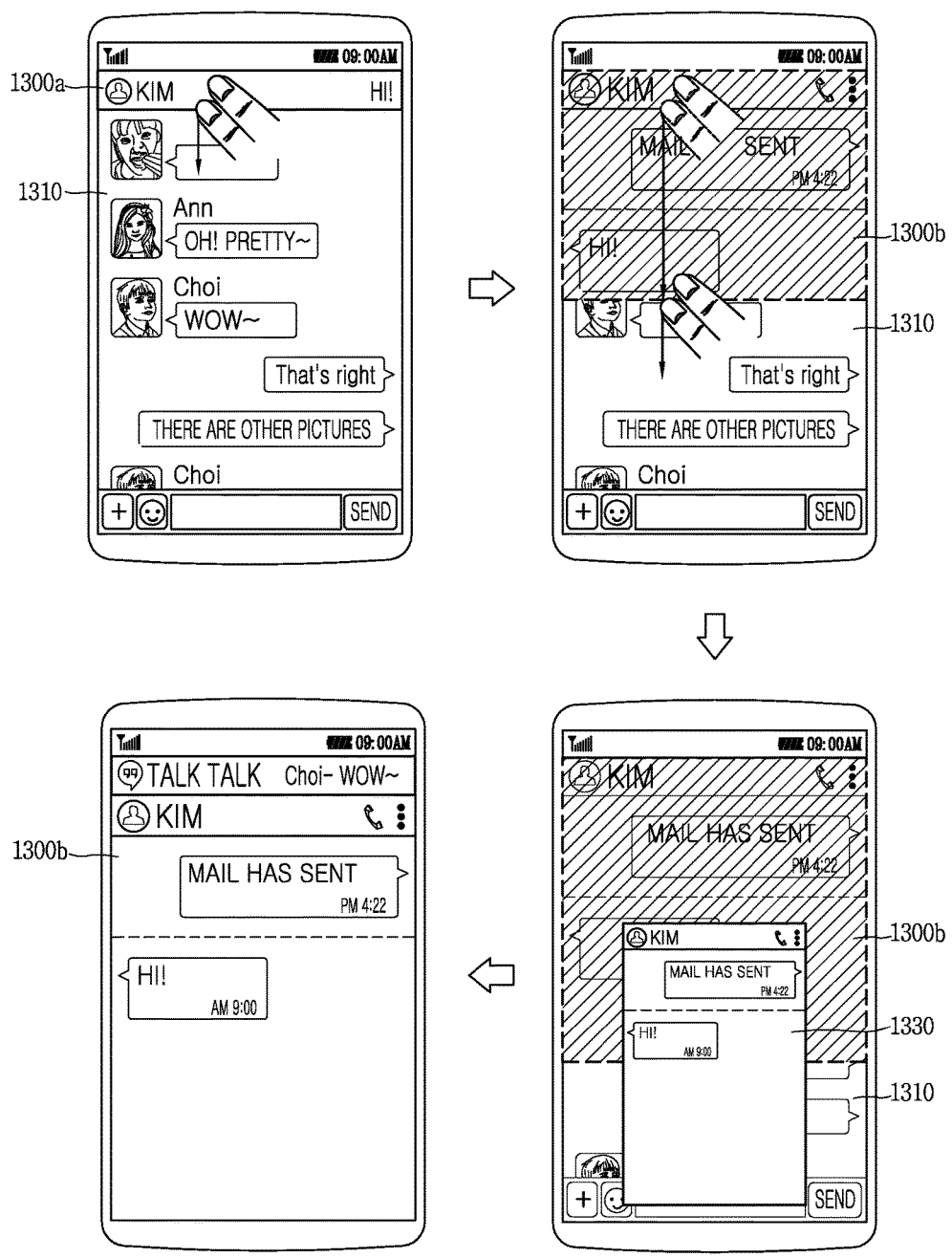

Then, as illustrated in the third drawing of FIG. 13C, when a drag touch applied to two touch points at the same time with respect to the notification information 1300a for notifying the new message is sensed for more than a predetermined length, the controller 180 may cause displaying of notification information 1330 indicating that only the second dialog box 1300b can be displayed on the display unit 151.

When a touch is released while the notification information 1330 indicating that only the second dialog box 1300b can be displayed is displayed, the controller 180 may cause displaying of only the second dialog box 1300b on the display unit 151.

In the above description, a method of displaying a plurality of dialog boxes included in a message application has been described.

The present disclosure may convert and display the display format of a plurality of screen information. Accordingly, the user may receive a suitably converted display format without going through various steps.

Furthermore, the present disclosure may provide a plurality of screen information at the same time, thereby conveniently performing an interaction between each screen information.

On the other hand, when part of screen information among a plurality of screen information is hidden and not seen from other screen information, a mobile terminal according to the present disclosure may provide distorted part of screen information to the user. Hereinafter, a method of providing part of screen information that is hidden and not seen from other screen information will be described.

Figure 14:
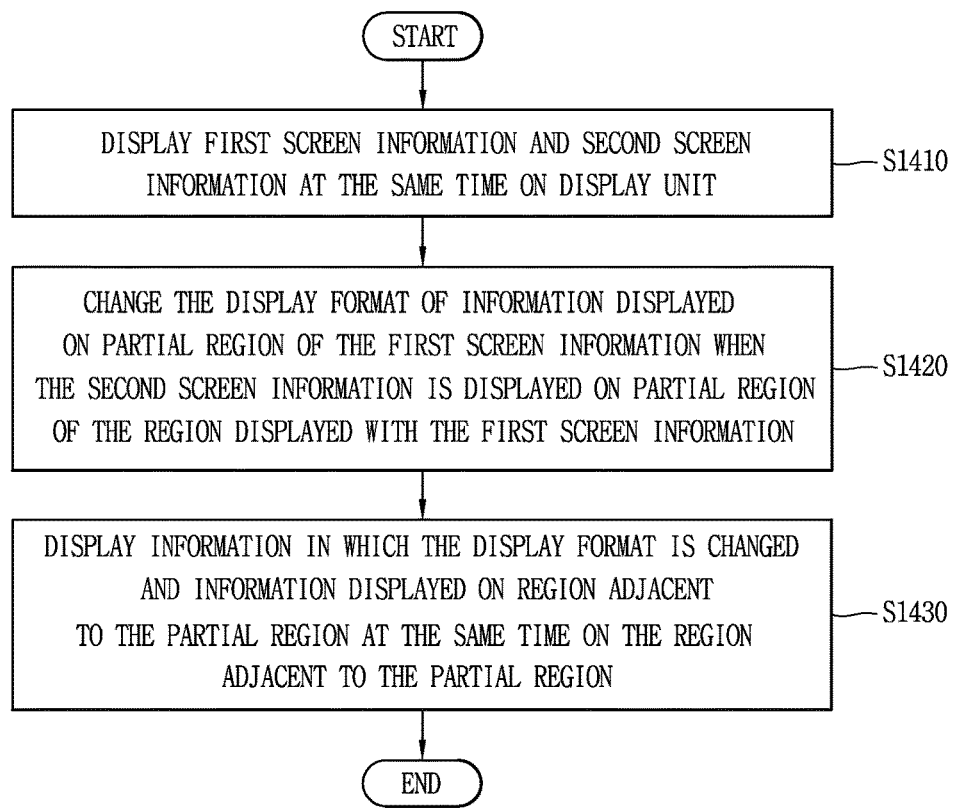
FIG. 14 is a flow chart illustrating a control method of displaying a plurality of screen information on a mobile terminal according to the present disclosure.
Figure 15:
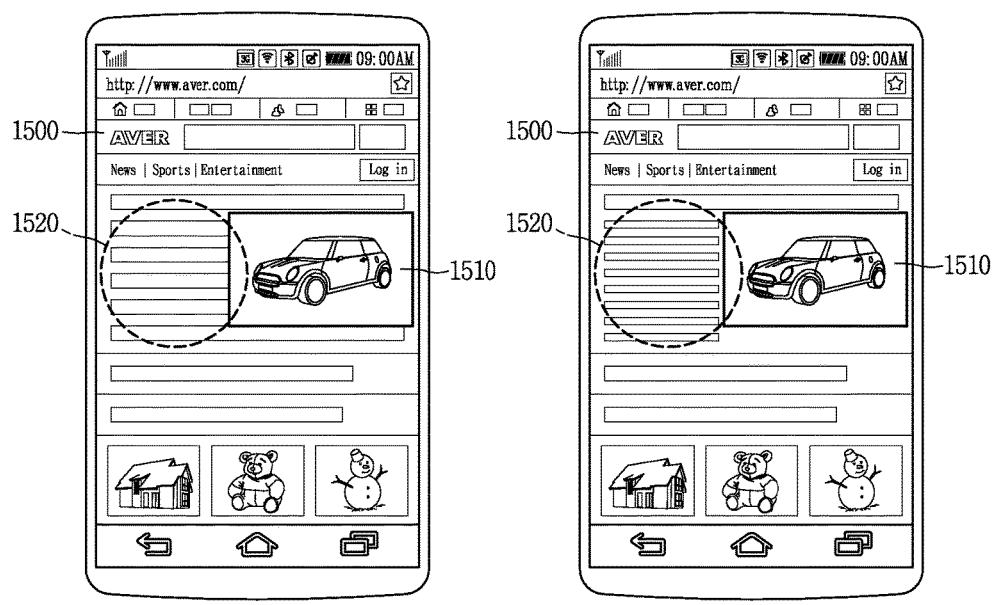
FIGS. 15 through 17 are conceptual views illustrating the control method of FIG. 14.
Figure 16:
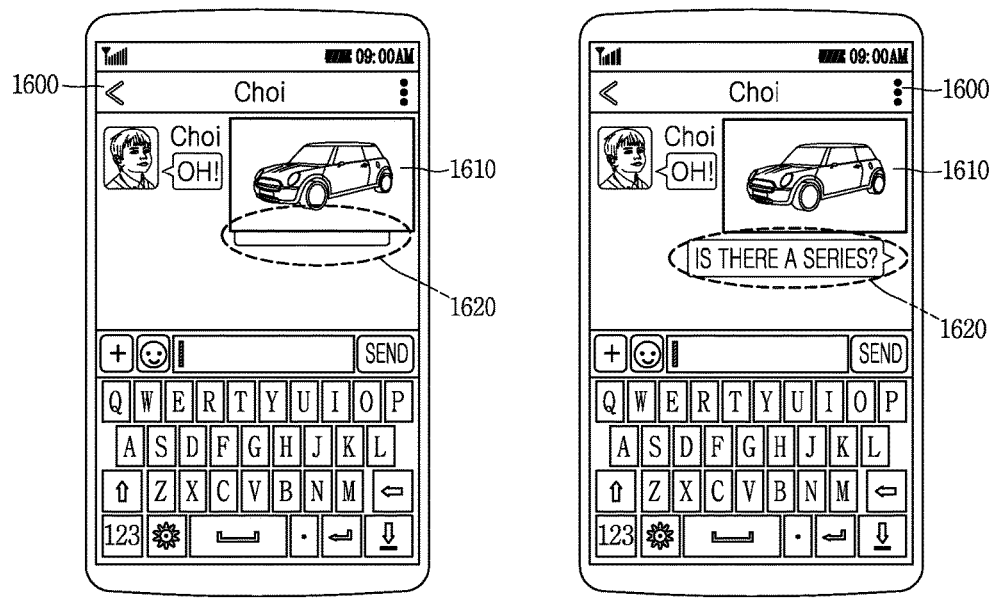
Figure 17:
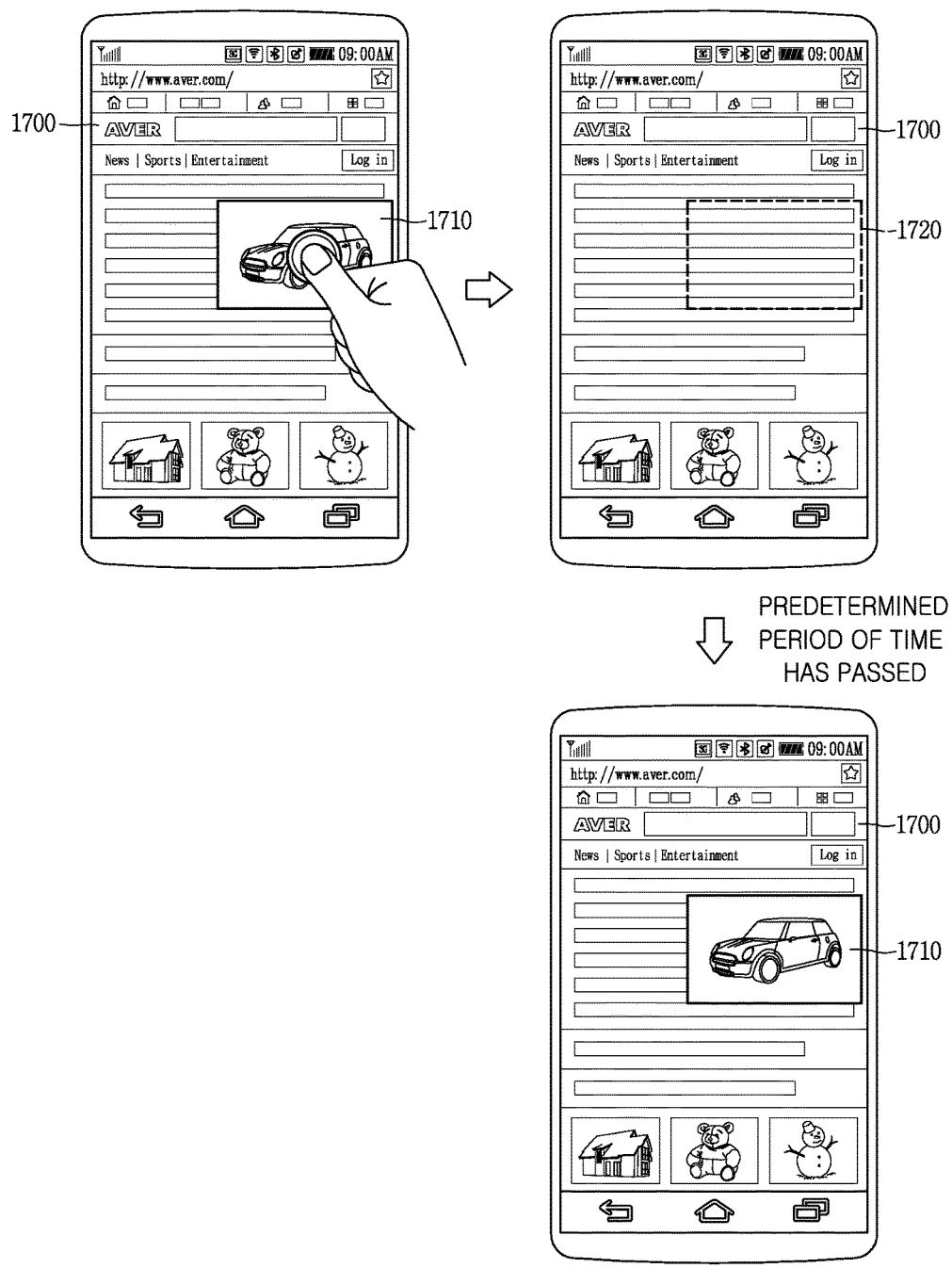

FIG. 14 is a flow chart illustrating a control method of displaying a plurality of screen information on a mobile terminal according to the present disclosure. Furthermore, FIGS. 15 through 17 are conceptual views illustrating the control method of FIG. 14.

First, The controller 180 of a mobile terminal according to the present disclosure may cause displaying of first screen information and second screen information concurrently on the display unit (S1410).

The controller 180 of a mobile terminal according to the present disclosure may cause displaying of a plurality of screen information concurrently on the display unit 151. For example, the controller 180 may cause displaying of first screen information and second screen information concurrently.

To this end, a user may apply a control command for generating first screen information and second screen information at the same time. For example, the user may display an app list of currently executed applications based on a touch sensed at four touch points at the same time started from a specific edge region (for example, right edge region) and dragged toward a central region of the display unit 151. In this case, the controller 180 may cause displaying of the first screen information of a first application and the second screen information of a second application selected by the user from the app list of currently executed applications at the same time.

The first screen information and the second screen information may be screen information corresponding to different applications or screen information corresponding to different functions provided from one application.

For example, the first screen information may be screen information corresponding to a web application, and the second screen information may be screen information corresponding to a gallery application.

For another example, the first screen information is screen information indicating a first dialog box for transmitting and receiving messages to and from a first terminal, and the second screen information is screen information indicating a second dialog box for transmitting and receiving messages to and from a second terminal.

On the other hand, the controller 180 may cause displaying of second screen information on a partial region of a region displayed with first screen information. In other words, the controller 180 may cause displaying of the second screen information on the first screen information in an overlapping manner.

At this time, the second screen information may be displayed in a floating manner. The floating manner may denote a manner in which screen information is movable within the display region of the display unit 151.

For example, as illustrated in the first drawing of FIG. 15, the controller 180 may cause displaying of second screen information 1510 corresponding to an image on a partial region of a region displayed with first screen information 1500 corresponding to a webpage. At this time, the second screen information 1510 corresponding to the image may be displayed in a floating manner. In this case, the second screen information 1510 may move in response to a user's control command.

The controller 180 of a mobile terminal according to the present disclosure may change the display format of information displayed on a partial region of the first screen information when the second screen information is displayed on a partial region of a region displayed with the first screen information (S1420).

When the second screen information 1510 is displayed on a partial region of a region displayed with the first screen information 1500, the user is unable to view at least part of the first screen information 1500.

In order to prevent this, the controller 180 may change the display format of information displayed on a partial region hidden by the second screen information 1510 to display it on another region of the first screen information 1500.

More specifically, the controller 180 may detect information in which the second screen information 1510 is displayed on a partial region of a region displayed with the first screen information 1500, and displayed on a partial region hidden by the second screen information 1510 of the first screen information 1500.

Then, the controller 180 may change the display format of information displayed on the partial region. Here, the display format denotes a visual appearance such as a display size, a display position, a display shape, and the like in which the information is displayed. For example, when the information is text, the controller 180 may change at least one of a text line spacing, a text size or a text position. The term of "changing the display format of information" may have the same meaning as the term of "distorting the display format of information."

The controller 180 of a mobile terminal according to the present disclosure may cause displaying of information displayed on a partial region in which the display format is changed and information displayed on a region adjacent to the partial region at the same time on a region adjacent to the partial region (S1430).

The controller 180 may change the display format of information displayed on a partial region, and then cause displaying of information displayed on a partial region in which the display format is changed and information displayed on the adjacent region at the same time on a region adjacent to the partial region.

The adjacent region may be a surrounding region of the region displayed with the second screen information 1510. For example, as illustrated in the first drawing of FIG. 15, a region 1520 adjacent to a partial region may be a region located at the left side of a region displayed with the second screen information 1510.

The controller 180 may change the display format of information displayed on the adjacent region to cause displaying of information displayed on a partial region in which the display format is changed and information displayed on the adjacent region at the same time. In other words, the controller 180 may change all display formats of information displayed on a partial region and information displayed on a region adjacent to the partial region.

Then, the controller 180 may cause displaying of information displayed on a partial region and information displayed on an adjacent region in a changed display format on the adjacent region. For example, as illustrated in the second drawing of FIG. 15, the controller 180 may change the line spacing and size of texts displayed on a partial region and texts displayed on an adjacent region to display them on a region 1520 adjacent to a partial region. Accordingly, the user may view information hidden by the second screen information 1510 without any additional manipulation to the second screen information.

For another example, as illustrated in FIG. 16, when second screen information 1610 including an image is displayed on first screen information 1600 including the content of a plurality of messages, the controller 180 may detect a specific message displayed on a region displayed with the second screen information 1610 among the plurality of messages.

In this case, the controller 180 may move and cause displaying of the specific message on a region 1620 adjacent to a region displayed with the second screen information 1610. Accordingly, the user may view the first screen information 1600 and the second screen information 1610 at the same time as well as concurrently receive event information hidden by the second screen information.

The controller 180 does not change the display format of the remaining information other than information displayed on the partial region of the first screen information. In other words, the controller 180 may maintain the display format of the remaining information other than information displayed on a partial region adjacent to the partial region.

On the other hand, the second screen information may be moved according to a user's control command. In other words, the controller 180 may change the display position of the second screen information based on the user's control command. For example, the controller 180 may change the display position of the second screen information in response to a drag input applied to the second screen information.

In this case, the controller 180 may redetect information displayed on a region in which the second screen information is moved. Then, the controller 180 may change information displayed on a region in which the second screen information is moved and information displayed on a region adjacent to the region in which the second screen information is moved to display them on a region adjacent to the region in which the second screen information is moved.

Concurrently, the controller 180 may return the display format of information for which the display format has been changed prior to the movement of the second screen information to a state prior to changing the display format. In other words, the controller 180 may return the display format of information that is not hidden by the second screen information to a state prior to changing the display format to display them on the display unit 151.

Alternatively, the controller 180 may move the second screen information based on a predetermined condition. The predetermined condition may be a condition for the first screen information to be refreshed or a condition for the first screen information to be scrolled.

For example, when specific information of the first screen information is refreshed, the controller 180 may detect a specific region corresponding to a region displayed with specific information on a region of the display unit 151. The specific region may be a region that is the farthest from a region displayed with specific information.

In this case, the controller 180 may move the second screen information to display the second screen information on the specific region.

For another example, when the first screen information is scrolled, the controller 180 may detect a specific region located in a direction opposite to a direction of moving screen information by the scroll.

In this case, the controller 180 may move the second screen information to cause displaying of the second screen information on the specific region.

In addition, the size or shape of the second screen information may be changed based on a predetermined condition.

On the other hand, the controller 180 may allow the second screen information to temporarily disappear from the display unit 151 in response to a predetermined type of touch applied to the second screen information. The predetermined type of touch may include a multi-touch, a long touch, a double touch, a drag touch, and the like.

In this case, the controller 180 may cause displaying of information displayed on a partial region in which the second screen information is displayed on the display unit 151 in a state prior to changing the display format.

For example, as illustrated in the first drawing of FIG. 17, the controller 180 may sense a long touch applied to second screen information 1710 while the second screen information 1710 including an image is displayed on first screen information 1700 containing a webpage.

In this case, as illustrated in the second drawing of FIG. 17, the controller 180 may allow the second screen information 1710 to disappear from the display unit 151. Accordingly, the user may view the first screen information 1700 with a non-changed display format without any interference of the second screen information 1710.

At this time, the controller 180 may cause displaying of a guide image 1720 indicating the display position of the second screen information 1710 on a region from which the second screen information 1710 disappears. Accordingly, the user may recognize a state that the second screen information temporarily disappears, and know the existence and content of information hidden by the second screen information.

On the other hand, as illustrated in the third drawing of FIG. 17, when a predetermined period of time has passed after the second screen information 1710 disappears, the controller 180 may cause displaying of the second screen information 1710 again. In this case, the controller 180 may provide both the first screen information 1700 and the second screen information 1710. Furthermore, when first screen information and second screen information are provided concurrently, a mobile terminal according to the present disclosure may change the display format of at least part of the first screen information to provide it to the user as described above.

In the above, a method of providing information hidden by the second screen information on the first screen information when the second screen information is displayed on the first screen information has been described. Accordingly, the user may receive information hidden by the second screen information as well as receiving the first screen information and the second screen information at the same time.

Hereinafter, a method of executing a function of a function execution bar when the first screen information and the second screen information are displayed on a plurality of regions of the display unit will be described. FIGS. 18 through 21B are conceptual views illustrating a control method according to the display position of a function bar.

The controller 180 may cause partitioning of the display unit 151 into a plurality of regions. For example, the controller 180 may cause partitioning of the display unit 151 into a first region and a second region.

Furthermore, the controller 180 may cause each the plurality of partitioned regions to display different screen information. In this case, the controller 180 may individually control information displayed in each partitioned region.

Figure 18:
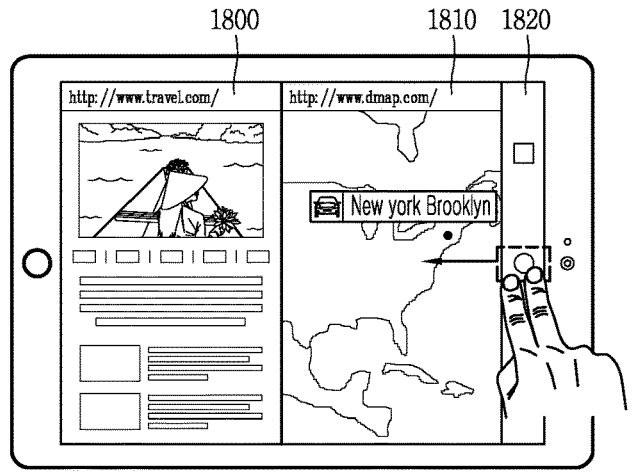
FIGS. 18 through 21B are conceptual views illustrating a control method according to a display position of a function bar.
Figure 18:
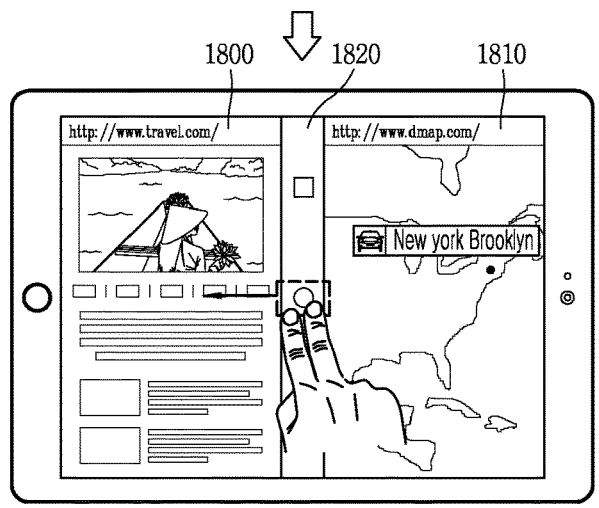
Figure 18:
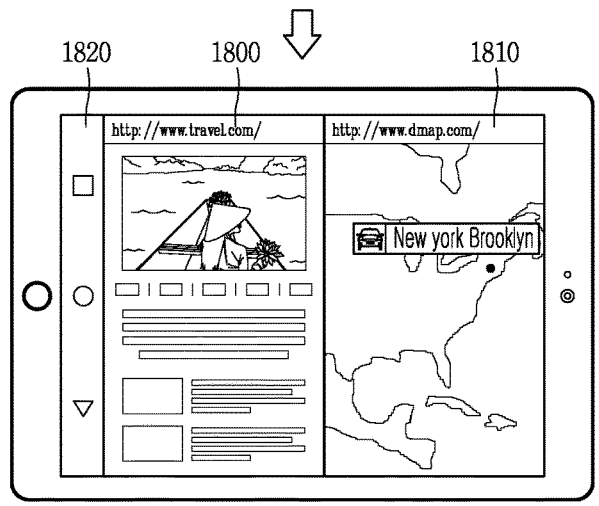

For example, as illustrated in the first drawing of FIG. 18, the controller 180 may cause displaying of first screen information 1800 on a first region, and displaying of second screen information 1810 on a second region.

The controller 180 may cause displaying of a function execution bar 1820 on one region of the display unit 151. Here, the function execution bar 1820 may be a bar type graphic object including a graphic object linked to a function of entering a home screen, a graphic object linked to an execution cancel function, and a graphic object linked to a function of displaying an app list being carried out.

The function of entering a home screen may be a function of displaying a home screen indicating a standby state on the display unit 151. The execution cancel function may be a function of cancelling the execution of a currently executed function, and entering a screen just prior to the execution of the current function, for example, a function of entering a previous webpage. The function of displaying an app list being carried out may be a function of displaying an app list including applications being currently carried out on a mobile terminal.

When first screen information 1800 and second screen information 1810 are displayed on different regions, the controller 180 may change a display region of the function execution bar based on a predetermined type of touch applied to the function execution bar 1820.

For example, as illustrated in the first drawing of FIG. 18, the controller 180 may move the function execution bar 1820 based on two drag inputs applied to the function execution bar 1820 as well as based on a direction in which the two drag inputs are applied.

As illustrated in the second drawing of FIG. 18, the controller 180 may move the function execution bar 1820 to a central region of the display unit 151 based on the application of two drag inputs having the left direction based on a front surface of the display unit 151.

Furthermore, as illustrated in the third drawing of FIG. 18, the controller 180 may cause displaying of the function execution bar 1820 on the left region of the display unit 151 based on two drag inputs having the left direction applied to the function execution bar 1820 displayed on the central region.

The controller 180 may execute a function of the function execution bar 1820 with respect to screen information displayed on a region which is the most adjacent to a region displayed with the function execution bar 1820. For example, as illustrated in the first drawing of FIG. 18, when the function execution bar 1820 is displayed on the right region of the display unit 151, the controller 180 may execute a function of the function execution bar to the second screen information 1810. Furthermore, as illustrated in the third drawing of FIG. 18, when the function execution bar 1820 is displayed on the left region of the display unit 151, the controller 180 may execute a function of the function execution bar to the first screen information 1800.

On the other hand, when the function execution bar is located on a central region, the controller 180 may execute a function with respect to either first screen information or second screen information based on an input with respect to the function execution bar.

More specifically, the controller 180 may execute a function for either first screen information or second screen information based on the direction of a drag input applied to the function execution bar.

Figure 19A:
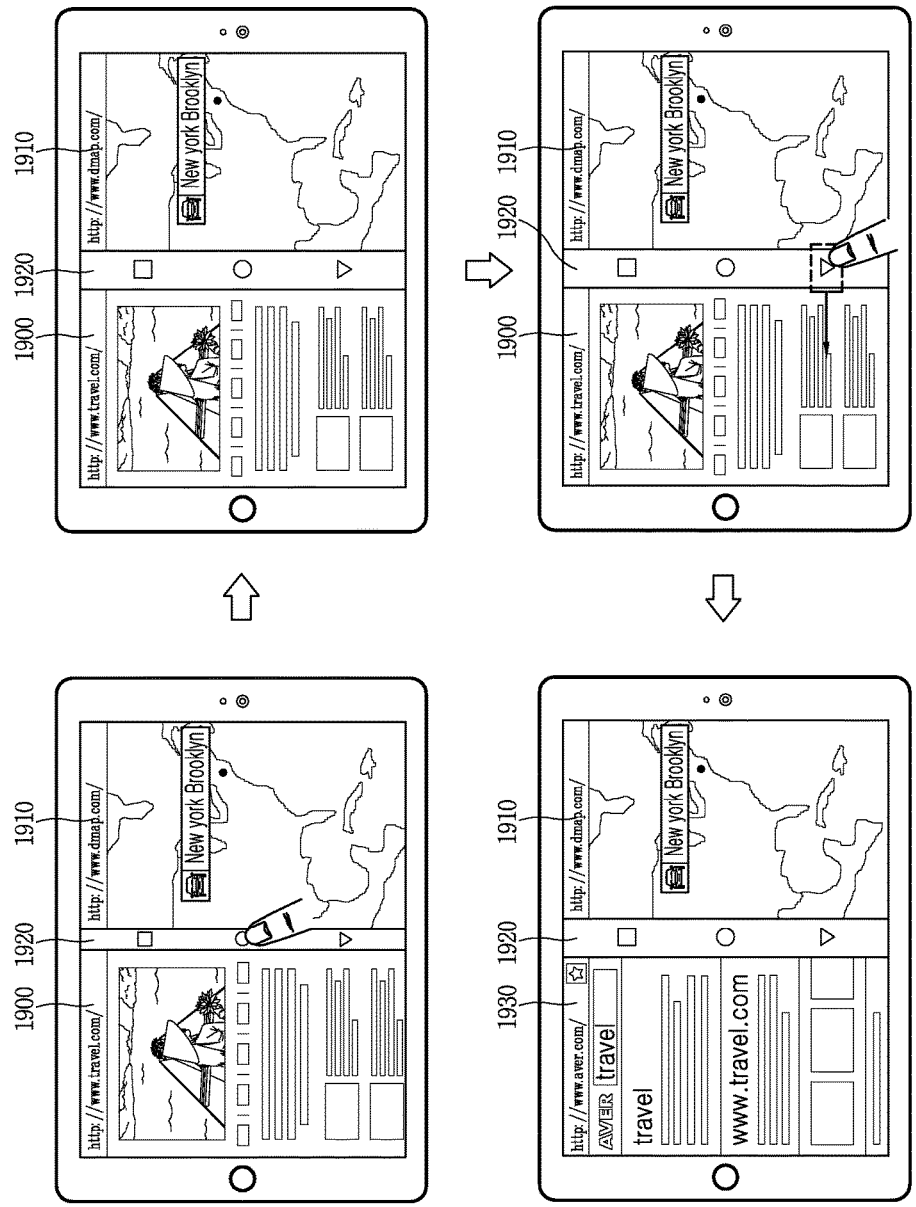

For example, as illustrated in the first drawing of FIG. 19A, the controller 180 may cause displaying of a function execution bar 1920 on a region between first screen information 1900 and second screen information 1910, namely, on a central region of the display unit 151.

Furthermore, as illustrated in the second drawing of FIG. 19A, the controller 180 may convert the function execution bar 1920 from an inactive state to an active state in response to a short touch applied to the function execution bar 1920. Here, the activation of the function execution bar 1920 is a state in which functions included in the function execution bar are executable. On the contrary, the deactivation of the function execution bar 1920 is a state in which functions included in the function execution bar are restricted.

As illustrated in the third drawing of FIG. 19A, while the function execution bar 1920 is in an active state, the controller 180 may execute an execution cancel function for the first screen information 1900 in response to a drag touch toward the first screen information 1900 applied to a graphic object linked to the execution cancel function included in the function execution bar.

In this case, as illustrated in the fourth drawing of FIG. 19A, the controller 180 may cause displaying of screen information 1930 indicating a previous webpage of the first screen information 1900 on a first region.

Figure 19B:
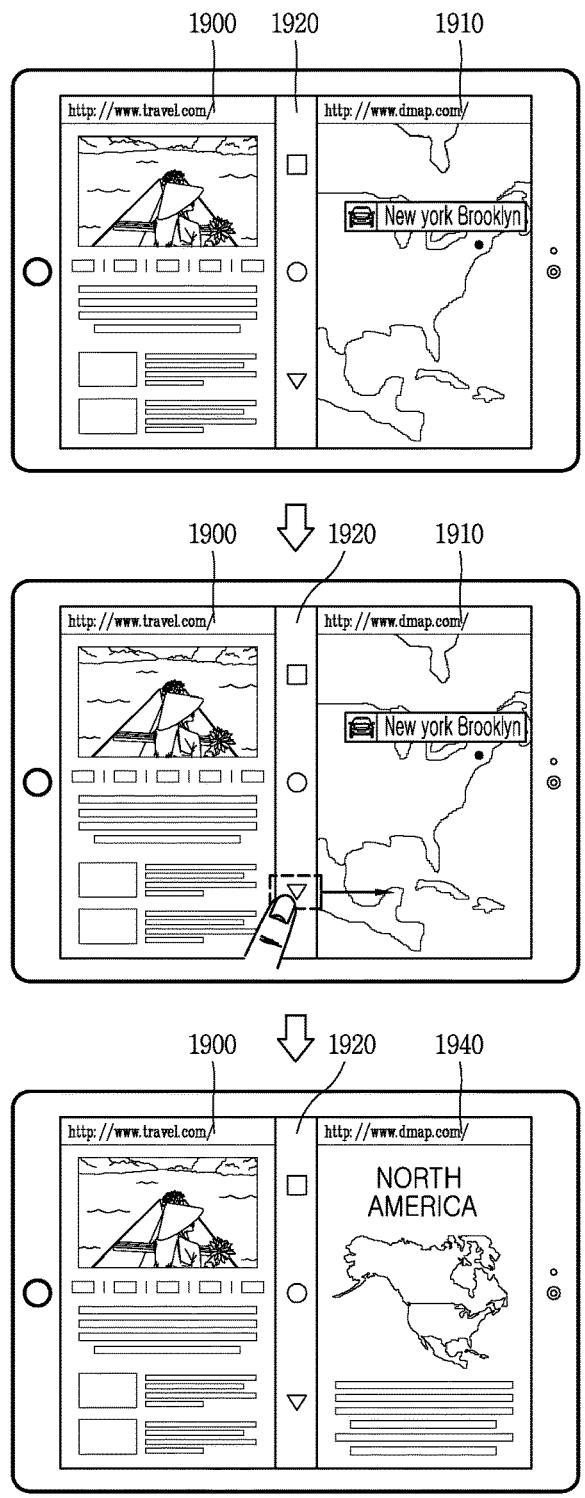

Similarly, as illustrated in the first drawing of FIG. 19B, the function execution bar 1920 may be in an active state. In this case, as illustrated in the second drawing of FIG. 19B, the controller 180 may execute an execution cancel function with respect to the second screen information 1910 in response to a drag touch toward the second screen information 1910 applied to a graphic object linked with an execution cancel function included in the function execution bar 1920.

As illustrated in the third drawing of FIG. 19B, when an execution cancel function with respect to the second screen information 1910 is carried out, the controller 180 may cause displaying of screen information 1940 indicating a previous webpage of the second screen information 1910 on a second region.

Accordingly, the user may execute a function included in the function execution bar through a drag input toward a region displayed with screen information for executing a function included in the function execution bar with respect to the function execution bar displayed on a central region. As a result, the user may intuitively set screen information which is a subject of function execution.

Figure 20A:
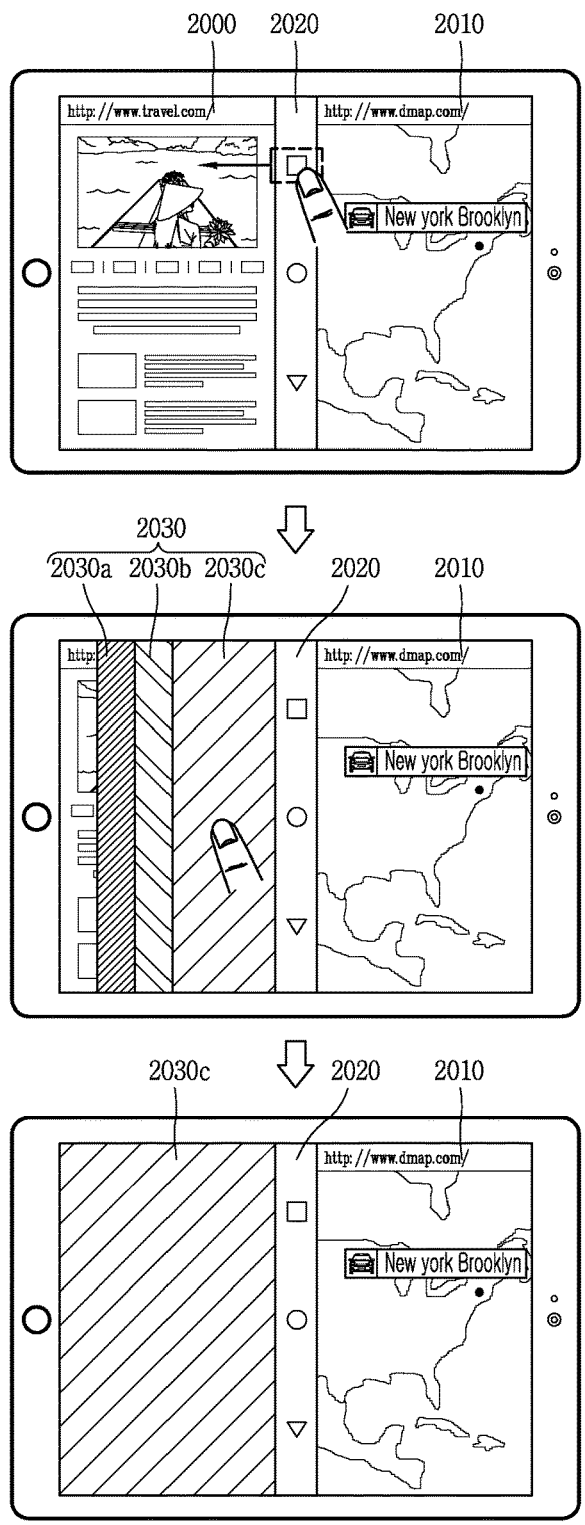

For another example, as illustrated in the first drawing of FIG. 20A, the controller 180 may sense a drag input toward first screen information 2000 applied to a graphic object linked to a function of displaying an app list including currently executed applications.

In this case, as illustrated in the second drawing of FIG. 20A, the controller 180 may cause displaying of an app list 2030 including currently executed applications 2030a, 2030b, 2030c on a first region.

Furthermore, as illustrated in the third drawing of FIG. 20A, the controller 180 may cause displaying of an execution screen of a specific application 2030c on the first region in response to a touch applied to the specific application 2030c on the app list 2030.

On the other hand, the controller 180 may cause displaying of an execution screen of a specific application according to a drag input applied to the specific application included in the app list.

Figure 20B:
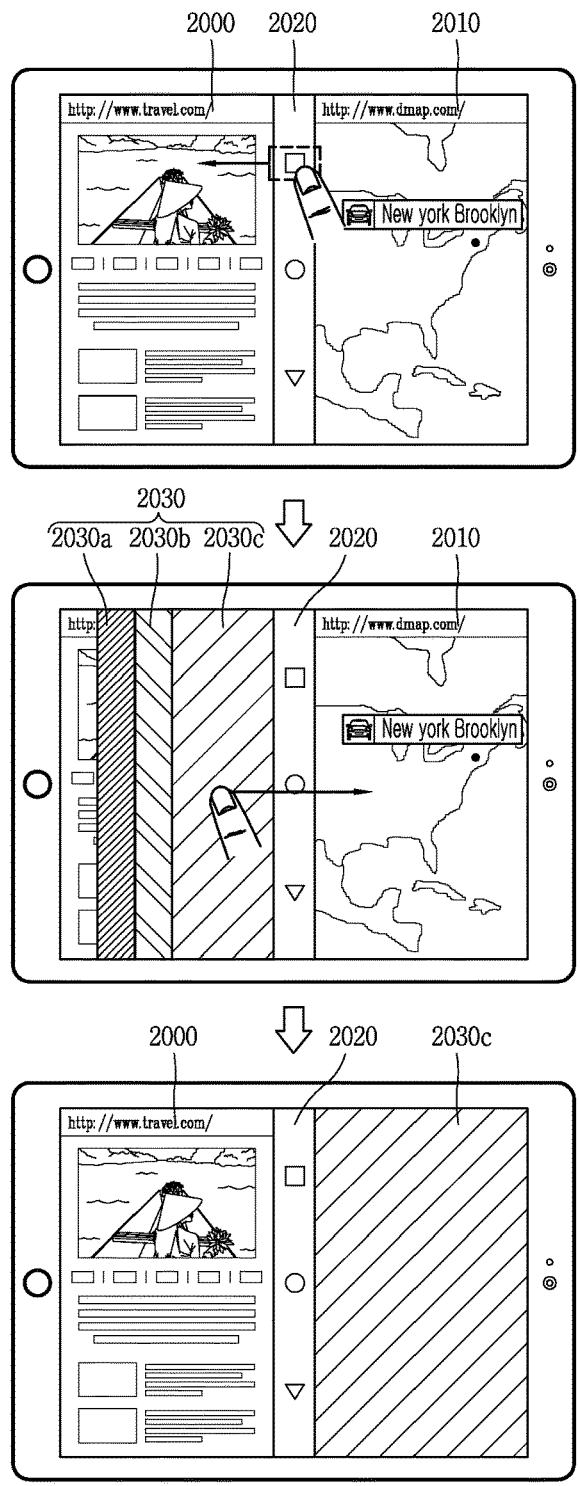

For example, as illustrated in the first and second drawings of FIG. 20B, the controller 180 may cause displaying of an app list 2030 on a first region in response to a drag input toward the first screen information 2000 applied to a graphic object linked to a function of displaying an app list including currently executed applications.

At this time, as illustrated in the second drawing of FIG. 20B, the controller 180 may cause displaying of an execution screen of the specific application 2030c on a second region based on a drag input toward the second screen information 2010 applied to the specific application 2030c.

On the other hand, contrary to the foregoing description, the function execution bar may be provided in the shape of being connected to specific screen information of the first screen information or second screen information. For example, as illustrated in the first drawing of FIG. 21A, the controller 180 may cause displaying of the function execution bar 2120 in a bookmark shape connected to the first screen information 2100.

Here, the function execution bar 2120 may be provided in the shape of being connected to currently active screen information between the first screen information 2100 and second screen information 2110. Here, the active screen information may be screen information selected by the user.

In this case, the controller 180 may provide the function execution bar in a state that the first screen information is not hidden.

Furthermore, when the function execution bar 2120 is provided in a connected manner, the controller 180 may execute functions included in the function execution bar with respect to screen information connected to the function execution bar 2120. For example, as illustrated in the second drawing of FIG. 21A, the controller 180 may execute an execution cancel function to the first screen information 2100, and cause displaying of screen information 2130 including a previous webpage of the first screen information 2100 on a first region.

Figure 21A:
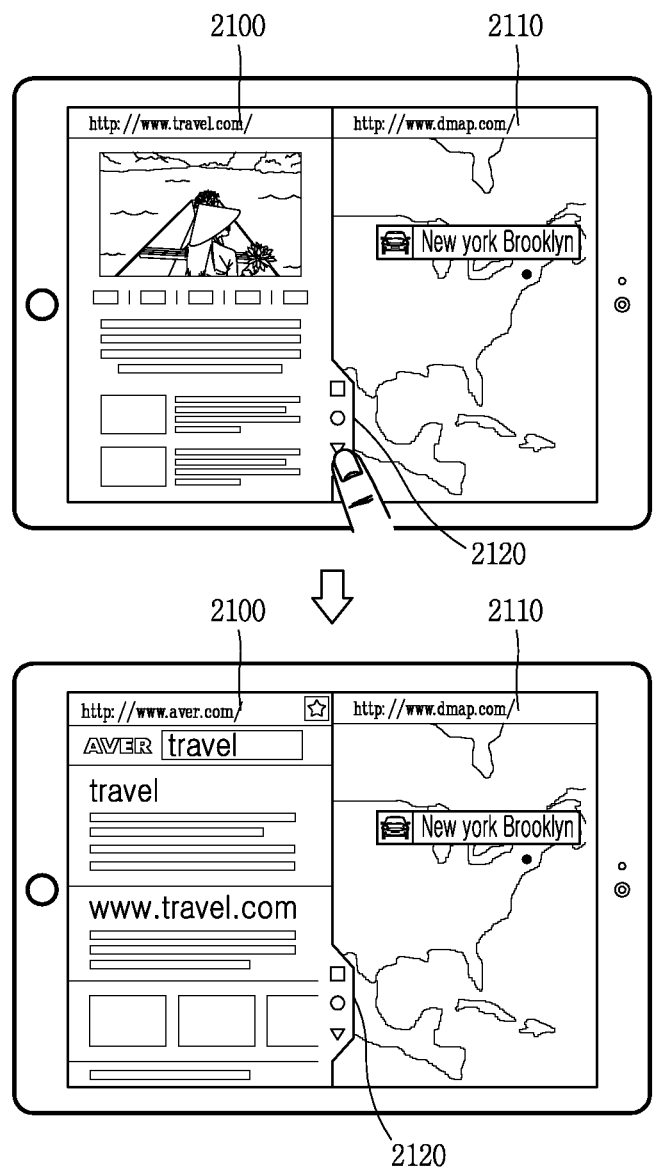
Figure 21B:
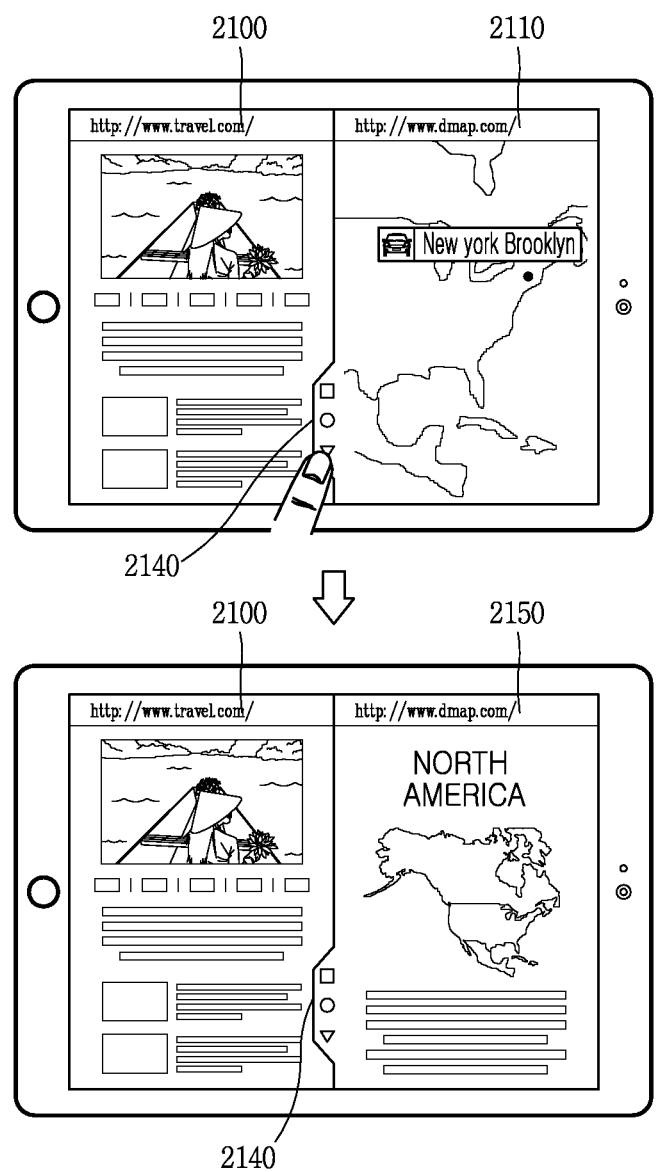

Similarly, as illustrated in the first and second drawings of FIG. 21B, the controller 180 may cause displaying of screen information 2150 including a previous webpage of the second screen information 2110 on a second region in response to a touch applied to a graphic object linked to an execution cancel function while a function execution bar 2140 in the shape of being connected to the second screen information 2110 is displayed.

In the above description, a method of executing a function of a function execution bar when first screen information and second screen information are displayed on a plurality of regions of the display unit has been described. Through this, the user may intuitively use a function of a function execution bar on the display unit partitioned into a plurality of regions.

Hereinafter, a method of controlling the display format of specific screen information when a plurality of screen information are displayed at the same time will be described. FIGS. 22A through 25 are conceptual views illustrating a method of controlling the display format of specific screen information when a plurality of screen information are displayed at the same time.

The controller 180 according to the present disclosure may cause displaying of the second screen information to overlap with the first screen information on the display unit 151.

The controller 180 may sense the first screen information being scrolled while the second screen information is displayed on the first screen information in an overlapping manner. In this case, the controller 180 may change the display format of the second screen information.

Figure 22A:
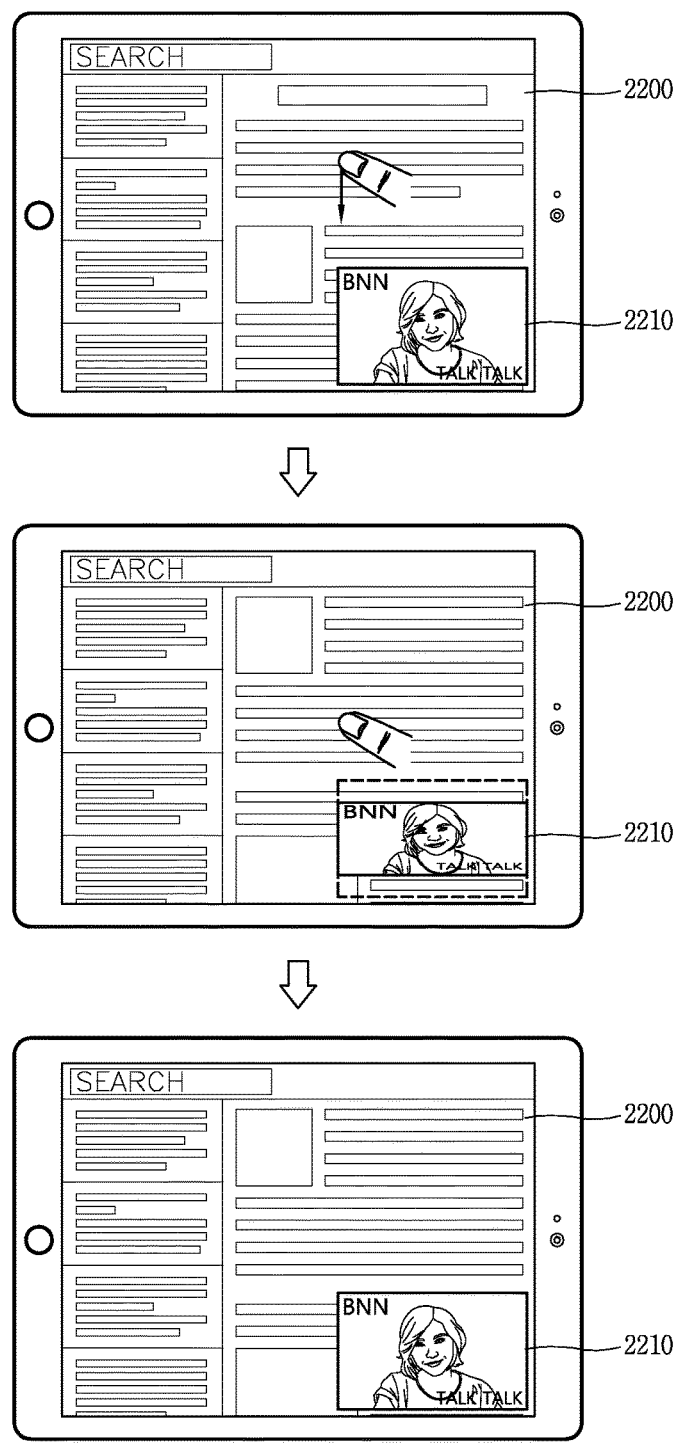
FIGS. 22A through 25 are conceptual views illustrating a method of controlling the display format of specific screen information when a plurality of screen information are displayed concurrently.

For example, as illustrated in the first drawing of FIG. 22A, the controller 180 may sense the first screen information 2200 being scrolled while the second screen information 2210 is displayed on the first screen information 2200 in an overlapping manner.

In this case, as illustrated in the second drawing of FIG. 22A, the controller 180 may reduce a display size of the second screen information 2210. In other words, a mobile terminal according to the present disclosure may determine screen information to which the user's manipulation is applied as screen information of interest, and reduce a display size of other information to disallow the screen information of interest to be hidden by the other information. Through this, the user may view a lot of currently interested screen information.

On the other hand, as illustrated in the third drawing of FIG. 22A, when the scroll of the first screen information 2200 is ended, the controller 180 may cause displaying of the second screen information 2210 in a state prior to changing the display format on the display unit 151.

Figure 22B:
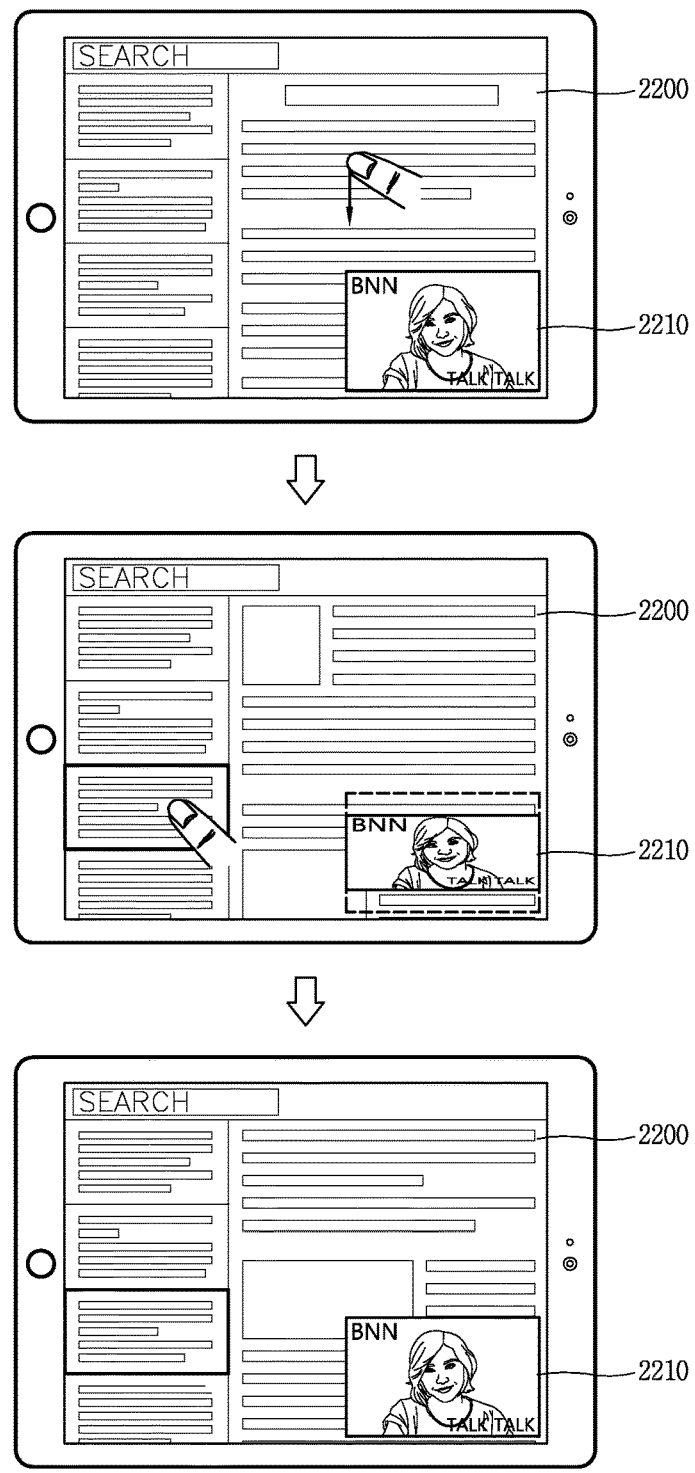

Alternatively, as illustrated in the first and second drawings of FIG. 22B, the controller 180 may sense the first screen information 2200 being refreshed in a state that the display format of the second screen information 2210 is changed. Here, refresh is an operation of receiving new information that is different from previously displayed information through wireless communication and displaying it on the display unit.

In this case, as illustrated in the third drawing of FIG. 22B, the controller 180 may cause displaying of the second screen information 2210 again.

Furthermore, though not shown in the drawing, when the first screen information is scrolled, the controller 180 may change the display position of the second screen information in a direction corresponding to a direction of scrolling the first screen information. Accordingly, the user may view newly displayed information while scrolling the first screen information without interfering with the second screen information.

Alternatively, the controller 180 may change the display position of the second screen information based on a touch applied to an edge region of the second screen information. At this time, the controller 180 may determine the display position of the second screen information as a position corresponding to the position of the touch applied region.

Figure 23A:
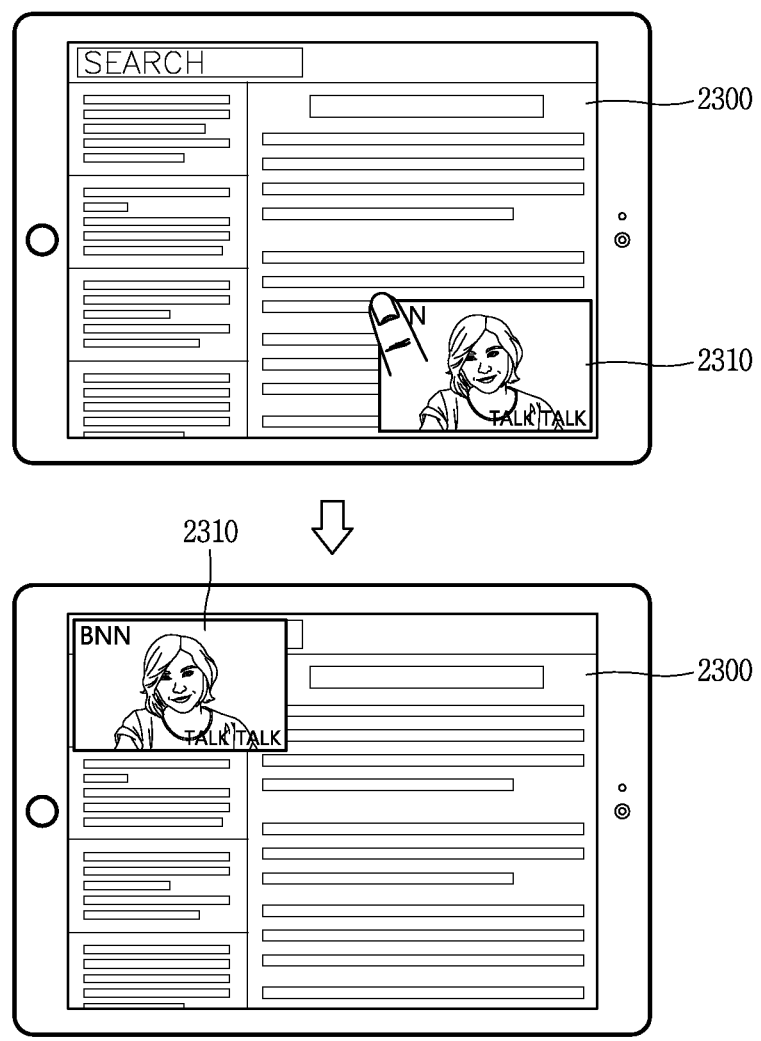

For example, as illustrated in FIG. 23A, the controller 180 may cause displaying of the second screen information 2310 on a left upper edge region of the display unit 151 in response to a touch applied to a left region of an upper edge region of the second screen information 2310, the second screen information displayed on first screen information 2300.

Figure 23B:
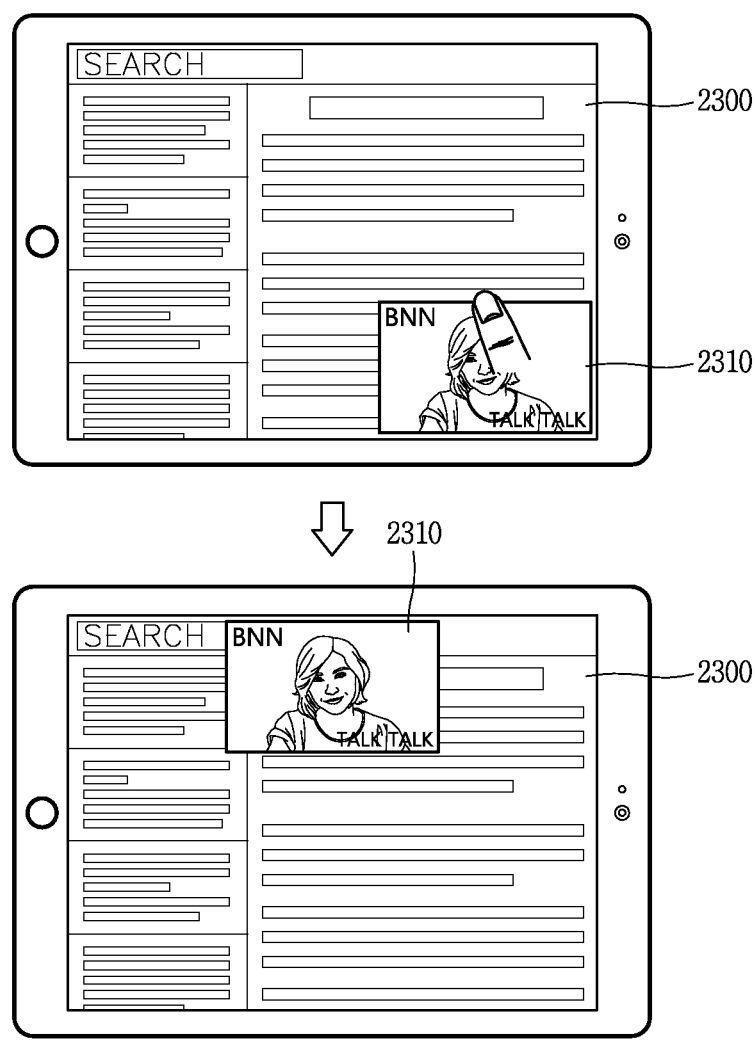

For another example, as illustrated in FIG. 23B, the controller 180 may cause displaying of the second screen information 2310 on an upper central region of the display unit 151 in response to a touch applied to a central region of the upper edge region of the second screen information 2310, the second screen information 2310 displayed on first screen information 2300. Through this, the use may intuitively move the second screen information.

On the other hand, the controller 180 may cause displaying of first screen information 2400 on a first region, and displaying of third screen information 2420 on second screen information 2410 in an overlapping manner on a second region.

At this time, the display size of the third screen information may be concurrently changed by changing the display size of the second screen information.

Figure 24:
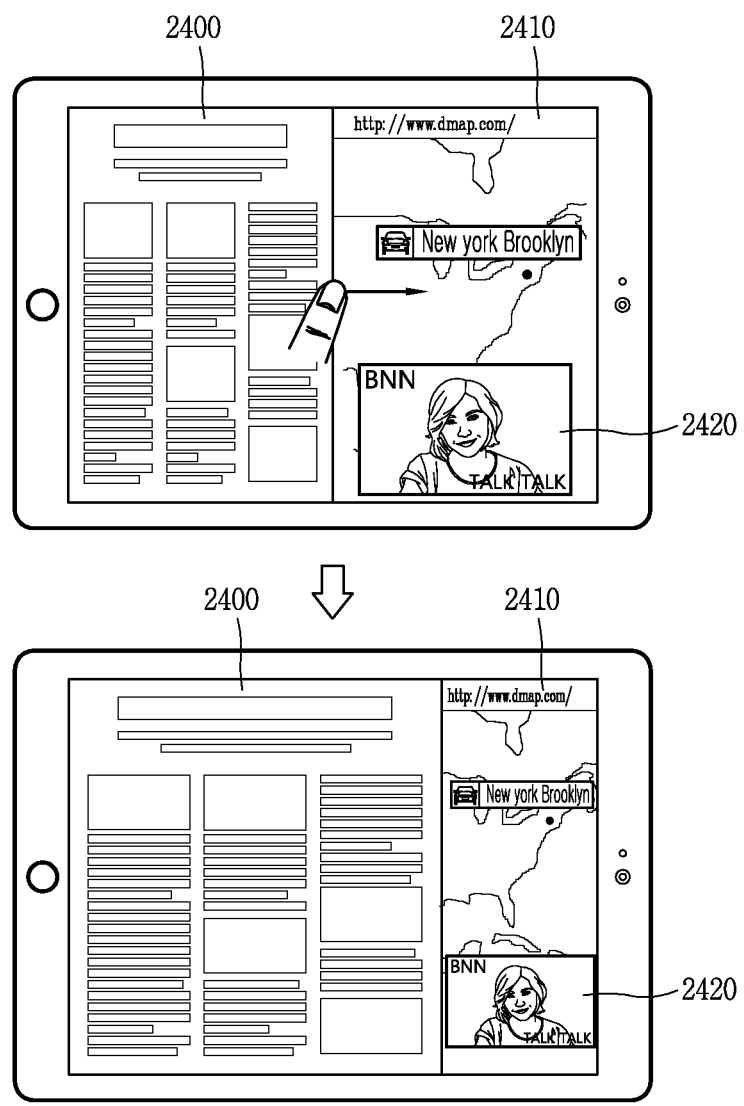

For example, as illustrated in FIG. 24, the controller 180 may change the size of the first region and the second region based on a touch applied to a boundary region between the first region and the second region.

In this case, the controller 180 may also change a size of the first screen information 2400 and a size of the second screen information 2410 to correspond to the size of the first region and the second region.

At this time, the controller 180 may also reduce the size of the third screen information 2420 when the size of the second screen information 2410 is reduced.

On the contrary, though not shown in the drawing, when the third screen information 2420 is displayed on the first screen information, the controller 180 may maintain the size of the third screen information 2420 though the size of the first screen information 2400 is enlarged.

Alternatively, the display position of the third screen information may be changed based on whether or not the first screen information and the second screen information are activated.

Figure 25:
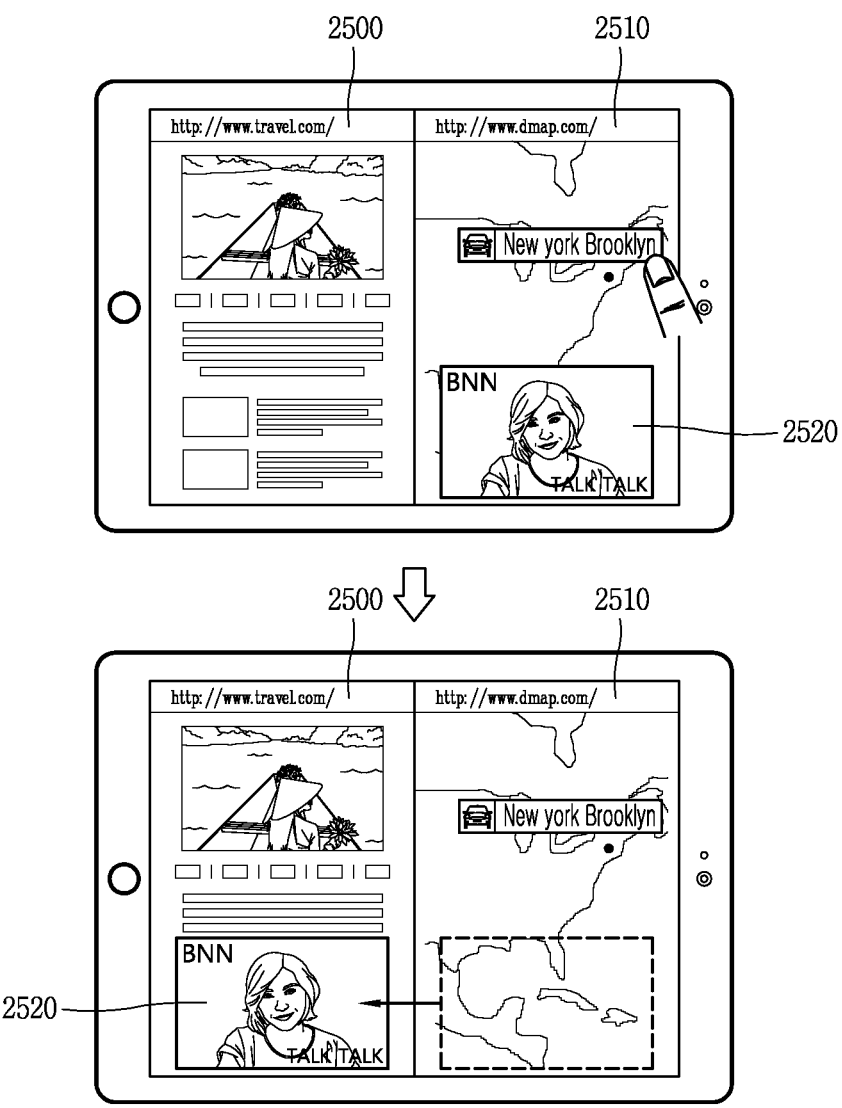

For example, as illustrated in FIG. 25, when the second screen information 2510 is activated, the controller 180 may move and cause displaying of third screen information 2520 onto first screen information 2500 based on a user's touch input. Accordingly, the user may receive an activated screen without interfering with the third screen information 2520.

Furthermore, when a plurality of screen information are displayed at the same time, and thus part of screen information is hidden, a mobile terminal according to the present disclosure may distort the hidden screen information, thereby effectively providing the hidden information.

Furthermore, when a plurality of screen information are provided at the same time, a mobile terminal according to the present disclosure may move a function bar display region, thereby performing each function included in the function bar with respect to any one screen information of the plurality of screen information. Accordingly, the user may directly select the execution subjects of functions included in the function bar display region.

The foregoing present invention may be implemented as codes readable by a computer on a medium written by the program. The computer-readable media may include all kinds of recording devices in which data readable by a computer system is stored. Examples of the computer-readable media may include hard disk drive (HDD), silicon disk drive (SDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:
1. A mobile terminal, comprising:
a display; and
a controller configured to:
cause the display to display first screen information of a first application;
cause the display to display notification information for notifying occurrence of an event related to a second application while the first screen information is displayed;
execute the second application in response to a predetermined type of touch input received via the notification information;
cause the display to display the first screen information and second screen information of the second application concurrently in a first display format when the predetermined type of touch input is a first type of touch input, wherein the second screen information overlaps with at least part of the first screen information in the first display format;
cause the display to display the first screen information and the second screen information concurrently in a second display format when the predetermined type of touch input is a second type of touch input, wherein the first screen information and the second screen information do not overlap in the second display format;
cause the display to display a guide image when a first touch is applied to a specific region of the second screen information while the first screen information and the second screen information are displayed in the first display format, the guiding image guiding conversion from the first display format to the second display format; and
cause the display to display the first screen information and the second screen information in the second display format in response to a second touch applied to the guide image.

2. The mobile terminal of claim 1, wherein the controller is further configured to:
cause the first screen information or the second screen information to be in an edit mode in response to a user input for switching a display format received while the first screen information and the second screen information are displayed in the second display format; and
cause the display to display the first screen information and the second screen information in the first display format in response to a touch applied to a region of the first or second screen information that is in the edit mode.

3. The mobile terminal of claim 1, wherein the controller is further configured to cause the display to display an indicator linked to the second screen information instead of the second screen information when a size of the second screen information is reduced to a size that is less than a predetermined size in response to a user input received while the first screen information and the second screen information are displayed in the first display format.

4. The mobile terminal of claim 3, wherein the controller is further configured to cause the display to redisplay the second screen information in a pop-up manner over the first screen information in response to a touch applied to the indicator while the first screen information is displayed.

5. The mobile terminal of claim 3, wherein the controller is further configured to cause the display to:
display updated second screen information associated with an event for a preset period of time when the event occurs with respect to an application associated with the second screen information while the indicator is displayed, the updated second screen information displayed without requiring a user input; and
redisplay the indicator instead of the second screen information when the preset period of time elapses while the updated second screen information is displayed.

6. The mobile terminal of claim 1, wherein the controller is further configured to cause the display to:
change a size of the first screen information and a size of the second screen information in response to a touch applied to a boundary region between the first screen information and second screen information that are displayed in the second display format; and
display an indicator linked to the first or second screen information of which the size is reduced to a size that is less than a predetermined size such that the reduced sized first or second screen information is replaced by the indicator.

7. The mobile terminal of claim 1, wherein:
the notification information is displayed in an overlapping manner such that at least part of the first screen information is obscured by the notification information; and the notification information is no longer displayed when the first screen information and the second screen information are displayed concurrently in response to the predetermined type of touch input.

8. The mobile terminal of claim 1, wherein:
the first screen information includes a message communicated with an external terminal in real time;
the second screen information is a playback screen of a video contained in a message received from the external terminal; and
the controller is further configured to cause the display to continue displaying of the playback screen when a new message is received from the external terminal during playback of the video such that the first screen information including the new message and the second screen information including the playback screen are displayed in the first display format.

9. The mobile terminal of claim 8, wherein the controller is further configured to cause the display to display screen information for setting a path for downloading the video in response to a drag input applied to the second screen information in a predetermined direction, the drag input received while the playback screen is displayed.

10. The mobile terminal of claim 1, wherein the controller is further configured to cause the display to display icons corresponding to a plurality of applications in response to a user input for displaying both the first screen information and the second screen information concurrently, the user input received while only the first screen information is displayed.

11. The mobile terminal of claim 10, wherein the controller is further configured to cause the display to display an execution screen of an application corresponding to a specific icon as the second screen information in response to a touch applied to the specific icon among the icons.

12. The mobile terminal of claim 11, wherein the first type of user input is a touch that is less than a threshold length and the second type of user input is a touch that is greater than the threshold length.

13. The mobile terminal of claim 1, wherein the controller is further configured to cause the display to display the first screen information and the second screen information in the second display format in response to a drag applied to the second screen information in a specific direction while the first screen information and the second screen information are displayed in the first display format.

14. The mobile terminal of claim 1, wherein the predetermined type of touch input comprises a drag initiated from a region of the display corresponding to the notification information.

15. The mobile terminal of claim 14, wherein:
a touch length of the first type of touch input is less than a preset length; and
a touch length of the second type of touch input is greater than the preset length.

16. The mobile terminal of claim 1, wherein the second screen information is displayed in a pop-up window manner over the first screen information such that the at least part of the first screen information is obscured by the second screen information when the first screen information and the second screen information are displayed in the first display format.

17. The mobile terminal of claim 1, wherein a screen of the display is partitioned into a first region and a second region in response to the second type of touch input such that the first screen information is displayed in the first region and the second screen information is displayed in the second region when the first screen information and the second screen information are displayed in the second display format.

18. The mobile terminal of claim 17, wherein:
the first screen information displayed in the first region includes less information than the first information displayed prior to the partitioning of the screen of the display; and
the second information displayed in the second display format includes more information than the second information displayed in the first display format.

19. A method for controlling a mobile terminal, the method comprising:
displaying first screen information of a first application;
displaying notification information for notifying occurrence of an event related to a second application while the first screen information is displayed;
executing the second application in response to a predetermined type of touch input received via the notification information;
displaying the first screen information and second screen information of the second application concurrently in a first display format when the predetermined type of touch input is a first type of touch input, wherein the second screen information overlaps with at least part of the first screen information in the first display format;
displaying the first screen information and the second screen information concurrently in a second display format when the predetermined type of touch input is a second type of touch input, wherein the first screen information and the second screen information do not overlap in the second display format;
displaying a guide image when a first touch is applied to a specific region of the second screen information while the first screen information and the second screen information are displayed in the first display format, the guiding image guiding conversion from the first display format to the second display format; and
displaying the first screen information and the second screen information in the second display format in response to a second touch applied to the guide image.

20. The method of claim 19, further comprising:
causing the first screen information or the second screen information to be in an edit mode in response to a user input for switching a display format received while the first screen information and the second screen information are displayed in the second display format; and
displaying the first screen information and the second screen information in the first display format in response to a touch applied to a region of the first or second screen information that is in the edit mode.

21. The method of claim 19, further comprising:
displaying an indicator linked to the second screen information instead of the second screen information when a size of the second screen information is reduced to a size that is less than a predetermined size in response to a user input received while the first screen information and the second screen information are displayed in the first display format.

22. The method of claim 19, further comprising:
changing a size of the first screen information and a size of the second screen information in response to a touch applied to a boundary region between the first screen information and second screen information that are displayed in the second display format; and
displaying an indicator linked to the first or second screen information of which the size is reduced to a size that is less than a predetermined size such that the reduced sized first or second screen information is replaced by the indicator.

\* \* \* \* \*